United States Patent
Izu et al.

(10) Patent No.: US 9,319,923 B2
(45) Date of Patent: Apr. 19, 2016

(54) NODE, COMMUNICATION METHOD, AND COMMUNICATION SYSTEM

(71) Applicant: FUJITSU LIMITED, Kawasaki-shi, Kanagawa (JP)

(72) Inventors: Tetsuya Izu, London (GB); Masahiko Takenaka, Kawasaki (JP); Hisashi Kojima, Yokosuka (JP); Kazuyoshi Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/297,094

(22) Filed: Jun. 5, 2014

(65) Prior Publication Data

US 2014/0286171 A1    Sep. 25, 2014

Related U.S. Application Data

(63) Continuation of application No. PCT/JP2011/078216, filed on Dec. 6, 2011.

(51) Int. Cl.
*H04W 28/02* (2009.01)
*H04W 12/12* (2009.01)
*H04W 84/18* (2009.01)
*H04W 12/02* (2009.01)

(52) U.S. Cl.
CPC ............ *H04W 28/021* (2013.01); *H04W 12/12* (2013.01); *H04W 12/02* (2013.01); *H04W 84/18* (2013.01)

(58) Field of Classification Search
None
See application file for complete search history.

(56) References Cited

U.S. PATENT DOCUMENTS 8,107,397 B1 * 1/2012 Bagchi ................. H04L 9/0822
370/254
8,661,254 B1 * 2/2014 Sama .................... H04L 9/3215
380/247

(Continued)

FOREIGN PATENT DOCUMENTS

JP          5-91108     4/1993
JP       2003-244156    8/2003

(Continued)

OTHER PUBLICATIONS

International Preliminary Report on Patentability for corresponding international application PCT/JP2011/078216, mailed Jun. 19, 2014, 11 pages.

(Continued)

*Primary Examiner* — Donald Mills
(74) *Attorney, Agent, or Firm* — Staas & Halsey LLP

(57) ABSTRACT

A node in an ad-hoc network includes a memory unit storing a concatenated counter value including an erasure counter value and a transmission counter value for the node; and a processor configured to: add one to the transmission counter value, when the node transmits data to another node in the ad-hoc network; transmit to the other node, the data and the updated concatenated counter value; detect erasure of the concatenated counter value in the memory unit; distribute in the ad-hoc network and upon detecting the erasure, an acquisition request for the erasure counter value; receive the erasure counter value consequent to the acquisition request; generate the concatenated counter value to include the received erasure counter value plus one and the transmission counter value after the erasure and indicating the number of transmissions as zero due to the erasure; and archive to the memory unit, the generated concatenated counter value.

17 Claims, 22 Drawing Sheets

(56) References Cited

U.S. PATENT DOCUMENTS

| | | |
|---|---|---|
| 2007/0064950 A1 | 3/2007 | Suzuki et al. |
| 2008/0005586 A1* | 1/2008 | Munguia ............. G06F 12/1408 713/189 |
| 2009/0245270 A1 | 10/2009 | van Greunen et al. |
| 2011/0158410 A1 | 6/2011 | Falk et al. |
| 2011/0176681 A1 | 7/2011 | Yamada et al. |
| 2012/0082312 A1* | 4/2012 | Liu ....................... H04L 9/0844 380/262 |
| 2012/0216034 A1* | 8/2012 | Chen .................... H04L 9/0825 713/153 |

FOREIGN PATENT DOCUMENTS

| | | |
|---|---|---|
| JP | 2003-348072 | 12/2003 |
| JP | 2006-128876 | 5/2006 |
| JP | 2007-88799 | 4/2007 |
| JP | 2009-81854 | 4/2009 |
| JP | 2010-98597 | 4/2010 |
| JP | 2011-515988 | 5/2011 |
| WO | WO 2010/028936 A1 | 3/2010 |

OTHER PUBLICATIONS

International Search Report mailed Mar. 13, 2012 in corresponding International Patent Application No. PCT/JP2011/078216.

* cited by examiner

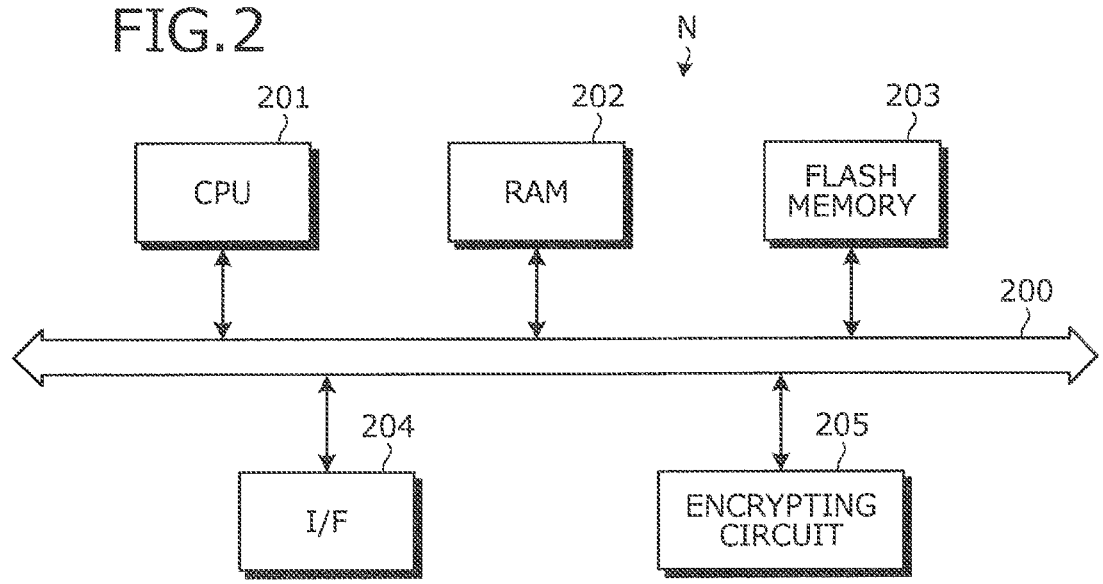
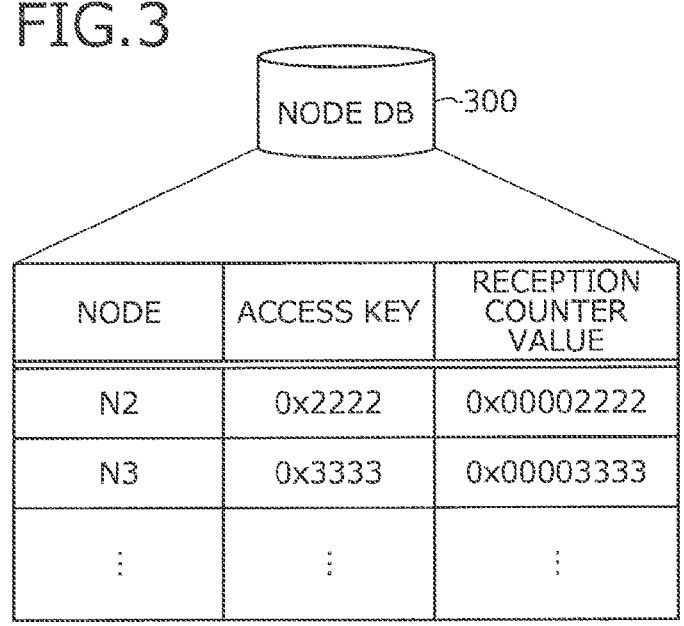

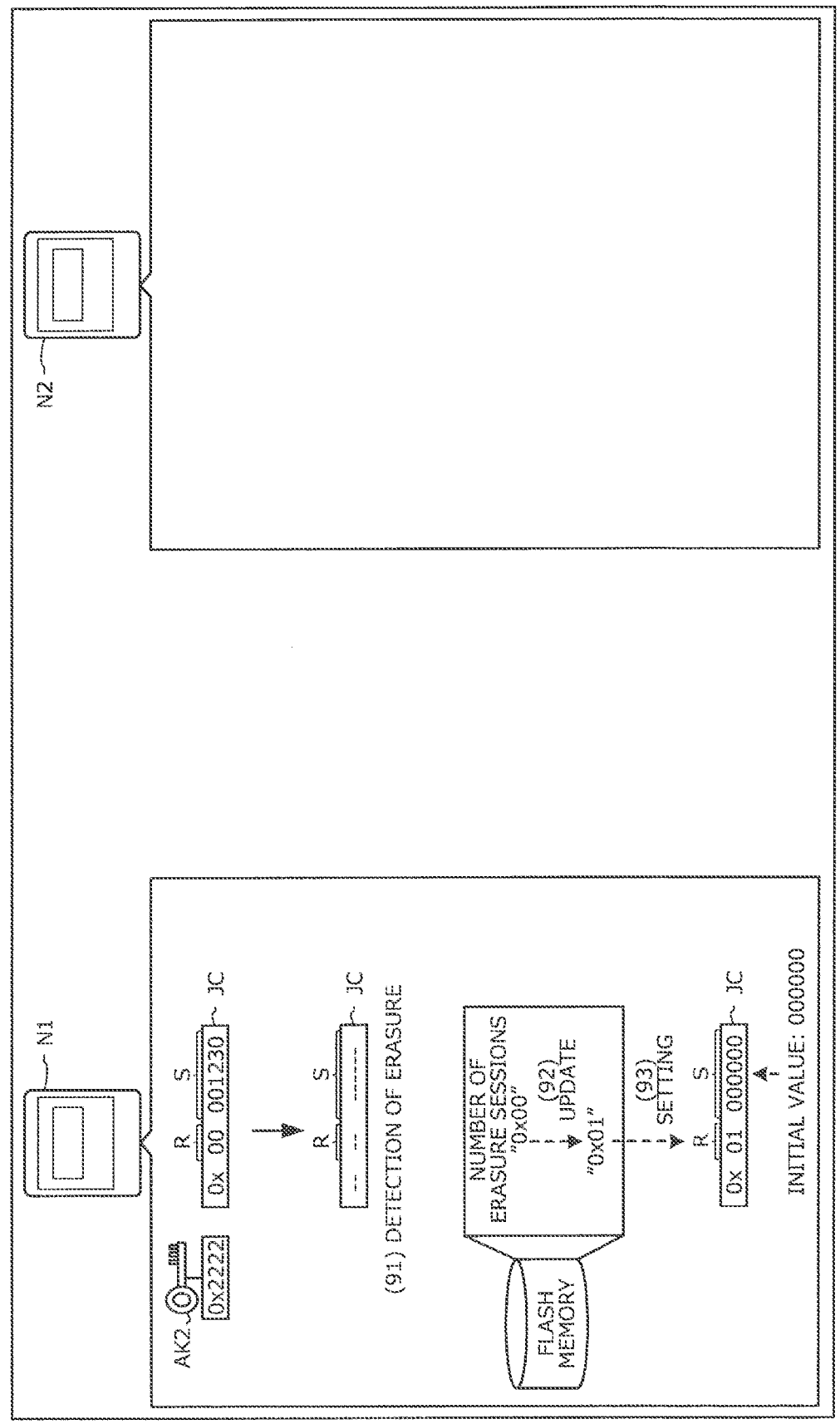

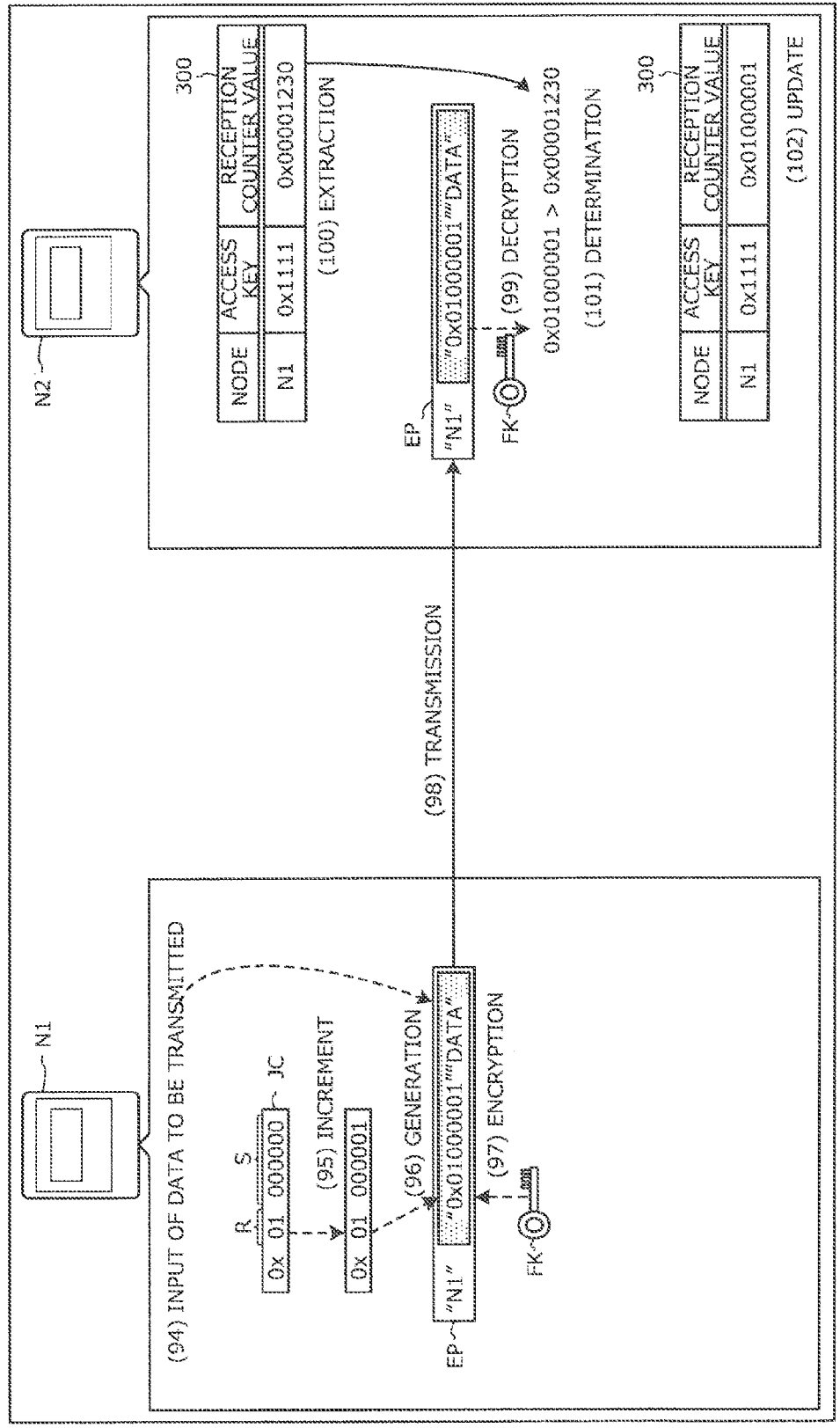

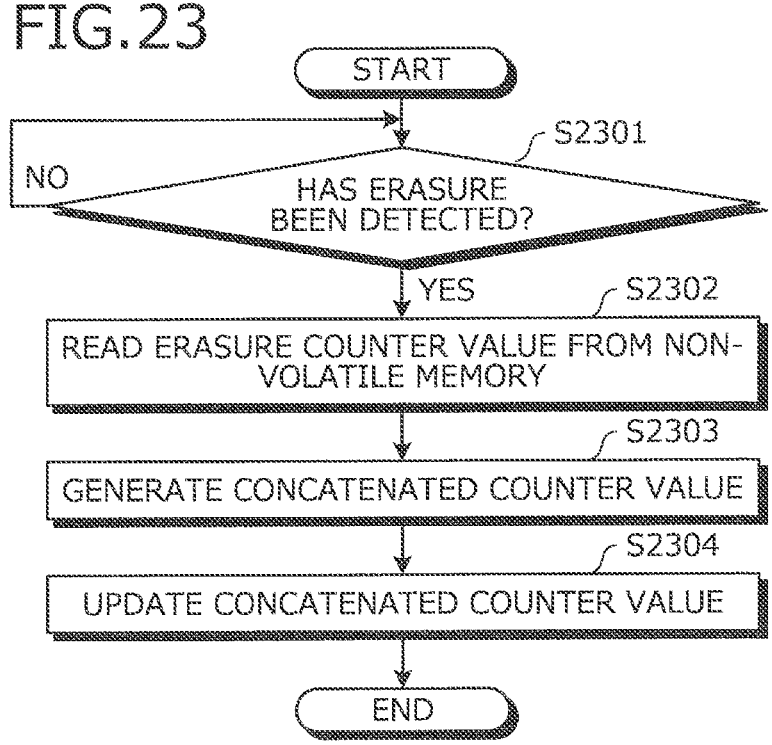

NODE, COMMUNICATION METHOD, AND COMMUNICATION SYSTEM

CROSS REFERENCE TO RELATED APPLICATIONS

This application is a continuation application of International Application PCT/JP2011/078216, filed on Dec. 6, 2011 and designating the U.S., the entire contents of which are incorporated herein by reference.

FIELD

The embodiment discussed herein is related to a node, a communication method, and a communication system.

BACKGROUND

An ad-hoc network is a kind of self-configuring network that links using radio communication. The ad-hoc network is configured by plural nodes. Each of the nodes in the ad-hoc network transmits and receives packets using multi-hop communication. Multi-hop communication is a technique in which nodes each present outside the communication coverage of one another communicate through another node present in the communication coverage of each of the nodes.

As a technique using the ad-hoc network, according to one system, nodes capable of communicating by radio are incorporated in residential electric power meters; and thereby, the duties such as reading meters are executed through the ad-hoc network without any site visits by a worker. As to an ad-hoc network handling personal information such as the amount of electric power used by a household, ensure communication has to be executed from the viewpoints of confidentiality, prevention of falsification, etc.

According to conventional systems, ensure communication is achieved by encrypting packets transmitted and received among the nodes in the ad-hoc network. According to related techniques, an encryption key used to encrypt the packets is securely distributed (see, e.g., Japanese Laid-Open Patent Publication Nos. 2003-348072, 2010-98597, and 2007-88799). According to another technique, a node finds a gateway that is connected from the inside of the ad-hoc network (see, e.g., Japanese Laid-Open Patent Publication No. 2009-81854). According to another technique, a node obtains a bus generation number from another node that is a bus manager; and when the node becomes the bus manager, the node adds one to the obtained bus generation number and uses the resulting number (see, e.g., Japanese Laid-Open Patent Publication No. 2006-128876).

In an ad-hoc network, even when packets are encrypted, a proper packet transmitted within the ad-hoc network in the past may be captured by an attacker. The attacker can make an attack to cause the network to be congested by retransmitting the captured proper packet in the ad-hoc network (a replay attack). To ensure the communication quality as a network, the ad-hoc network has to be prepared to cope with a replay attack. For a conventional system, a technique is present according to which a node transmitting a packet stores into the packet, the transmission time of the packet; and the node receiving the packet compares the time of the node receiving the packet and the transmission time stored in the received packet, regards the comparison result as a result of execution of a replay attack if the times are far from one another, and discards the packet.

Nonetheless, according to the conventional techniques, the times of all the nodes in the ad-hoc network have to be synchronized. For example, the time synchronization for all the nodes in the ad-hoc network is implemented by regularly broadcasting a packet for the time synchronization, by a gateway that is a relaying device between the ad-hoc network and another network, or a specific node in the ad-hoc network.

Therefore, in an ad-hoc network executing meter reading, the broadcast packets for the time synchronization are transmitted and received in addition to the meter reading data packets for the meters. Therefore, a problem arises in that the communication load on the ad-hoc network increases.

SUMMARY

According to an aspect of an embodiment, a node in an ad-hoc network includes a memory unit configured to store a concatenated counter value including, as higher order digits, an erasure counter value indicating number of erasure sessions at the node and including, as lower order digits, a transmission counter value indicating number of transmission sessions from the node; and a processor configured to: update by adding one to the transmission counter value of the concatenated counter value stored in the memory unit, when the node transmits data to another node in the ad-hoc network; transmit to the other node, the data and the concatenated counter value after updating; detect erasure of the concatenated counter value in the memory unit; distribute in the ad-hoc network and upon detecting the erasure, an acquisition request for the erasure counter value; receive from the ad-hoc network and consequent to distributing the acquisition request, the erasure counter value; generate the concatenated counter value to include, as the higher order digits, the received erasure counter value after an addition of one to the erasure counter value and to include, as the lower order digits, the transmission counter value after the erasure and indicating that the number of transmission sessions has become zero due to the erasure; and archive to the memory unit, the generated concatenated counter value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram of an example of a hardware configuration of a node N according to an embodiment;

FIG. 3 is an explanatory diagram of an example of the storage contents of a node database (DB);

FIGS. 21 and 22 are explanatory diagrams of a third example of operation executed when the concatenated counter value JC of the node N is erased; and FIG. 23 is a flowchart of a detailed process procedure for the concatenated counter value generation process in the third example of operation.

DESCRIPTION OF EMBODIMENTS

An embodiment of a node, a communication method, and a communication system will be described in detail with reference to the accompanying drawings.

Figure 1:
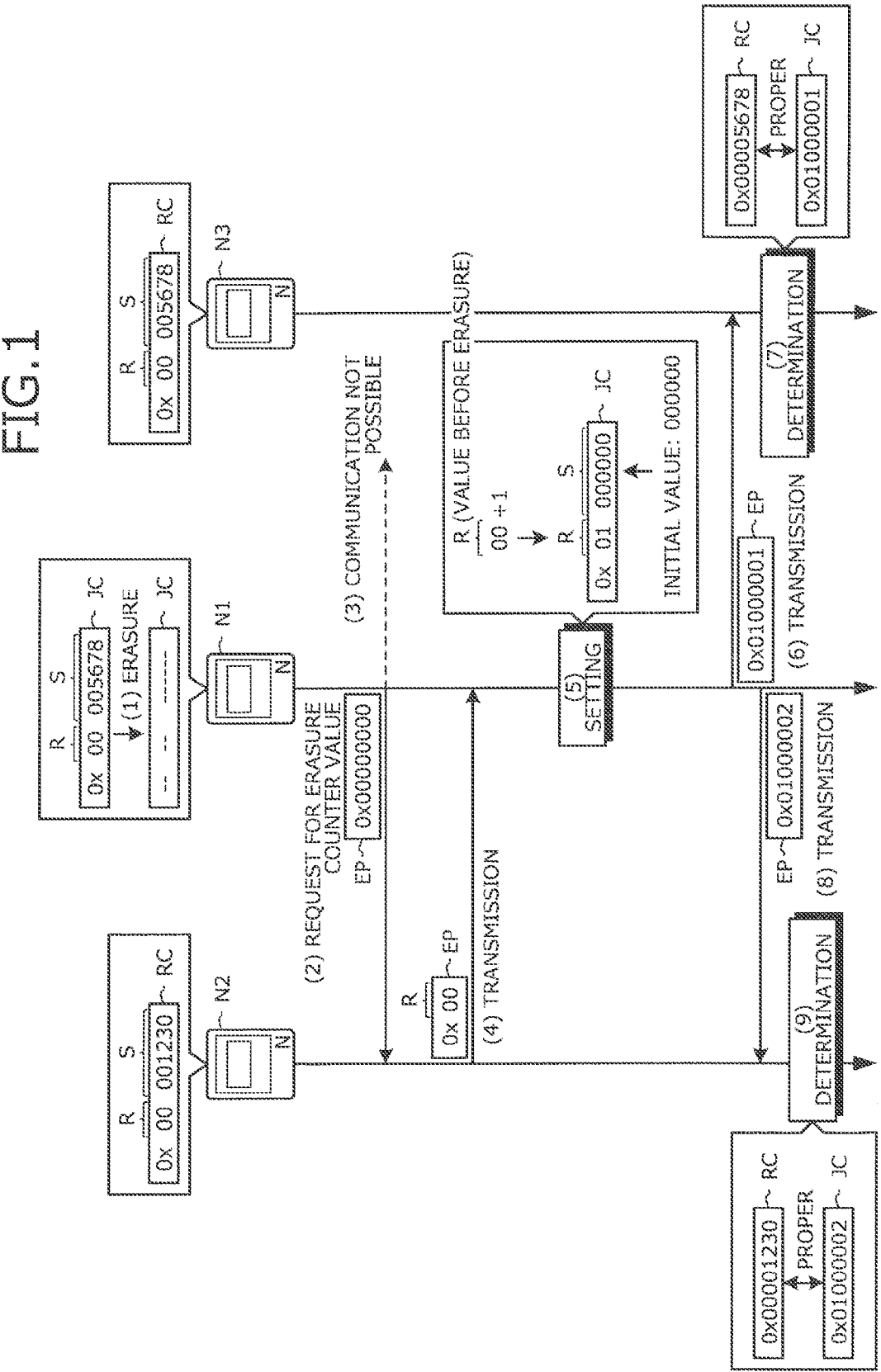
FIG. 1 is an explanatory diagram of an example of a recovery process executed by a node to recover in an ad-hoc network.

FIG. 1 is an explanatory diagram of an example of a recovery process executed by a node to recover in the ad-hoc network. In FIG. 1, nodes N1, N2, and N3, are neighboring nodes N that are each present in the communication coverage of one another. The nodes N1, N2, and N3, each retain a common key that is shared among the nodes N in the ad-hoc network (hereinafter, referred to as "fixed key") or a common key that is updated at constant intervals, among the nodes N in the ad-hoc network (hereinafter, referred to as "access key"). The nodes N1, N2, and N3, transmit and receive encrypted packets EP obtained by encrypting a packet using the fixed key or the access key.

In this example, for simplicity, it is assumed that the node N1 is a transmitting node N that transmits the encrypted packet EP to the neighboring nodes N and that the nodes N2 and N3, are receiving nodes N that each receive the encrypted packet EP from the neighboring nodes N.

The node N1 retains a concatenated counter value JC. The "concatenated counter value JC" is a counter value obtained by concatenating the counter value for higher order digits and that for lower order digits with each other. The "counter value for the lower order digits" is a transmission counter value S that indicates the number of transmission sessions of the encrypted packets EP executed so far by the node N1. The "counter value for the higher order digits" is an erasure counter value R that indicates the number of erasure sessions of the concatenated counter value JC at the node N1. In the example of FIG. 1, the node N1 retains the concatenated counter value JC "0x00005678" obtained by concatenating the erasure counter value R "0x00" and the transmission counter value S "0x005678" with each other. "0x" indicates hexadecimal notation.

The node N1 adds one to the concatenated counter value JC when a transmission event of data addressed to another node N is present. The node N1 generates a packet that includes data addressed to the other node N (for example, the node N2 or N3) and the concatenated counter value JC after the addition, and transmits to the other node N, an encrypted packet EP obtained by encrypting the generated packet.

When the node N1 detects that the concatenated counter value JC is erased, the node N1 transmits an acquisition request for the erasure counter value R to the other node N. As a result of the transmission of the acquisition request, the node N1 receives from the other node N, the erasure counter value R of the concatenated counter value JC before the erasure, and generates a concatenated counter value JC obtained by concatenating with each other the erasure counter value R after the addition obtained by adding one to the received erasure counter value R, and the initial value of the transmission counter value S. In this case, the erasure counter value R corresponds to the higher order digits and therefore, the new concatenated counter value JC generated from the erasure counter value R after the addition obtained by adding one to the erasure counter value R before the erasure is greater than the concatenated counter value JC before the erasure regardless of the magnitude of the transmission counter value S.

The nodes N2 and N3, each receive the encrypted packet EP from the other node N (for example, the node N1), each extracts from the packet, the concatenated counter value JC at the other node N by decrypting the received encrypted packet EP, and each retains the extracted concatenated counter value JC as a reception counter value RC.

In the example depicted in FIG. 1, the node N2 retains as the reception counter value RC, a concatenated counter value JC "0x00001230" extracted by decrypting the encrypted packet EP received from the node N1 in the past; and the node N3, retains as the reception counter value RC a concatenated counter value JC "0x00005678" extracted by decrypting the encrypted packet EP received from the node N1 in the past.

After the node N1 adds one to the concatenated counter value JC for each transmission session and the erasure of the concatenated counter value JC, the node N1 generates a new concatenated counter value whose value becomes greater than the concatenated counter value before the erasure. Therefore, as far as the nodes N2 and N3 continue to receive the proper packets from the node N1, the concatenated counter value JC included in the encrypted packet EP received in the current session is greater than the concatenated counter value JC included in the encrypted packet EP received in the previous session. As described, the concatenated counter value JC included in the encrypted packet EP received in the previous session is retained as the reception counter value RC. On the other hand, if the node N receives an unauthorized packet by a replay attack, the concatenated counter value JC included in the packet received by the node N in the current session is less than or equal to the reception counter value RC because the packet transmitted in the past is transmitted as is in a replay attack.

Therefore, when the concatenated counter value JC included in the encrypted packet EP received in the current session is greater than the reception counter value RC, the nodes N2 and N3, each determines that the encrypted packet EP is a proper packet. On the other hand, when the concatenated counter value JC included in the encrypted packet EP received in the current session is less than or equal to the reception counter value RC, the nodes N2 and N3, each determines that the encrypted packet EP is an unauthorized packet.

In FIG. 1, it is assumed that no electric power is supplied to the node N1 due to a power failure and the concatenated counter value JC "0x00005678" retained by the node N1 is erased. Therefore, the concatenated counter value JC to be included in the packet to be transmitted to the other node N (for example, the nodes N2 or N3) becomes unknown and therefore, the node N1 cannot transmit the packet to the others node N.

(1) When the power failure is recovered and the supply of the power is started, the node N1 first detects that the concatenated counter value JC has been erased.

(2) When the node N1 detects that the concatenated counter value JC has been erased, the node N1 generates a packet that includes an acquisition request for the reception counter value R; uses the fixed key to encrypt the generated packet; and transmits to the other node N, the resulting encrypted packet EP including the acquisition request. In the example of FIG. 1, the node N1 successfully transmits to the node N2, the encrypted packet EP that includes the acquisition request.

(3) However, the node N1 is unable to communicate with the node N3, and has not yet successfully transmitted to the node N3, the encrypted packet EP including the acquisition request. A factor causing the node N1 to be unable to communicate with the node N3, may be, for example, the presence of an obstacle between the nodes N1 and N3.

(4) When the node N2 receives the encrypted packet EP from the node N1, the node N2 decrypts the received encrypted packet EP using the fixed key. When the node N2 detects that the packet obtained by the decryption includes the acquisition request, the node N2 extracts the erasure counter value R "0x00" from the reception counter value RC "0x00001230", generates a packet that includes the extracted erasure counter value R "0x00", uses the fixed key to encrypt the generated packet, and transmits to the node N1, the resulting encrypted packet EP.

(5) When the node N1 receives the encrypted packet EP from the node N2, the node N1 decrypts the received encrypted packet EP using the fixed key; obtains the erasure counter value R "0x00" from the packet obtained by the decryption; adds one to the obtained erasure counter value R "0x00" that represents the erasure counter value R before the erasure of the concatenated counter value JC; and generates a concatenated counter value JC "0x01000000" by concatenating with each other the erasure counter value R "0x01" after the addition and the initial value "0x000000" of the transmission counter value S.

It is assumed that the node N1 becomes communicable with the node N3. A factor causing the node N1 to become communicable with the node N3, may be, for example, the disappearance of the obstacle present between the nodes N1 and N3, consequent to the movement of the obstacle.

(6) When a transmission event occurs for data addressed to the node N3, the node N1 adds one to the concatenated counter value JC "0x01000000"; generates a packet that includes the data addressed to the node N3, and the concatenated counter value JC "0x01000001" after the addition; uses the fixed key to encrypt the generated packet; and transmits the resulting encrypted packet EP to the node N3, which is the addressee of the data.

(7) When the node N3, receives the encrypted packet EP from the node N1, the node N3, determines the validity of the received encrypted packet EP. For example, the node N3, decrypts the received encrypted packet EP using the fixed key; obtains the concatenated counter value JC "0x01000001" from the packet obtained by the decryption; and compares the magnitudes of the reception counter value RC "0x00005678" indicating the concatenated counter value JC included in the encrypted packet EP received in the previous session and the obtained concatenated counter value JC "0x01000001".

The obtained concatenated counter value JC is greater than the reception counter value RC and therefore, the node N3, determines that the received encrypted packet EP is a proper packet, and updates the reception counter value RC "0x00005678" to the obtained concatenated counter value JC "0x01000001".

(8) When a transmission event occurs for data addressed to the node N2, the node N1 adds one to the concatenated counter value JC "0x01000001"; generates a packet that includes the data addressed to the node N2 and the concatenated counter value JC "0x01000002" after the addition; encrypts the generated packet using the fixed key; and transmits the encrypted packet EP obtained by the encryption to the node N2, which is the addressee of the data.

(9) When the node N2 receives the encrypted packet EP from the node N1, the node N2 determines the validity of the received encrypted packet EP. For example, the node N2 uses the fixed key to decrypt the received encrypted packet EP; obtains the concatenated counter value JC "0x01000002" from the packet obtained by the decryption; and compares the magnitudes of the reception counter value RC "0x00001230" indicating the concatenated counter value JC included in the encrypted packet EP received in the previous session and the obtained concatenated counter value JC "0x01000002".

The obtained concatenated counter value JC is greater than the reception counter value RC, the node N2 determines that the received encrypted packet EP is a proper packet, and updates the reception counter value RC "0x00001230" to the obtained concatenated counter value JC "0x01000002".

In this manner, the node N1 retains the concatenated counter value JC and transmits an acquisition request to another node N when the concatenated counter value JC has been erased; and thereby, obtains from the other node N the erasure counter value R before the erasure; and generates a new concatenated counter value JC including the erasure counter value R after the addition obtained by adding one to the erasure counter value R before the erasure as the higher order digits. Thereby, the new concatenated counter value JC generated by the node N1 becomes greater than the concatenated counter value JC included in the encrypted packet EP transmitted from the node N1 in the past. Therefore, the node N1 can cause the encrypted packet EP transmitted to the other node N to include the concatenated counter value JC that is greater than the reception counter value RC retained by the other node N.

As a result, the concatenated counter value JC included in the encrypted packet EP received from the node N1 is greater than the retained reception counter value RC and therefore, the nodes N2 and N3, can each determine that the encrypted packet EP received from the node N1 is a proper packet. The nodes N do not determine that the encrypted packet EP transmitted from the node N1 thereto is an unauthorized packet and therefore, the node N1 can recover in the ad-hoc network.

When it is determined as in the conventional case whether the encrypted packet EP is an unauthorized packet using the time information, each of the nodes N has to periodically or non-periodically synchronize with the reference time through the ad-hoc network. In this case, the amount of packets for the time synchronization imposes the communication load on the ad-hoc network. On the other hand, the concatenated counter value JC is a relative value updatable only by the process at the node N itself and therefore, each node N can reduce the communication load on the ad-hoc network. Consequently, the nodes N2 and N3, can each determine whether the encrypted packet EP received from the node N1 is an unauthorized packet, by monitoring the increase of the concatenated counter value JC in the encrypted packet EP for each reception session without needing any time synchronization. Therefore, no communication load is generated on the ad-hoc network consequent to the packets for the time synchronization. The gateway to transmit the packets for the time synchronization does not need to be present in the ad-hoc network because the time synchronization is unnecessary for determining whether the encrypted packet EP is an unauthorized packet.

When the transmission counter value S becomes its maximal value "0xFFFFFF", the node N1 may return the transmission counter value S to its initial value "0x000000". In this case, the node N1 transmits to each of the nodes N2 and N3, a packet that indicates the return of the transmission counter value S to the initial value. The nodes N2 and N3, each return the transmission counter value S in the reception counter value RC to the initial value. When the erasure counter value R becomes its maximal value "0xFF", the node N1 may return the erasure counter value R to its initial value "0x00". In this case, the node N1 transmits to each of the nodes N2 and N3, a packet that indicates the return of the erasure counter value R to its initial value. The nodes N2 and N3, each return the erasure counter value R in the reception counter value RC to the initial value.

When the transmission counter value S becomes its maximal value "0xFFFFFF" and the erasure counter value R is smaller than the maximal value "0xFF" and is increasable, the node N1 may return the transmission counter value S to the initial value "0x000000" and may add one to the erasure counter value R. Thereby, the concatenated counter value JC can be updated to a value greater than the concatenated counter value JC included in the encrypted packet EP transmitted from the node N1 in the past. As a result, the other nodes N do not determine that the encrypted packet EP transmitted from the node N1 to the other node N is an unauthorized packet and therefore, the node N1 can recover in the ad-hoc network. In this case, the node N1 does not need to transmit to each of the nodes N2 and N3, the packet that indicates the return of the erasure counter value R to the initial value.

When the difference greater than or equal to a threshold value between the concatenated counter value JC included in the encrypted packet EP received from the node N1 and the reception counter value RC retained by each of the nodes N2 and N3, the nodes N2 and N3, may each determine that the received encrypted packet EP is an unauthorized packet. Thereby, in the case where an attacker rewrites the concatenated counter value JC in the encrypted packet EP transmitted from the node N1 in the past and uses this encrypted packet EP in a replay attack, when the erasure counter value R significantly changes consequent to the rewriting, the nodes N2 and N3, can each determine that the encrypted packet EP is an unauthorized packet.

FIG. 2 is a block diagram of an example of a hardware configuration of the node N according to the embodiment. In FIG. 2, the node N includes a CPU 201, RAM 202, flash memory 203, an I/F 204, and an encrypting circuit 205. The components from the CPU 201 to the encrypting circuit 205 are connected to each other by a bus 200.

The CPU 201 supervises the overall control of the node N. The RAM 202 is used as a work area of the CPU 201, is a volatile memory apparatus, and stores the concatenated counter value JC that is frequently rewritten and key information concerning the encryption key (for example, the access key). The flash memory 203 is a non-volatile memory apparatus, and stores programs and key information concerning the encryption key (for example, the fixed key). The I/F 204 transmits and receives packets using uni-hop communication or multi-hop communication.

The encrypting circuit 205 is a circuit that encrypts data using the encryption key, and is also a circuit that decrypts encrypted data using the decryption key. When the encryption and the decryption are executed by software, the flash memory 203 stores a program corresponding to the encrypting circuit 205, making the encrypting circuit 205 unnecessary.

FIG. 3 is an explanatory diagram of an example of the storage contents of a node DB. As depicted in FIG. 3, the node DB 300 has therein an access key field and a reception counter value field, respectively correlated with each node field. The node DB 300 forms a record each time the node N receives an encrypted packet EP.

The node field stores an identifier that identifies a node N in the ad-hoc network. For example, the node number can be employed as the identifier. A media access control (MAC) address or an Internet protocol (IP) address that is a network address specific to the node N may be employed as the identifier. The example depicted in FIG. 3 represents the node DB included in the node N1. The node field stores the node numbers (N2, ...) of the other nodes N.

The access key field stores the access key AK that is received from the node N identified by the identifier in the corresponding node field. The access key AK is used to encrypt the packet to be transmitted to the node N identified by the identifier in the node field. The access key AK is, for example, binary data of about 128 to 256 bits. The reception counter value field stores the concatenated counter value JC that is included in the encrypted packet EP received from the node N identified by the identifier in the node field.

Figure 4:
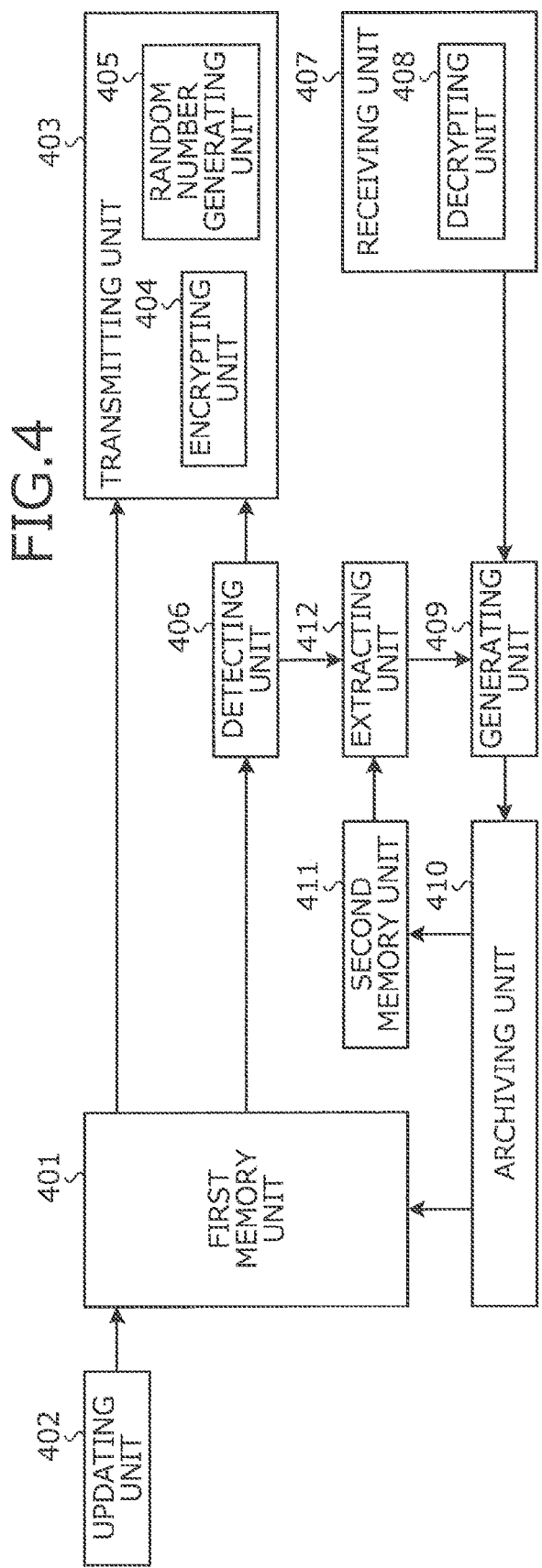
FIG. 4 is a block diagram of an example of a functional configuration of the node N as a transmitting node.
Figure 5:
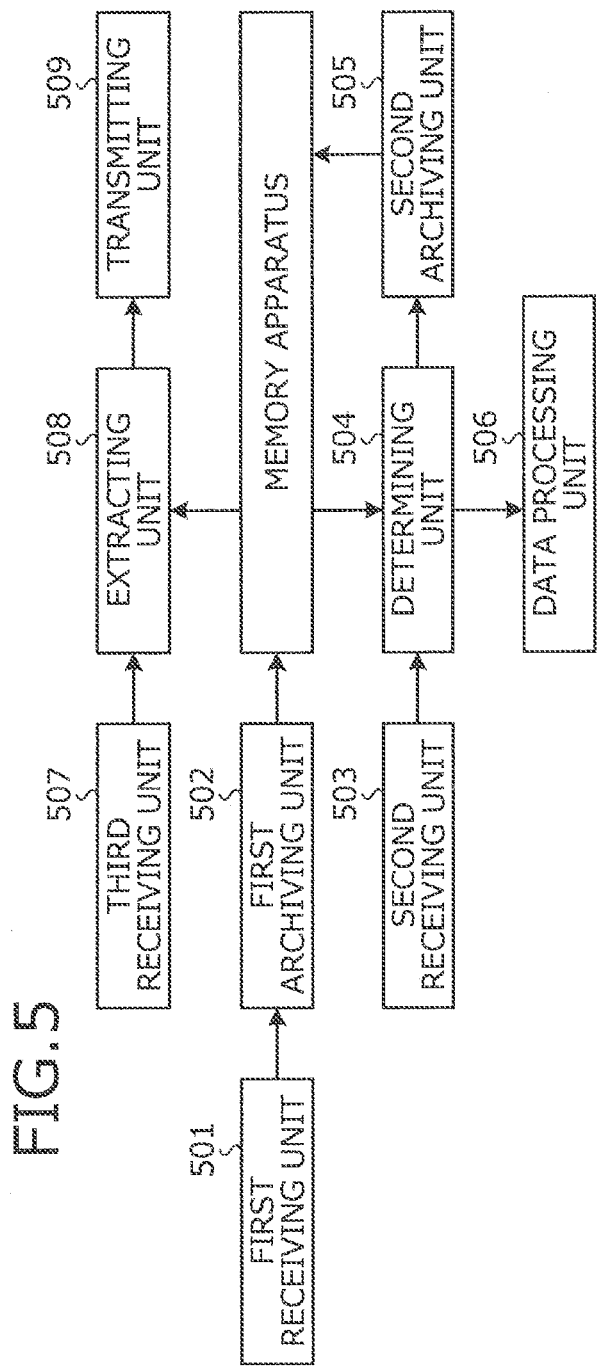
FIG. 5 is a functional block diagram of an example of a functional configuration of the node N as a receiving node.

An example of a functional configuration of the node N will be described with reference to FIGS. 4 and 5. FIG. 4 depicts an example of a functional configuration of the node N as a transmitting node. FIG. 5 depicts an example of a functional configuration of the node N as a receiving node. For convenience, the function as the receiving node and the function as the transmitting node will be described separated from each other. However, the node N has the both of the functions as the receiving and the transmitting nodes.

FIG. 4 is a block diagram of an example of a functional configuration of the node N as a transmitting node. As depicted in FIG. 4, the node N includes a first memory unit 401, an updating unit 402, a transmitting unit 403, an encrypting unit 404, a random number generating unit 405, a detecting unit 406, a receiving unit 407, a decrypting unit 408, a generating unit 409, an archiving unit 410, a second memory unit 411, and an extracting unit 412. Functions of the updating unit 402 to the archiving unit 410 and the extracting unit 412 are implemented, for example, by causing the CPU 201 to execute programs stored in the memory apparatus such as the flash memory 203, or by using the I/F 204 that are depicted in FIG. 2.

The first memory unit 401 stores the concatenated counter value JC that includes the erasure counter value R indicating the number of erasure sessions executed at the node N as higher order digits and the transmission counter value S indicating the number of transmission sessions from the node N as lower order digits. For example, a volatile memory apparatus capable of reading and writing data at a high speed is employed as the first memory unit 401 storing the concatenated counter value JC that is frequently rewritten. The first memory unit 401 is, for example, the RAM 202. For example, in FIG. 1, the first memory unit 401 (the RAM 202) of the node N1 stores therein the concatenated counter value JC "0x00005678".

The updating unit 402 adds one to the transmission counter value S of the concatenated counter value JC stored in the first memory unit 401 when the node N transmits data to another node N in the ad-hoc network. For example, when the node N is an electric power consumption meter installed in a house, the "data" is the power consumption of the house. Execution of the transmission of the data is triggered by the occurrence of a transmission event. The transmission event occurs due to, for example, reception of an input of data addressed to another node N from the user of the node N. The node N may cause the transmission event to automatically occur at constant intervals.

For example, when a transmission event is detected of data addressed to another node N in the ad-hoc network, the updating unit 402 adds one to the concatenated counter value JC stored in the RAM 202. Thereby, the updating unit 402 can update the transmission counter value S of the concatenated counter value JC stored in the RAM 202 to the latest transmission counter value S. For example, in (6) of FIG. 1, prior to the transmission, the updating unit 402 of the node N1 updates the concatenated counter value JC "0x01000000" to the concatenated counter value JC "0x01000001" by adding one to the concatenated counter value JC "0x01000000".

The transmitting unit 403 transmits the data and the concatenated counter value JC after the updating by the updating unit 402, to another node N. For example, the transmitting unit 403 generates a packet that includes the data addressed to the other node N and the concatenated counter value JC after the updating by the updating unit 402, and transmits the generated packet to the other node N that is the addressee of the data. The packet may include the identifier identifying the node N that is the transmission source. In this case, the transmitting unit 403 transmits the generated packet to the other node N using unicast transmission. For example, in (6) of FIG. 1, the transmitting unit 403 of the node N1 transmits the encrypted packet. However, the transmission unit 403 may transmit to the node N3, a packet not encrypted and including the concatenated counter value JC "0x01000001".

The unicast transmission of the packet to the other node N is realized by the following: the transmitting unit 403 distributes the packet to the neighboring nodes N; the neighboring nodes N excluding the other node N that is the addressee each discard the received packet; and the other node N that is the addressee executes a process according to the content of the received packet. The process can be, for example, storing the packet to the RAM 202 or the flash memory 203. Thereby, the transmitting unit 403 can transmit to the other node N, the packet including the concatenated counter value JC to be used for determining validity. For example, in (6) of FIG. 1, the transmitting unit 403 of the node N1 transmits the encrypted packet EP addressed to the node N3, to each of the nodes N2 and N3, that are the neighboring nodes. The node N2 discards the received encrypted packet EP because the node N2 is not the addressee. The node N3, executes a process according to the content of the received encrypted packet EP.

The transmitting unit 403 includes the encrypting unit 404 and the random number generating unit 405. Using the common key retained by the node N and the other node N, the encrypting unit 404 encrypts the data and the concatenated counter value JC after the updating by the updating unit 402. The "common key retained by the node N and the other node N" may be, for example, the common key shared among the nodes N in the ad-hoc network (the fixed key) or may be a common key updated at constant intervals among the nodes N (the access key AK).

The access key AK updated at constant intervals is more ensure than the fixed key and therefore, when the access key AK is retained, the access key AK is used for the encryption by the encrypting unit 404. On the other hand, if the access key AK is not retained, the fixed key is used for the encryption by the encrypting unit 404. For example, in FIG. 1, when no electric power is supplied to the node N1 due to power failure and therefore, the access key AK stored in the RAM 202 is erased and the fixed key remains stored in the flash memory 203, the fixed key is used for the encryption by the encrypting unit 404.

For example, the encrypting unit 404, using the fixed key or the access key AK, encrypts the data in the packet generated by the transmitting unit 403 and addressed to the other node N and the concatenated counter value JC after the updating by the updating unit 402. For example, in (6) or (8) of FIG. 1, the encrypting unit 404 of the node N1 encrypts the packet including the concatenated counter value JC using the fixed key. In this case, a portion not encrypted in the packet (for example, the header portion of the packet) may include the identifier identifying the node N1, which is the transmission source.

In this case, the transmitting unit 403 transmits to the other node N that is the addressee of the data, the encrypted packet EP obtained by the encryption by the encrypting unit 404. Thereby, the transmitting unit 403 can transmit to the other node N the packet including the concatenated counter value JC to be used in determining the validity. The transmitting unit 403 transmits the encrypted packet EP obtained by the encryption and therefore, the security of the communication can be ensured. For example, in (6) of FIG. 1, the transmitting unit 403 of the node N1 transmits to the node N3, the encrypted packet EP including the concatenated counter value JC "0x01000001". In (8) of FIG. 1, the transmitting unit 403 transmits to the node N2, the encrypted packet EP including the concatenated counter value JC "0x01000002".

The random number generating unit 405 generates a random number to be first identification information. The "first identification information" is a temporary random number generated for each communication session. The random number generating unit 405 generates the random number using, for example, a hardware random number generating device. The generated random number is stored in, for example, a storage area such as the RAM 202. For example, in (2) of FIG. 1, no random number is generated. However, the random number generating unit 405 of the node N1 may generate a random number.

The detecting unit 406 detects the erasure of the concatenated counter value JC in the first memory unit 401. For example, when no electric power is supplied to the node N due to the power failure and the concatenated counter value JC stored in the first memory unit 401 is erased, the detecting unit 406 detects the erasure of the concatenated counter value JC after the power failure is recovered and the supply of the electric power to the node N is started. For example, the detecting unit 406 detects that the storage contents of the storage area set in the storage destination of the concatenated counter value JC has changed to "0x00000000" by an initialization process executed when the electric power is supplied.

The detecting unit 406 may detect that the concatenated counter value JC stored in the first memory unit 401 has been initialized by an operation of the user of the node N. Thereby, the detecting unit 406 can detect that the concatenated counter value JC to be included in the packet to be transmitted thereafter has become unknown, and can cause a trigger to be generated to start a recovery process to recover in the ad-hoc network. For example, in (1) of FIG. 1, the detecting unit 406 of the node N1 detects the erasure of the concatenated counter value JC.

When the detecting unit 406 detects the erasure of the concatenated counter value JC, the concatenated counter value JC for the other node N to determine that the encrypted packet EP is a proper packet is not known and therefore, the concatenated counter value JC needs to be restored. Methods of restoring the concatenated counter value JC can be, for example, three methods as follows.

A first restoration method is a method of restoring the concatenated counter value JC by transmitting to the other node N, an acquisition request for the erasure counter value R. A second restoration method is a method of restoring the concatenated counter value JC by transmitting not an acquisition request but an updating request to request acquisition of the erasure counter value R after the addition obtained by adding one to the erasure counter value R. A third restoration method is a method of restoring the concatenated counter value JC by reading the erasure counter value R by storing the erasure counter value R not in the volatile memory but in the non-volatile second memory unit 411. The first restoration method will be described below, and the second and the third restoration methods will be described later.

According to the first restoration method, when the detecting unit 406 detects the erasure, the transmitting unit 403 distributes the acquisition request for the erasure counter value R in the ad-hoc network. The "acquisition request" is a request to cause the other node N to extract the erasure counter value R from the reception counter value RC retained by the other node N and indicating the transmission counter value S transmitted by the node N in the past, and to transmit the extracted erasure counter value R to the node N.

For example, the transmitting unit 403 generates a packet including the acquisition request and transmits the generated packet to the other node N. The packet may include an identifier that identifies the node N as the transmission source. For example, in (2) of FIG. 1, the transmitting unit 403 of the node N1 transmits to the node N2, the encrypted packet EP including the acquisition request. However, the transmitting unit 403 may transmit the packet including the acquisition request and not encrypted. Thereby, the transmitting unit 403 can supply to the other node N, a trigger to transmit the erasure counter value R to the node N that is the acquisition request source.

To ensure the security of the communication, the packet transmitted by the transmitting unit 403 may be encrypted. To ensure the security of the communication, the packet transmitted by the transmitting unit 403 may be encrypted after further including temporary identification information. The "temporary identification information" is, for example, a random number generated by the random number generating unit 405. A case will first be described where the packet to be transmitted by the transmitting unit 403 is encrypted.

In this case, for example, the encrypting unit 404 encrypts the acquisition request in the packet generated by the transmitting unit 403, using the fixed key or the access key AK. For example, in (2) of FIG. 1, the encrypting unit 404 of the node N1 uses the fixed key to encrypt the packet including the acquisition request. In this case, a portion not encrypted in the packet (for example, the header portion of the packet) may include the identifier identifying the node N that is the transmission source.

The transmitting unit 403 distributes in the ad-hoc network, the acquisition request encrypted by the encrypting unit 404. For example, the transmitting unit 403 transmits to the other node N, the encrypted packet EP that includes the acquisition request obtained by the encryption by the encrypting unit 404. For example, in (2) of FIG. 1, the transmitting unit 403 of the node N1 transmits to the node N2, the encrypted packet EP including the acquisition request. The transmitting unit 403 may transmit the encrypted packet EP to the neighboring nodes N using multicast transmission or may transmit the encrypted packet EP to the other node N using unicast transmission.

Thus, the transmitting unit 403 can supply to the other node N, a trigger to transmit the erasure counter value R to the node N that is the acquisition request source. The transmitting unit 403 transmits the encrypted packet EP obtained by the encryption and therefore, the security of the communication can be ensured.

A case will be described where, to ensure the security of the communication, the packet transmitted by the transmitting unit 403 is encrypted after further including temporary identification information. In this case, the transmitting unit 403 generates a packet that includes the acquisition request and the random number generated by the random number generating unit 405. For example, in (2) of FIG. 1, the packet including the acquisition request is generated. However, the transmitting unit 403 of the node N1 may generate a packet that includes the random number and the acquisition request.

In this case, the encrypting unit 404 encrypts the acquisition request that includes the first identification information specific to the node N, using the common key retained by the node N and the other node N. For example, using the fixed key or the access key AK, the encrypting unit 404 encrypts the packet that includes the acquisition request and the random number and is generated by the transmitting unit 403. For example, in (2) of FIG. 1, the packet including the acquisition request is encrypted. However, the encrypting unit 404 of the node N1 may encrypt the packet including the acquisition request and the random number, using the fixed key.

In this case, the transmitting unit 403 transmits to the other node the encrypted packet EP obtained by the encryption by the encrypting unit 404. For example, in (2) of FIG. 1, the encrypted packet EP including the acquisition request is transmitted. However, the transmitting unit 403 of the node N1 may transmit the encrypted packet EP including the random number and the acquisition request.

The process steps from the acquisition of the erasure counter value R consequent to the acquisition request, to the restoration of the concatenated counter value JC, will be described later.

The receiving unit 407 receives the data transmitted from the other node N. For example, the receiving unit 407 receives from the other node N, a response to the request transmitted by the transmitting unit 403 (for example, the acquisition request). For example, the transmitting unit 403 distributes the acquisition request and as a result, the receiving unit 407 receives the erasure counter value R from the ad-hoc network. Thereby, the receiving unit 407 can obtain the erasure counter value R that is before the erasure and that is used in the generation of a new concatenated counter value JC.

The receiving unit 407 includes the decrypting unit 408. The decrypting unit 408 decrypts using the common key the data encrypted using the common key, and decrypts using the access key AK the data encrypted using the access key AK.

To ensure the security of the communication, the packet including the erasure counter value R received by the receiving unit 407 may already be encrypted. In this case, using the common key, the decrypting unit 408 decrypts the encrypted packet EP that includes the erasure counter value R received by the receiving unit 407.

In this case, the receiving unit 407 obtains the erasure counter value R from the packet obtained by the decryption by the decrypting unit 408. Thereby, the receiving unit 407 can obtain the erasure counter value R that is before the erasure and that is to be used in the generation of the new concatenated counter value JC. For example, in (5) of FIG. 1, the receiving unit 407 of the node N1 receives from the node N2 the encrypted packet EP including the erasure counter value R "0x00". The packet obtained by the decryption is stored in, for example, a storage area such as the RAM 202.

The transmitting unit 403 transmits the encrypted packet EP including the first identification information and as a result, the receiving unit 407 receives from the ad-hoc network the erasure counter value R and second identification information that are encrypted using the common key. The "second identification information" is data generated by the node N that receives the encrypted packet EP including the first identification information, transmitted by the transmitting unit 403, and the first identification information is used as it is as the second identification information. The second identification information is, for example, a random number.

For example, the transmitting unit 403 distributes the acquisition request and as a result, the receiving unit 407 receives the encrypted packet EP that includes the erasure counter value R and the random number that are encrypted using the fixed key. In this case, a portion not encrypted in the encrypted packet EP (for example, the header portion of the encrypted packet EP) may include the identifier identifying the other node N that is the transmission source.

For example, in (5) of FIG. 1, the receiving unit 407 receives the encrypted packet EP including the erasure counter value R "0x00". However, the receiving unit 407 of the node N1 may receive the encrypted packet EP including the erasure counter value R "0x00" and the random number. The received encrypted packet EP is stored in, for example, a storage area such as the RAM 202.

In this case, for example, using the common key, the decrypting unit 408 decrypts the encrypted packet EP that includes the erasure counter value R and the second identification information and that is received by the receiving unit 407. The receiving unit 407 obtains the erasure counter value R and the second identification information from the packet obtained by the decryption by the decrypting unit 408. For example, in (5) of FIG. 1, the encrypted packet EP that includes the erasure counter value R is decrypted. However, the decrypting unit 408 of the node N1 may decrypt the encrypted packet EP that includes the erasure counter value R and the random number, and may obtain the erasure counter value R and the random number from the packet obtained by the decryption.

Thereby, the receiving unit 407 can obtain the erasure counter value R that is before the erasure and that is used in the generation of the new concatenated counter value JC, and can obtain the second identification information to be used in the determining the validity of the received packet by determining coincidence with the first identification information. The packet obtained by the decryption is stored in, for example, a storage area such as the RAM 202.

The generating unit 409 generates the concatenated counter value JC including: the erasure counter value R after the addition obtained by adding one to the erasure counter value R received by the receiving unit 407, as the higher order digits, and the transmission counter value S after the erasure indicating that the number of transmission session becomes zero due to the erasure, as the lower order digits. For example, the generating unit 409 generates the concatenated counter value JC including: the erasure counter value R after the addition obtained by adding one to the erasure counter value R received by the receiving unit 407, as the higher order digits, and the initial value of the transmission counter value S, as the lower order digits.

For example, in (5) of FIG. 1, the generating unit 409 of the node N1 generates the concatenated counter value JC "0x01000000" obtained by concatenating the erasure counter value R "0x01" after the addition obtained by adding one to the received erasure counter value R and the initial value "0x000000" of the transmission counter value S. Thereby, the generating unit 409 can generate a concatenated counter value JC that is greater than the concatenated counter value JC before the erasure and that is to be included in each of the packets transmitted thereafter.

In this case, the generating unit 409 checks the coincidence between the first identification information, and the second identification information decrypted by the decrypting unit 408. If the generating unit 409 determines coincidence therebetween, the generating unit 409 generates the concatenated counter value JC including: the erasure counter value R after the addition obtained by adding one to the erasure counter value R decrypted by the decrypting unit 408 as the higher order digits, and the transmission counter value S after the erasure indicating that the number of transmission session becomes zero due to the erasure as the lower order digits.

For example, the generating unit 409 checks for coincidence between the random number stored in the RAM 202 and the random number obtained by the receiving unit 407. If the generating unit 409 determines coincidence therebetween, the generating unit 409 generates the concatenated counter value JC including: the erasure counter value R after the addition obtained by adding one to the erasure counter value R obtained by the receiving unit 407 as the higher order digits, and the initial value of the transmission counter value S as the lower order digits. For example, in (5) of FIG. 1, the determination of the validity of the encrypted packet EP is not executed using the random number. However, the generating unit 409 of the node N1 may determine whether the encrypted packet EP is an unauthorized packet based on the coincidence determination between the random number included in the transmitted encrypted packet EP and the received random number. Thereby, the generating unit 409 can generate a concatenated counter value JC that is greater than the concatenated counter value JC before the erasure and that is to be included in each of the packets transmitted thereafter.

The archiving unit 410 archives to the first memory unit 401, the concatenated counter value JC generated by the generating unit 409. For example, the archiving unit 410 archives to the RAM 202, the concatenated counter value JC generated by the generating unit 409 instead of the erased concatenated counter value JC. For example, in (5) of FIG. 1, the archiving unit 410 of the node N1 archives the generated concatenated counter value JC "0x01000000" instead of the erased concatenated counter value JC.

The second memory unit 411 stores the erasure counter value R. For example, a non-volatile memory apparatus is employed as the second memory unit 411. The second memory unit 411 is, for example, the flash memory 203. For example, in FIG. 1, the concatenated counter value JC alone is stored. However, the second memory unit 411 of the node N1 may store the erasure counter value R separately from the concatenated counter value JC. Thereby, the second memory unit 411 can store the erasure counter value R even when no electric power is supplied to the node N.

When the detecting unit 406 detects an erasure, the extracting unit 412 extracts the erasure counter value R from the second memory unit 411. For example, the extracting unit 412 reads the erasure counter value R from the flash memory 203 when the detecting unit 406 detects the erasure. For example, in FIG. 1, the erasure counter value R is obtained from the other node N. However, the extracting unit 412 of the node N1 may extract the erasure counter value R from the flash memory 203 in the node N1. Thereby, the extracting unit 412 can extract the erasure counter value R that is from before the erasure. The extracted erasure counter value R is stored in, for example, a storage area such as the RAM 202.

The second restoration method will be described. The second restoration method: is a method of restoring the concatenated counter value JC by transmitting not an acquisition request but an updating request requesting acquisition of the erasure counter value R after the addition obtained by adding one to the erasure counter value R; and is executed by the transmitting unit 403, the encrypting unit 404, the random number generating unit 405, the receiving unit 407, the decrypting unit 408, the generating unit 409, and the archiving unit 410.

For example, when the detecting unit 406 detects the erasure, the transmitting unit 403 distributes in the ad-hoc network, the updating request for the erasure counter value R. The "updating request": is a request to cause the other node N to extract the erasure counter value R from the reception counter value RC indicating the transmission counter value S transmitted by the node N1 in the past; and is also a request to cause the other node N to transmit the erasure counter value R after the addition obtained by adding one to the extracted erasure counter value R, to the node N.

The transmitting unit 403 generates, for example, a packet that includes the updating request and transmits the generated packet to the other node N. In this case, the packet may include the identifier identifying the node N that is the transmission source. For example, in (2) of FIG. 1, the packet including the acquisition request is generated. However, the transmitting unit 403 of the node N1 may generate a packet including not the acquisition request but the updating request. In (2) of FIG. 1, the encrypted packet EP is transmitted to the node N2. However, the transmitting unit 403 of the node N1 may transmit to the node N2, a packet not encrypted and including the updating request. Thereby, the transmitting unit 403 can supply to the other node N, a trigger to transmit to the node N that is the updating request source, the erasure counter value R after the addition obtained by adding one to the erasure counter value R.

To ensure the security of the communication, the packet to be transmitted by the transmitting unit 403 may be encrypted. The packet to be transmitted by the transmitting unit 403 may be encrypted after further including the temporary identification information. A case will be described where the packet to be transmitted by the transmitting unit 403 is encrypted.

In this case, the encrypting unit 404 encrypts the updating request using the common key retained by the node N and the other nodes N. For example, the encrypting unit 404 encrypts the packet including the updating request generated by the transmitting unit 403, using the fixed key or the access key AK. For example, in (2) of FIG. 1, the packet including the acquisition request is encrypted. However, the encrypting unit 404 of the node N1 may encrypt the packet that includes the updating request and the random number.

The transmitting unit 403 distributes in the ad-hoc network, the updating request encrypted by the encrypting unit 404. For example, the transmitting unit 403 transmits to the other node N, the encrypted packet EP that includes the updating request obtained by the encryption by the encrypting unit 404. The transmitting unit 403 may transmit the encrypted packet EP to the neighboring nodes N using multicast transmission or may transmit the encrypted packet EP to the other node N using unicast transmission. For example, in (2) of FIG. 1, the encrypted packet EP including the acquisition request is transmitted. However, the transmitting unit 403 of the node N1 may transmit to the node N2 the encrypted packet EP that includes the updating request.

Thus, the transmitting unit 403: can supply to the other node N, a trigger to transmit to the node N that is the updating request source, the erasure counter value R after the addition obtained by adding one to the erasure counter value R; and can ensure the security of the communication because the transmitting unit 403 transmits the encrypted packet EP obtained by the encryption.

In this case, the transmitting unit 403 distributes the updating request and as a result, the receiving unit 407 receives from the ad-hoc network, the erasure counter value R after the addition obtained by adding one to the erasure counter value R. For example, the receiving unit 407 receives the encrypted packet EP that includes the erasure counter value R after the addition as the result of the distribution of the updating request by the transmitting unit 403. In this case, a portion not encrypted in the encrypted packet EP (for example, the header portion of the encrypted packet EP) may include the identifier identifying the other node N that is the transmission source. The received encrypted packet EP is stored in, for example, a storage area such as the RAM 202. For example, in (4) of FIG. 1, the receiving unit 407 receives the encrypted packet EP including the erasure counter value R "0x00". However, the receiving unit 407 of the node N1 may receive the encrypted packet EP that includes the erasure counter value R "0x01" after the addition.

In this case, for example, the decrypting unit 408 decrypts using the common key the encrypted packet EP that includes the erasure counter value R after the addition received by the receiving unit 407. The receiving unit 407 obtains the erasure counter value R from the packet obtained by the decryption by the decrypting unit 408. Thereby, the receiving unit 407 can obtain the erasure counter value R after the addition obtained by adding one to the erasure counter value R that is before the erasure and to be used in the generation of the new concatenated counter value JC.

The packet obtained by the decryption is stored in, for example, a storage area such as the RAM 202. For example, in (4) of FIG. 1, the encrypted packet EP including the erasure counter value R "0x00" is decrypted. However, the decrypting unit 408 of the node N1 may decrypt the encrypted packet EP that includes the erasure counter value R "0x01" after the addition. The receiving unit 407 of the node N1 obtains the erasure counter value R after the addition in the decrypted packet.

In this case, the generating unit 409 generates the concatenated counter value JC that includes the erasure counter value R after the addition received by the receiving unit 407 as the higher order digits, and the transmission counter value S after the erasure indicating that the number of transmission session becomes zero due to the erasure as the lower order digits.

For example, the generating unit 409 generates the concatenated counter value JC that includes the erasure counter value R after the addition obtained by the receiving unit 407 as the higher order digits, and the initial value of the transmission counter value S as the lower order digits. For example, in (5) of FIG. 1, the concatenated counter value is generated using the erasure counter value R "0x01" after the addition obtained by adding one to the received erasure counter value R "0x00". However, the generating unit 409 of the node N1 may generate the concatenated counter value using the received erasure counter value R "0x01" after the addition. Thereby, the generating unit 409 can generate a concatenated counter value JC that is greater than the concatenated counter value JC before the erasure and to be included in each of the packets transmitted thereafter. The generated concatenated counter value JC is stored in, for example, a storage area such as the RAM 202.

In this case, the archiving unit 410 archives to the first memory unit 401, the concatenated counter value JC generated by the generating unit 409. For example, the archiving unit 410 archives to the RAM 202, the concatenated counter value JC generated by the generating unit 409 instead of the erased concatenated counter value JC.

As described, the packet to be transmitted by the transmitting unit 403 may be encrypted and may further include the temporary identification information. A case will be described where the packet to be transmitted by the transmitting unit 403 and including the temporary identification information is encrypted.

In this case, the transmitting unit 403 generates a packet that includes the random number to be the temporary identification information generated by the random number generating unit 405, and the updating request. For example, in (2) of FIG. 1, the packet including the acquisition request is generated. However, the transmitting unit 403 of the node N1 may generate a packet that includes the random number and the updating request.

The encrypting unit 404 encrypts the updating request including the first identification information specific to the node N using the common key retained by the node N and the other node N. For example, the encrypting unit 404 encrypts the packet including the updating request and the random number generated by the transmitting unit 403, using the fixed key or the access key AK. For example, in (2) of FIG. 1, the packet including the acquisition request is encrypted. However, the encrypting unit 404 of the node N1 may encrypt the packet that includes the random number and the updating request.

The transmitting unit 403 transmits to the other node N, the encrypted packet EP obtained by the encryption by the encrypting unit 404. For example, in (2) of FIG. 1, the encrypted packet EP including the acquisition request is transmitted. However, the transmitting unit 403 of the node N1 may transmit the encrypted packet EP including the random number and the updating request.

Thereby, the transmitting unit 403: can supply to the other node N, a trigger to transmit to the node N that is the updating request source, the erasure counter value R after the addition obtained by adding one to the erasure counter value R; can ensure the security of the communication because the encrypted packet EP obtained by the encryption is transmitted; and can ensure the security of the communication by causing the packet to be transmitted to include the temporary identification information.

In this case, the receiving unit 407 receives from the ad-hoc network, the erasure counter value R after the addition and the second identification information that are encrypted using the common key. For example, the transmitting unit 403 distributes the updating request and as a result, the receiving unit 407 receives the encrypted packet EP that includes the erasure counter value R after the addition and the random number that are encrypted using the fixed key. In this case, a portion not encrypted in the encrypted packet EP (for example, the header portion of the encrypted packet EP) may include the identifier identifying the other node N that is the transmission source. For example, in (5) of FIG. 1, the receiving unit 407 receives the encrypted packet EP including the erasure counter value R "0x00". However, the receiving unit 407 of the node N1 may receive the encrypted packet EP that includes the erasure counter value R "0x01" after the addition and the random number. The received encrypted packet EP is stored in, for example, a storage area such as the RAM 202.

In this case, for example, using the common key, the decrypting unit 408 decrypts the encrypted packet EP that includes the erasure counter value R after the addition and the second identification information and that is received by the receiving unit 407. The receiving unit 407 obtains the erasure counter value R after the addition and the second identification information from the packet obtained by the decryption by the decrypting unit 408. For example, in (5) of FIG. 1, the encrypted packet EP including the erasure counter value R is decrypted. However, the decrypting unit 408 of the node N1 may decrypt the encrypted packet EP that includes the erasure counter value R after the addition and the random number, and may obtain the erasure counter value R "0x01" after the addition and the random number from the packet obtained by the decryption.

Thereby, the receiving unit 407 can obtain the erasure counter value R that is after the addition obtained by adding one to the erasure counter value R before the erasure and that is to be used in the generation of the new concatenated counter value JC, and can obtain the second identification information to be used in the determining the validity of the received packet based on the determination of coincidence with the first identification information. The packet obtained by the decryption is stored in, for example, a storage area such as the RAM 202.

In this case, the generating unit 409 checks for coincidence between the first identification information and the second identification information decrypted by the decrypting unit 408. If the generating unit 409 determines coincidence therebetween, the generating unit 409 generates the concatenated counter value JC including the erasure counter value R after the addition decrypted by the decrypting unit 408 as the higher order digits, and the transmission counter value S after the erasure indicating that the number of transmission session becomes zero due to the erasure as the lower order digits.

In this case, for example, the generating unit 409 checks for coincidence between the random number stored in the RAM 202 and the random number obtained by the receiving unit 407. If the generating unit 409 determines coincidence therebetween, the generating unit 409 generates the concatenated counter value JC including the erasure counter value R after the addition and received by the receiving unit 407 as the higher order digits, and the initial value of the transmission counter value S as the lower order digits.

For example, in (5) of FIG. 1, no determination is executed as to the validity of the encrypted packet EP using the random number. However, the generating unit 409 of the node N1 may check for coincidence between the random number included in the received encrypted packet EP and the retained random number. If the generating unit 409 determines coincidence therebetween, the generating unit 409 determines that the encrypted packet EP is a proper packet, and generates the concatenated counter value JC "0x01000000" by concatenating the received erasure counter value R "0x01" and the initial value "0x000000" of the transmission counter value S.

Thereby, the generating unit 409 can generate a concatenated counter value JC that is greater than the concatenated counter value JC before the erasure and that is to be included in each of the packets transmitted thereafter. The generated concatenated counter value JC is stored in, for example, a storage area such as the RAM 202.

In this case, the archiving unit 410 archives to the first memory unit 401, the concatenated counter value JC generated by the generating unit 409. For example, the archiving unit 410 archives to the RAM 202, the concatenated counter value JC generated by the generating unit 409 instead of the erased concatenated counter value JC.

The third restoration method will be described. The third restoration method: is a method of restoring the concatenated counter value JC by reading the erasure counter value R, by storing the erasure counter value R not to the volatile memory but to the non-volatile second memory unit 411; and is executed by the generating unit 409, the archiving unit 410, the second memory unit 411, and the extracting unit 412.

For example, when the detecting unit 406 detects an erasure, the extracting unit 412 extracts the erasure counter value R from the second memory unit 411. For example, when the detecting unit 406 detects the erasure, the extracting unit 412 reads the erasure counter value R from the flash memory 203. For example, in FIG. 1, the erasure counter value R is obtained from the other node N. However, the extracting unit 412 of the node N1 may extract the erasure counter value R from the flash memory 203 of the node N. Thereby, the extracting unit 412 can extract the erasure counter value R that is from before the erasure. The extracted erasure counter value R is stored in, for example, a storage area such as the RAM 202.

In this case, the generating unit 409 generates the concatenated counter value JC including the erasure counter value R after the addition obtained by adding one to the erasure counter value R extracted by the extracting unit 412 as the higher order digits, and the transmission counter value S after the erasure indicating that the number of transmission session becomes zero due to the erasure as the lower order digits.

For example, the generating unit 409 generates the concatenated counter value JC including the erasure counter value R after the addition obtained by adding one to the erasure counter value R extracted by the extracting unit 412 as the higher order digits, and the initial value of the transmission counter value S as the lower order digits. For example, in (5) of FIG. 1, the generating unit 409 of the node N1 adds one not to the erasure counter value R received from the other node N but to the extracted erasure counter value R "0x00". The generating unit 409 generates the concatenated counter value JC "0x01000000" by concatenating the erasure counter value R "0x01" after the addition and the initial value "0x000000" of the transmission counter value S.

Thus, the generating unit 409 can generate a concatenated counter value JC that is greater than the concatenated counter value JC before the erasure and that is to be included in each of the packets transmitted thereafter. The generated concatenated counter value JC is stored in, for example, a storage area such as the RAM 202.

In this case, the archiving unit 410 archives to the first memory unit 401, the concatenated counter value JC generated by the generating unit 409, and archives the erasure counter value R after the addition by overwriting the erasure counter value R stored in the second memory unit 411. For example, in (5) of FIG. 1, the archiving unit 410 of the node N1 may archive the generated concatenated counter value JC "0x01000000" instead of the erased concatenated counter value. Thereby, the archiving unit 410 can archive the concatenated counter value JC to be included in each of the packets transmitted thereafter, and can update the erasure counter value R stored in the flash memory 203 to the latest erasure counter value R.

The receiving unit 407 receives from the other node N, the access key AK used in the encryption by the encrypting unit 404 or the decryption by the decrypting unit 408. In this case, the access key AK is updated at constant intervals by the other node N, and is transmitted to the node N. After the updating, the other node N determines that the encrypted packet EP encrypted using the access key AK before the updating is an unauthorized packet. Therefore, even if an attacker analyzes the access key AK, the communication executed using this access key AK becomes unable to be executed after the specific time period and therefore, the security of the communication can be ensured.

In this case, the receiving unit 407 receives from the neighboring nodes N, a second common key retained by the neighboring nodes N in the ad-hoc network and encrypted using a first common key retained by the neighboring nodes N. The "first common key" is the fixed key, and the "second common key" is the access key AK.

For example, the receiving unit 407 receives the encrypted packet EP that includes the access key AK encrypted using the fixed key. For example, in FIG. 1, the receiving unit 407 of the node N1 may receive from the node N2, the encrypted packet EP including an access key AK2. Thus, when the packet is transmitted to the neighboring nodes N, the receiving unit 407 can receive the encrypted packet EP that includes the access key AK to be used in the encryption of the packet. The received encrypted packet EP is stored in, for example, a storage area such as the RAM 202.

In this case, the decrypting unit 408 decrypts the encrypted second common key received by the receiving unit 407, using the first common key. For example, using the fixed key, the decrypting unit 408 decrypts the encrypted packet EP that includes the access key AK. The decrypting unit 408 obtains the access key AK from the packet obtained by the decryption. For example, in FIG. 1, the decrypting unit 408 of the node N1 may decrypt the encrypted packet EP that includes the access key AK2, and may obtain the access key AK2.

Thus, when the packet is transmitted to the neighboring nodes N, the decrypting unit 408 can obtain the access key AK to be used in the encryption of the packet. The packet obtained by the decryption is stored in, for example, a storage area such as the RAM 202. The obtained access key AK is stored in the node DB 300 correlated with the identifier identifying the transmission source.

In this case, if the access key AK is stored in the node DB 300 correlated with the identifier identifying the transmission source, the stored access key AK is updated to the obtained access key AK. If the access key AK is stored in the node DB 300 not being correlated with the identifier identifying the transmission source, a record correlating the identifier identifying the transmission source with the obtained access key AK is added to the node DB 300.

FIG. 5 is a functional block diagram of an example of a functional configuration of the node N as a receiving node. As depicted in FIG. 5, the node N includes a first receiving unit 501, a first archiving unit 502, a second receiving unit 503, a determining unit 504, a second archiving unit 505, a data processing unit 506, a third receiving unit 507, an extracting unit 508, and a transmitting unit 509. Functions of the first receiving unit 501 to the data processing unit 506 are implemented, for example, by causing the CPU 201 to execute programs stored in the memory apparatus such as the flash memory 203 depicted in FIG. 2 or by using the I/F 204.

The first receiving unit 501 receives from another node N, a first concatenated counter value JC including the erasure counter value R indicating, as the higher order digits, the number of erasure sessions executed at the other node N, and the transmission counter value S indicating, as the lower order digits, the number of transmission sessions from the other node N. For example, the first receiving unit 501 receives a packet including the concatenated counter value CJ; and obtains the concatenated counter value JC from the received packet. Thereby, the first receiving unit 501 can obtain the concatenated counter value JC that is the reception counter value RC to be used in determining the validity of each of the packets received thereafter.

The packet received by the first receiving unit 501 may be the encrypted packet EP obtained by the encryption. In this case, the first receiving unit 501 decrypts the encrypted packet EP using the fixed key FK or the access key AK. For example, the first receiving unit 501 of the node N2 receives in the past the encrypted packet EP that includes the concatenated counter value JC that is the reception counter value RC retained by the node N2 in FIG. 1.

The first archiving unit 502 archives to the memory apparatus, the concatenated counter value JC received by the first receiving unit 501. The "memory apparatus" is, for example, the RAM 202. For example, the first archiving unit 502 archives the concatenated counter value JC obtained by the first receiving unit 501 to the RAM 202 as the reception counter value RC. For example, in FIG. 1, the first archiving unit 502 of the node N2 archives the concatenated counter value JC "0x00001230" extracted by decrypting the encrypted packet EP received from the node N1 in the past, as the reception counter value RC. Thereby, the first archiving unit 502 can archive to the RAM 202 as the reception counter value RC until a packet is received thereafter, the concatenated counter value JC to be used in determining the validity of each of the packets received.

The second receiving unit 503 receives a second concatenated counter value JC from the other node N. For example, after the first receiving unit 501 receives the packet, the second receiving unit 503 receives the packet including the concatenated counter value JC. The second receiving unit 503 obtains the concatenated counter value JC from the received packet. The received packet is stored to, for example, a storage area such as the RAM 202. For example, in (9) of FIG. 1, the encrypted packet EP is received. However, the second receiving unit 503 of the node N2 may receive a packet that is not encrypted and includes the concatenated counter value JC "0x01000002". Thereby, the second receiving unit 503 can obtain the concatenated counter value JC to be used in determining the validity of the received packet.

The packet received by the second receiving unit 503 may be the encrypted packet EP obtained by the encryption. In this case, the second receiving unit 503 decrypts the encrypted packet EP using the fixed key FK or the access key AK. For example, in (9) of FIG. 1, the second receiving unit 503 of the node N2 receives the encrypted packet EP including the concatenated counter value JC "0x01000002", and decrypts the encrypted packet EP using the fixed key.

The determining unit 504 determines whether the second concatenated counter value JC received by the second receiving unit 503 is greater than the first concatenated counter value JC. The "first concatenated counter value JC" is the reception counter value RC. For example, the determining unit 504 determines whether the concatenated counter value JC obtained by the second receiving unit 503 is greater than the reception counter value RC retained in the RAM 202. Based on the determination result, the determining unit 504 determines whether the packet received by the second receiving unit 503 is an unauthorized packet. The determination result is stored in, for example, a storage area such as the RAM 202.

The transmission source node N adds one to the concatenated counter value JC for each transmission session and thereby, generates a new concatenated counter value that, after the erasure of the concatenated counter value JC, is greater than the concatenated counter value that is before the erasure. Therefore, as far as the node N consecutively receives the proper packets from the transmission source node N, the concatenated counter value JC included in the packet received in the current session is greater than the concatenated counter value JC included in the packet received in the previous session (that is, the reception counter value RC). On the other hand, when the node N receives an unauthorized packet due to a replay attack, the concatenated counter value JC included in the packet received in the current session by the node N is less than or equal to the reception counter value RC because the packet transmitted in the past is transmitted as it is in a replay attack.

Therefore, when the concatenated counter value JC obtained by the second receiving unit 503 is greater than the reception counter value RC stored in the RAM 202, the determining unit 504 determines that the packet received by the second receiving unit 503 is a proper packet. On the other hand, when the concatenated counter value JC obtained by the second receiving unit 503 is less than or equal to the reception counter value RC stored in the RAM 202, the determining unit 504 determines that the packet received by the second receiving unit 503 is an unauthorized packet. For example, in (9) of FIG. 1, the determining unit 504 of the node N2 compares the magnitudes of the reception counter value RC "0x00005678" and the obtained concatenated counter value JC "0x01000002". The concatenated counter value JC is greater than the reception counter value RC and therefore, the determining unit 504 of the node N2 determines that the received encrypted packet EP is a proper packet. Thereby, the determining unit 504 can determine whether the packet received by the second receiving unit 503 is an unauthorized packet.

When the determining unit 504 determines that the concatenated counter value JC is greater than the reception counter value RC, the second archiving unit 505 archives the second concatenated counter value JC by overwriting the first concatenated counter value JC therewith. For example, when the determining unit 504 determines that the concatenated counter value JC is greater than the reception counter value RC, the second archiving unit 505 archives the concatenated counter value JC obtained by the second receiving unit 503 by overwriting the reception counter value RC stored in the RAM 202 therewith. For example, in (9) of FIG. 1, the second archiving unit 505 of the node N2 updates the reception counter value RC "0x00005678" to the obtained concatenated counter value JC "0x01000002". Thereby, the second archiving unit 505 can update the reception counter value RC to the latest reception counter value RC.

When the determining unit 504 determines that the concatenated counter value JC is not greater than the reception counter value RC, the data processing unit 506 discards the data received with the second concatenated counter value JC. For example, in a case where the determining unit 504 determines that the concatenated counter value JC is not greater than the reception counter value RC and that the packet received by the second receiving unit 503 is an unauthorized packet, the data processing unit 506 does not execute any process even when the content of the unauthorized packet is a processing request. The data processing unit 506 discards the data without executing any multi-hop communication even when the content of the unauthorized packet is a transfer request.

For example, in (9) of FIG. 1, when the determining unit 504 determines that the packet is an unauthorized packet, the data processing unit 506 of the node N2 discards the received encrypted packet EP. Thereby, the data processing unit 506 can prevent the unauthorized packet from being transferred to other nodes N, and can reduce the processing load on the node N caused by executing the content of the unauthorized packet.

When the determining unit 504 determines that the concatenated counter value JC is greater than the reception counter value RC, the data processing unit 506 processes the data received with the second concatenated counter value JC. For example, in a case where the determining unit 504 determines that the concatenated counter value JC is greater than the reception counter value RC and that the packet received by the second receiving unit 503 is a proper packet, the data processing unit 506 executes the process according to the processing request when the content of the proper packet is a processing request. The data processing unit 506 transfers the proper packet to the other nodes N using multi-hop communication when the content of the proper packet is the transfer request. Thereby, for a proper packet, the data processing unit 506 can execute the process according to the content of the packet.

The third receiving unit 507 receives the acquisition request or the updating request for the erasure counter value R. A case will be described where the third receiving unit 507 receives the acquisition request. The "acquisition request" is a request to cause another node N to extract the erasure counter value R from the reception counter value RC that is retained by the other node N and that indicates the transmission counter value S transmitted by the node N in the past, and to transmit the extracted erasure counter value R to the node N.

In this case, the third receiving unit 507 receives the acquisition request for the erasure counter value R from the other node N. For example, the third receiving unit 507 receives a packet including the acquisition request from the other node N. For example, in (2) of FIG. 1, the encrypted packet EP is received. However, the third receiving unit 507 of the node N2 may receive a packet including the acquisition request and not encrypted. Thereby, the third receiving unit 507 can generate a trigger to extract the erasure counter value R from the reception counter value RC stored in the RAM 202. The received packet is stored in, for example, a storage area such as the RAM 202.

The packet received by the third receiving unit 507 may be the encrypted packet EP obtained by the encryption. In this case, the third receiving unit 507 decrypts the encrypted packet EP using the fixed key FK or the access key AK. For example, in (9) of FIG. 1, the third receiving unit 507 of the node N2 receives the encrypted packet EP including the acquisition request, and decrypts the encrypted packet EP using the fixed key.

In this case, when the third receiving unit 507 receives the acquisition request, the extracting unit 508 extracts the erasure counter value R in the concatenated counter value JC stored in the memory apparatus. For example, when the third receiving unit 507 obtains the acquisition request, the extracting unit 508 extracts the erasure counter value R from the reception counter value RC stored in the RAM 202. For example, in (4) of FIG. 1, the extracting unit 508 of the node N2 extracts the erasure counter value R "0x00" from the stored reception counter value RC "0x00001230". Thereby, the extracting unit 508 can extract the erasure counter value R to be transmitted to the other node N. The extracted erasure counter value R is stored in, for example, a storage area such as the RAM 202.

In this case, the transmitting unit 509 transmits to the other node N, the erasure counter value R extracted by the extracting unit 508. For example, the transmitting unit 509 generates a packet that includes the erasure counter value R extracted by the extracting unit 508, and transmits the generated packet to the other node N.

In this case, the transmitting unit 509 transmits the generated packet to the other node N using unicast communication. The unicast transmission of the packet to the other node N is realized as follows: the transmitting unit 509 distributes the packet to the neighboring nodes; the neighboring nodes N except the other node N to be the addressee each discard the received packet; and the other node N to be the addressee processes the received packet. For example, in (4) of FIG. 1, the transmitting unit 509 of the node N2 transmits the encrypted packet EP including the erasure counter value R "0x00". Thereby, the transmitting unit 509 can transmit the erasure counter value R to be used in the generation of the concatenated counter value JC at the other node N.

A case will be described where the third receiving unit 507 receives the updating request. The "updating request" is a request to cause the other node N to extract the erasure counter value R from the reception counter value RC indicating the transmission counter value S transmitted by the node N in the past, and is a request to cause the other node N to transmit to the node N, the erasure counter value R after the addition obtained by adding one to the extracted erasure counter value R.

In this case, the third receiving unit 507 receives the updating request for the erasure counter value R from the other node N. For example, the third receiving unit 507 receives the packet including the updating request from the other node N. The received packet is stored in, for example, a storage area such as the RAM 202. For example, in (2) of FIG. 1, the encrypted packet EP includes the acquisition request. However, the third receiving unit 507 of the node N2 may receive a packet that includes the acquisition request and is not encrypted. Thereby, the third receiving unit 507 can generate a trigger to extract the erasure counter value R from the reception counter value RC stored in the RAM 202.

The packet received by the third receiving unit 507 may be the encrypted packet EP obtained by the encryption. In this case, the third receiving unit 507 decrypts the encrypted packet EP using the fixed key FK or the access key AK. For example, in (2) of FIG. 1, the third receiving unit 507 of the node N2 receives the encrypted packet EP including the acquisition request, and decrypts the encrypted packet EP using the fixed key.

In this case, when the third receiving unit 507 receives the updating request, the extracting unit 508 extracts the erasure counter value R from the concatenated counter value JC stored in the memory apparatus. The "memory apparatus" is the RAM 202. For example, when the third receiving unit 507 obtains the updating request, the extracting unit 508 extracts the erasure counter value R from the reception counter value RC stored in the RAM 202. For example, in (4) of FIG. 1, the extracting unit 508 of the node N2 extracts the erasure counter value R "0x00" from the stored reception counter value RC "0x00001230". Thereby, the extracting unit 508 can extract the erasure counter value R to be transmitted to the other node N. The extracted erasure counter value R is stored in, for example, a storage area such as the RAM 202.

In this case, the transmitting unit 509 transmits to the other node N, the erasure counter value R after the addition obtained by adding one to the erasure counter value R extracted by the extracting unit 508. For example, the transmitting unit 509 generates a packet that includes the erasure counter value R after the addition obtained by adding one to the erasure counter value R extracted by the extracting unit 508, and transmits the generated packet to the other node N. In this case, the transmitting unit 509 transmits the generated packet to the other node N using unicast transmission.

For example, in (4) of FIG. 1, the transmitting unit 509 of the node N2 transmits the generated packet to the node N1. Thereby, the transmitting unit 509 can transmit the erasure counter value R after the addition to be used in the generation of the concatenated counter value JC at the other node N. The packet transmitted by the transmitting unit 403 may be encrypted. In this case, the transmitting unit 403 encrypts the packet using the fixed key FK or the access key AK.

An example of the encrypted communication will be described using the access key AK with reference to FIGS. 6 and 7.

Figure 6:
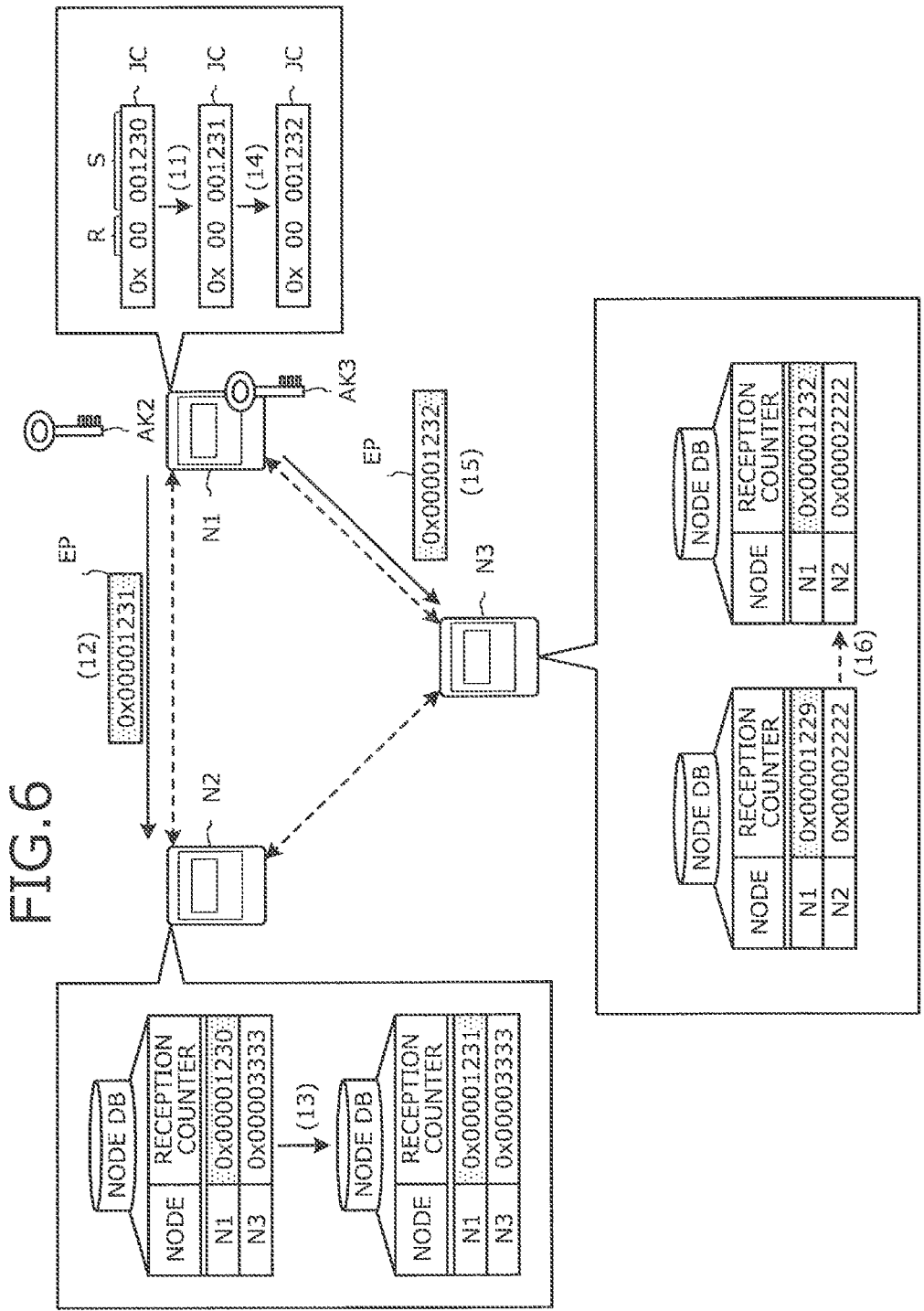
FIG. 6 is an explanatory diagram of an example of encrypted communication using an access key AK.

FIG. 6 is an explanatory diagram of an example of the encrypted communication using the access key AK. Portions identical to those described with reference to FIG. 1 will not again be described. In the example of FIG. 6, the node N1 retains the access key AK2 to be used in the encryption of the packet to be transmitted to the node N2, and an access key AK3 to be used in the encryption of the packet to be transmitted to the node N3.

The node N1 retains, as the reception counter value RC, the concatenated counter value JC "0x00001230". The node N2 retains the concatenated counter value JC "0x00001230" extracted from the packet obtained by decrypting the encrypted packet EP received from the node N1 in the past. The node N3, retains, as the reception counter value RC, the concatenated counter value JC "0x00001229" extracted from the packet obtained by decrypting the encrypted packet EP received from the node N1 in the past.

The encrypted communication using the access key AK will be described taking an example of the case where the encrypted packet EP encrypted using the access key AK is transmitted from the node N1 to the nodes N2 and N3.

(11) When a transmission event for data addressed to the node N2 occurs, the node N1 adds one to the concatenated counter value JC "0x00001230".

(12) The node N1 generates a packet that includes the data addressed to the node N2 and the concatenated counter value JC "0x00001231" after the addition, encrypts the generated packet using the access key AK2, and transmits the encrypted packet EP to the node N2 to be the addressee of the data.

(13) When the node N2 receives the encrypted packet EP from the node N1, the node N2 decrypts the received encrypted packet EP using the access key AK2, and compares the magnitudes of the concatenated counter value JC "0x00001231" included in the packet obtained by the decryption and the reception counter value RC "0x00001230" indicating the concatenated counter value JC received in the previous session.

The concatenated counter value JC included in the packet obtained by the decryption is greater than the reception counter value RC and therefore, the node N2 determines that the received encrypted packet EP is a proper packet, and updates the reception counter value RC "0x00001230" to the concatenated counter value JC "0x00001231" included in the packet obtained by the decryption.

(14) When a transmission event occurs for data addressed to the node N3, the node N1 adds one to the concatenated counter value JC "0x00001231".

(15) The node N1 generates a packet that includes the data addressed to the node N3, and the concatenated counter value JC "0x00001232" after the addition, encrypts the generated packet using the access key AK3, and transmits the encrypted packet EP to the node N3, that is the addressee of the data.

(16) When the node N3, receives the encrypted packet EP from the node N1, the node N3, decrypts the received encrypted packet EP using the access key AK3, and compares the magnitudes of the concatenated counter value JC "0x00001232" included in the packet obtained by the decryption and the reception counter value RC "0x00001229" indicating the concatenated counter value JC received in the previous session. The concatenated counter value JC included in the packet obtained by the decryption is greater than the reception counter value RC and therefore, the node N3, determines that the received encrypted packet EP is a proper packet, and updates the reception counter value RC "0x00001299" to the concatenated counter value JC "0x00001232" included in the packet obtained by the decryption.

The details of the encrypted communication using the access key AK depicted in FIG. 6 will be described with reference to FIG. 7.

Figure 7:
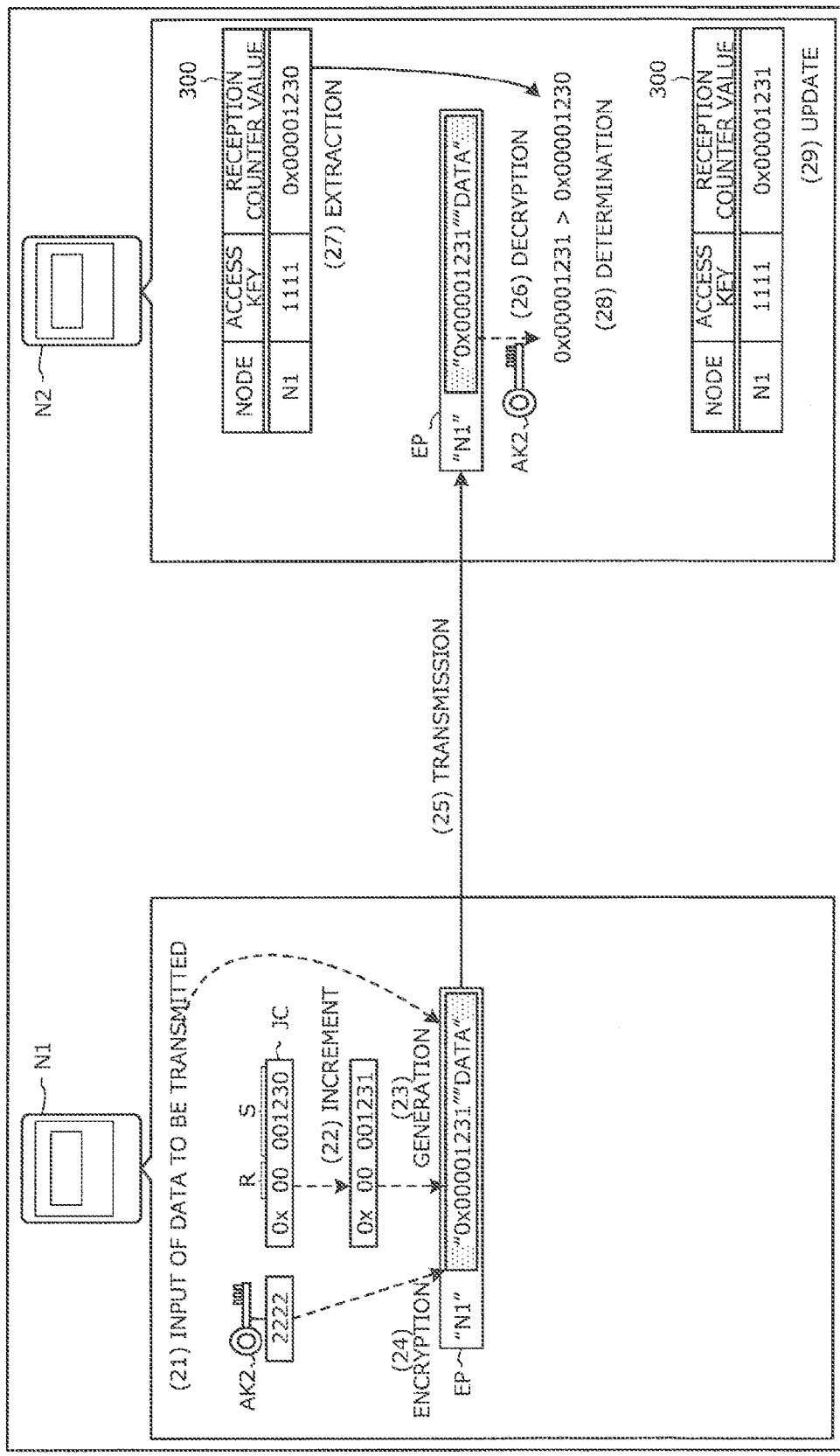
FIG. 7 is an explanatory diagram of details of the encrypted communication using the access key AK.

FIG. 7 is an explanatory diagram of the details of the encrypted communication using the access key AK. The details will be described of the encrypted communication between the nodes N1 and N2 depicted in FIG. 6 with reference to FIG. 7.

(21) When the node N1 receives from the user of the node N1 an input of data addressed to the node N2, the node N1 starts the encrypted communication with the node N2. In this case, the node N1 starts the encrypted communication triggered by the input of the data from the user. However, the node N1 may start the encrypted communication triggered by a data transmission event automatically generated by the node N1. (22) When the node N1 receives the input of the data addressed to the node N2, the node N1 adds one to the concatenated counter value JC "0x00001230".

(23) The node N1 generates a packet that includes the identifier "N1" identifying the transmission source, the data addressed to the node N2, and the concatenated counter value JC "0x00001231" after the addition. The identifier identifying the transmission source is included in a portion not encrypted in the packet (for example, the header portion of the packet). Similarly, in the description below, the identifier identifying the transmission source is included in the portion not encrypted in the packet. The portion encrypted in the packet may further include the identifier identifying the transmission source.

(24) The node N1 encrypts the data addressed to the node N2 and the concatenated counter value JC "0x00001231" after the addition in the generated packet, using the access key AK2.

(25) The node N1 transmits the encrypted packet EP obtained by the encryption to the node N2 that is the addressee of the data.

(26) When the node N2 receives the encrypted packet EP from the node N1, the node N2 obtains the identifier "N1" identifying the transmission source from the received encrypted packet EP, and decrypts the received encrypted packet EP using the access key AK2. The node N2 obtains the data addressed to the node N2 and the concatenated counter value JC "0x00001231" from the packet obtained by the decryption.

(27) The node N2 extracts from the node DB 300, the reception counter value RC correlated with the node N1 that is the transmission source indicated by the obtained identifier "N1". (28) The node N2 compares the magnitudes of the obtained concatenated counter value JC "0x00001231" and the reception counter value RC "0x00001230". The obtained concatenated counter value JC is greater than the extracted reception counter value RC and therefore, the node N2 determines that the received encrypted packet EP is a proper packet.

(29) If the node N2 determines that the encrypted packet EP is a proper packet, the node N2 updates the reception counter value RC "0x00001230" in the node DB 300 to the concatenated counter value JC "0x00001231" and when the content of the proper packet is a processing request, executes the process according to the processing request. When the content of the proper packet is the transfer request, the data processing unit transfers the proper packet to the other node N using multi-hop communication. Thereby, for a proper packet, the node N2 can execute the process according to the content of the packet.

On the other hand, when the obtained concatenated counter value JC is less than or equal to the extracted reception counter value RC, the node N2 determines that the received encrypted packet EP is an unauthorized packet. When the node N2 determines that the received encrypted packet EP is an unauthorized packet, the node N2 discards the packet obtained by the decryption.

For example, the node N2 does not execute any process even if the content of the unauthorized packet is the processing request, and discards the packet obtained by the decryption. The node N2 does not transfer the packet using multi-hop communication even if the content of the unauthorized packet is the transfer request, and discards the packet obtained by the decryption. Thereby, the node N2 can prevent the unauthorized packet from being transferred to the other node N, can reduce the processing load on the node N caused by the execution of the content of the unauthorized packet, and can ensure the security of the communication.

The packet transmission process in the encrypted communication depicted in FIGS. 6 and 7 will be described with reference to FIG. 8. The packet transmission process is a process executed by the node N1 depicted in FIGS. 6 and 7. The description will be made taking an example of the node N1 as the execution entity.

Figure 8:
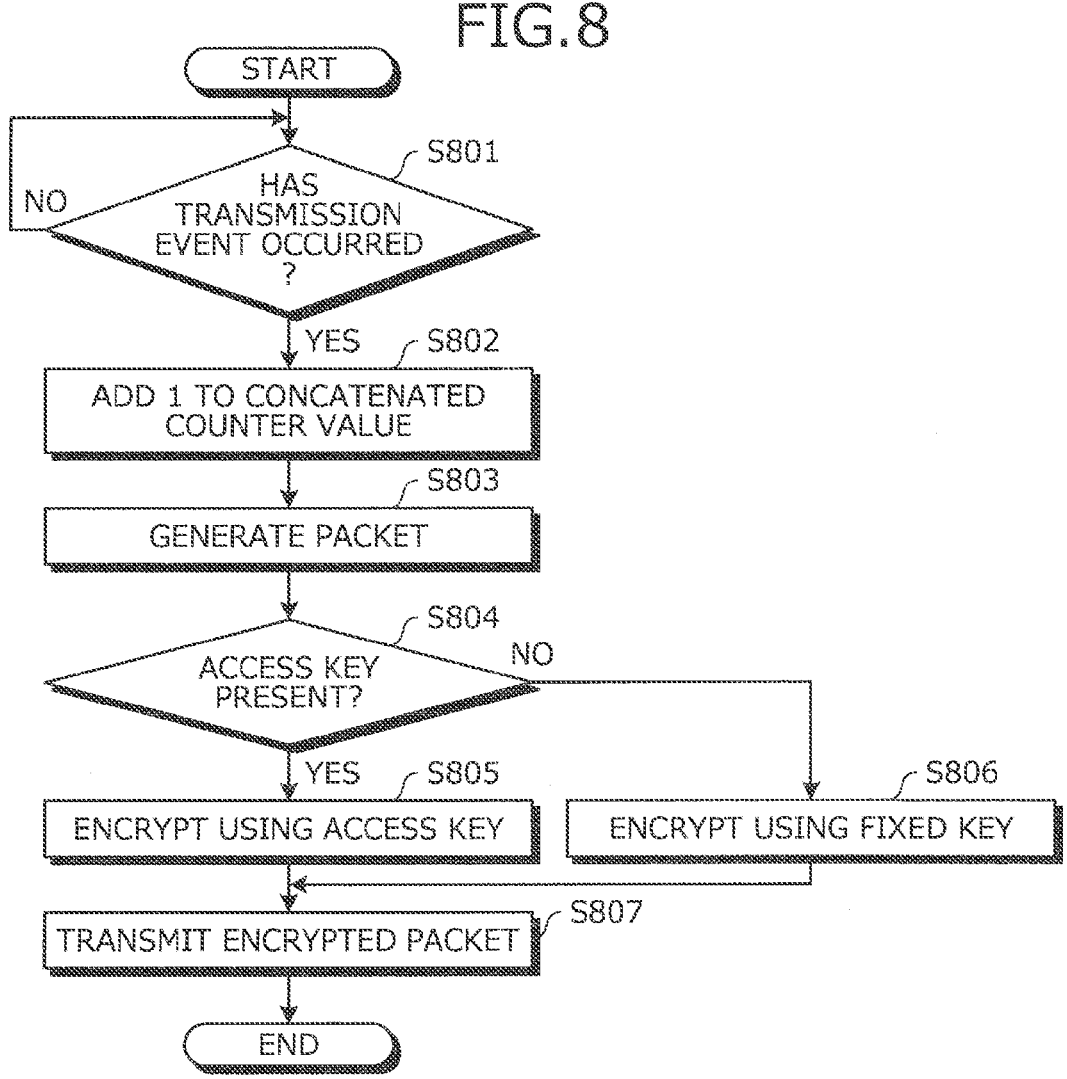
FIG. 8 is a flowchart of a detailed process procedure for a packet transmission process in the encrypted communication.

FIG. 8 is a flowchart of a detailed process procedure for the packet transmission process in the encrypted communication. The node N1 determines whether a transmission event has occurred for data addressed to the other node N (step S801). If the node N1 determines that no such transmission event has occurred (step S801: NO), the CPU 201 returns to the process at step S801 and waits for the occurrence of the transmission event.

On the other hand, if the node N1 determines that a transmission event has occurred (step S801: YES), the node N1 adds one to the concatenated counter value JC (step S802) and generates a packet that includes the identifier identifying the node N to be the transmission source, the data addressed to the other node N, and the concatenated counter value JC after the addition (step S803).

The node N1 determines whether an access key AK is present that is stored in the node DB 300 correlated with the identifier of the node N to be the addressee of the data (step S804). If the node N1 determines that such an access key AK is present (step S804: YES), the node N1 encrypts the generated packet using the access key AK (step S805).

On the other hand, if the node N1 determines that no such access key AK is present (step S804: NO), the node N1 encrypts the generated packet using the fixed key (step S806), transmits the encrypted packet EP obtained by the encryption to the node N to be the addressee of the data (step S807), and causes the packet transmission process to come to an end. Thereby, the node N can ensure the security of communication by encrypting the packet to be transmitted.

The packet transmission process in the encrypted communication depicted in FIGS. 6 and 7 will be described with reference to FIG. 9. The packet reception process is a process executed by the node N2 or N3, depicted in FIGS. 6 and 7. The description will be made taking an example of the node N2 as the execution entity.

Figure 9:
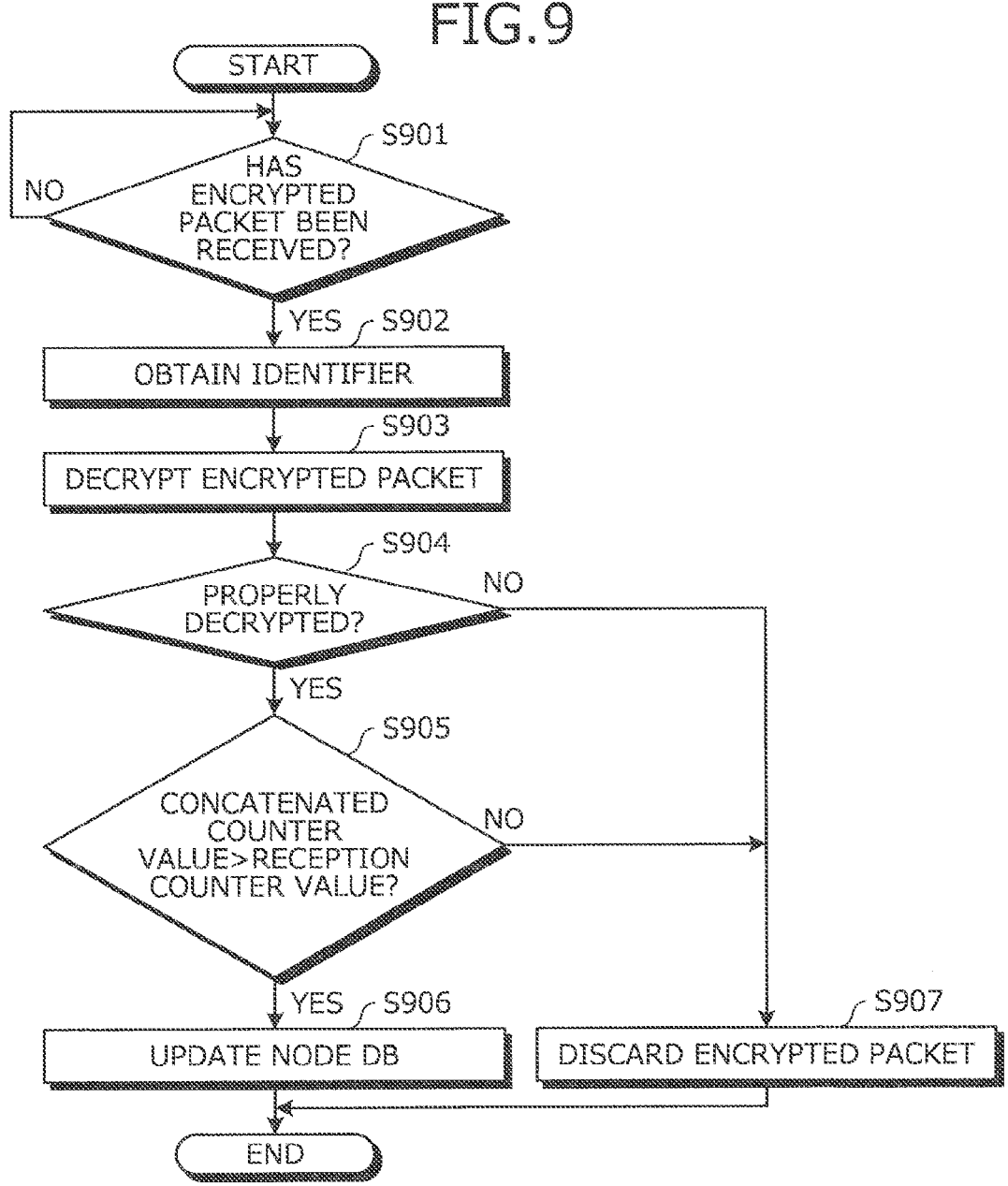
FIG. 9 is a flowchart of a detailed process procedure for the packet transmission process in the encrypted communication.

FIG. 9 is a flowchart of a detailed process procedure for the packet transmission process in the encrypted communication. The node N2 determines whether the node N2 has received an encrypted packet EP (step S901). If the node N2 determines that the node N2 has not received an encrypted packet EP (step S901: NO), the node N2 returns to the process at step S901 and waits for an encrypted packet EP to be received.

On the other hand, if the node N2 determines that the node N2 has received an encrypted packet EP (step S901: YES), the node N2 obtains the identifier identifying the transmission source from the portion not encrypted in the encrypted packet EP (for example, the header portion of the packet) (step S902).

The node N2 decrypts the received encrypted packet EP using the access key AK or the fixed key of the node N (step S903) and determines whether the node N2 can properly decrypt the received encrypted packet EP (step S904). If the node N2 determines that the node N2 fails to properly decrypt the received encrypted packet EP (step S904: NO), the node N2 determines that the received encrypted packet EP is an unauthorized packet, discards the received encrypted packet EP (step S907), and causes the packet reception process to come to an end.

On the other hand, if the node N2 determines that the node N2 properly decrypts the received encrypted packet EP successfully (step S904: YES), the node N2 determines whether the concatenated counter value JC in the packet obtained by the decryption is greater than the reception counter value RC stored in the node DB 300 correlated with the identifier identifying the transmission source (step S905).

If the node N2 determines that the concatenated counter value JC is less than or equal to the reception counter value RC (step S905: NO), the node N2 determines that the received encrypted packet EP is an unauthorized packet, discards the encrypted packet EP (step S907), and causes the packet reception process to come to an end.

On the other hand, if the node N2 determines that the concatenated counter value JC is greater than the reception counter value RC (step S905: YES), the node N2 determines that the received encrypted packet EP is a proper packet, updates the reception counter value RC stored in the node DB 300 correlated with the identifier identifying the transmission source to the concatenated counter value JC in the packet obtained by the decryption (step S906), and causes the packet reception process to come to an end. Thereby, the node N determines whether the received encrypted packet EP is an unauthorized packet and, if the node N determines that the encrypted packet EP is an unauthorized packet, discards the encrypted packet EP to ensure the security of the communication.

A case will be described where the concatenated counter value JC is erased. For example, a case where the concatenated counter value JC is erased is a case where no electric power is supplied to the node N due to a power failure and the concatenated counter value JC stored in the RAM 202 is erased. A case where the concatenated counter value JC is erased may be a case where the storage contents of the RAM 202 is initialized by an operation from the user of the node N.

In this case, the concatenated counter value JC to be included in each of encrypted packets EP to be transmitted thereafter is unknown and therefore, the node N cannot enable the other node N to determine that such an encrypted packet EP is a proper packet and therefore, cannot recover in the ad-hoc network. Examples of operation of the node N executed when the node N recovers in the ad-hoc network by generating a new concatenated counter value JC will be described.

An first example of operation executed when the concatenated counter value JC of the node N is erased will be described with reference to FIGS. 10 to 13.

FIGS. 10, 11, 12, and 13 are explanatory diagrams of the first example of operation executed when the concatenated counter value JC of the node N is erased. Portions identical to those described with reference to FIG. 1 will not again be described. In the example depicted in FIG. 10, the node N1 retains the access key AK2 "0x2222" to be used in the encryption of the packets received from the node N2 and transmitted to the node N2.

The node N1 retains the concatenated counter value JC "0x00001230". The node N2 extracts the concatenated counter value JC from the packet obtained by decrypting the encrypted packet EP received from the node N1 in the past, and retains the extracted concatenated counter value JC "0x00001230" as the reception counter value RC.

Figure 10:
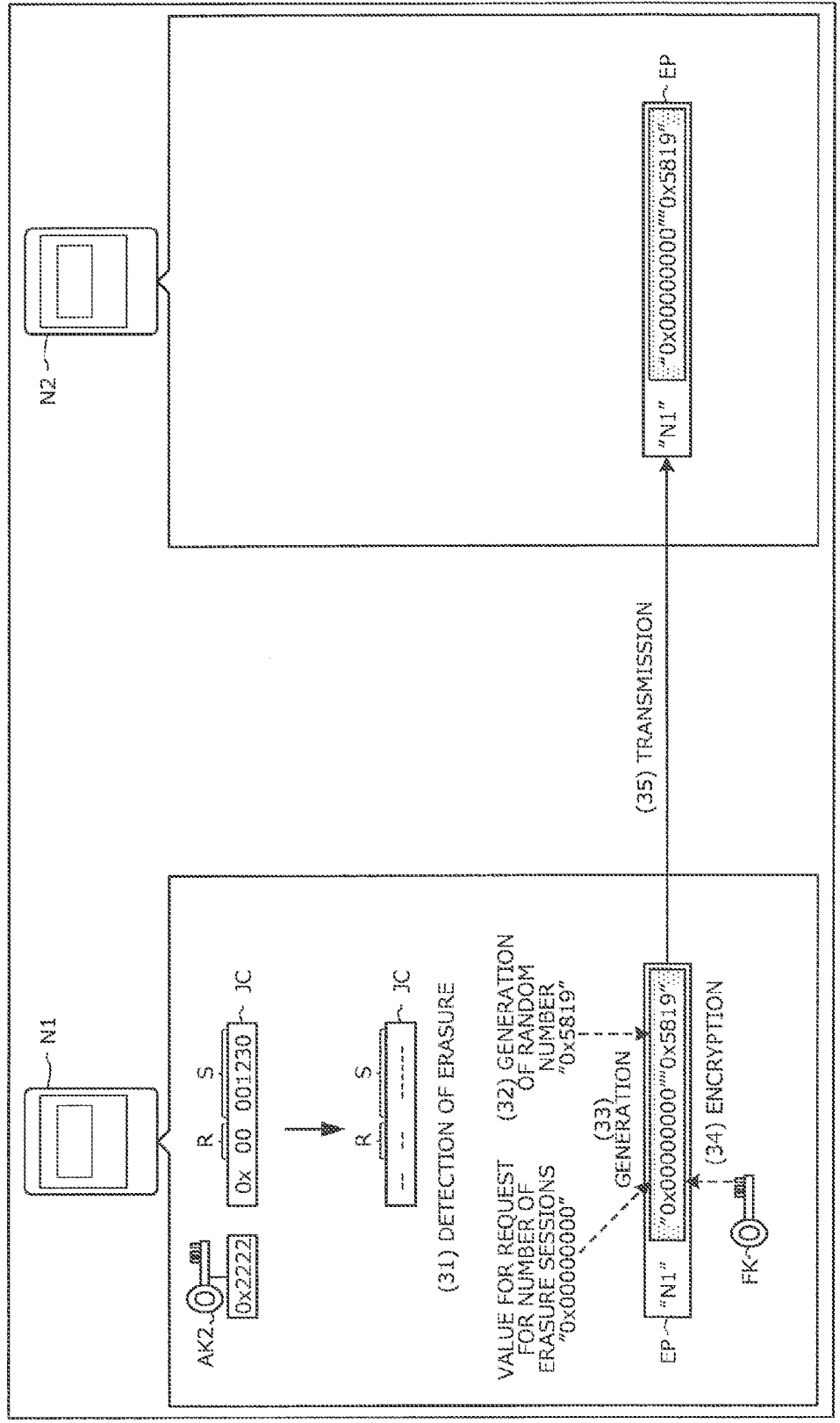
FIGS. 10, 11, 12, and 13 are explanatory diagrams of a first example of operation executed when a concatenated counter value JC of the node N is erased.
Figure 11:
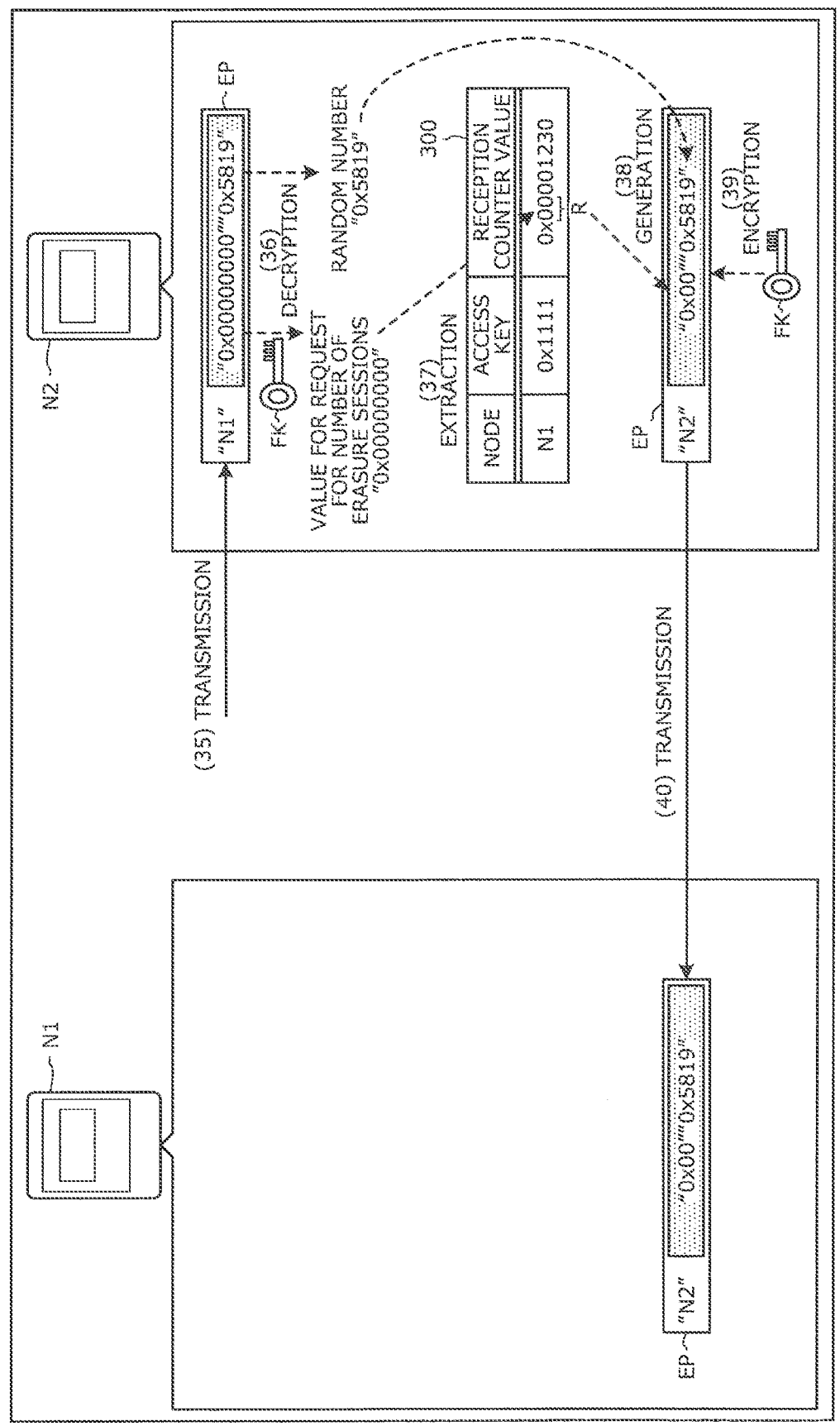
Figure 12:
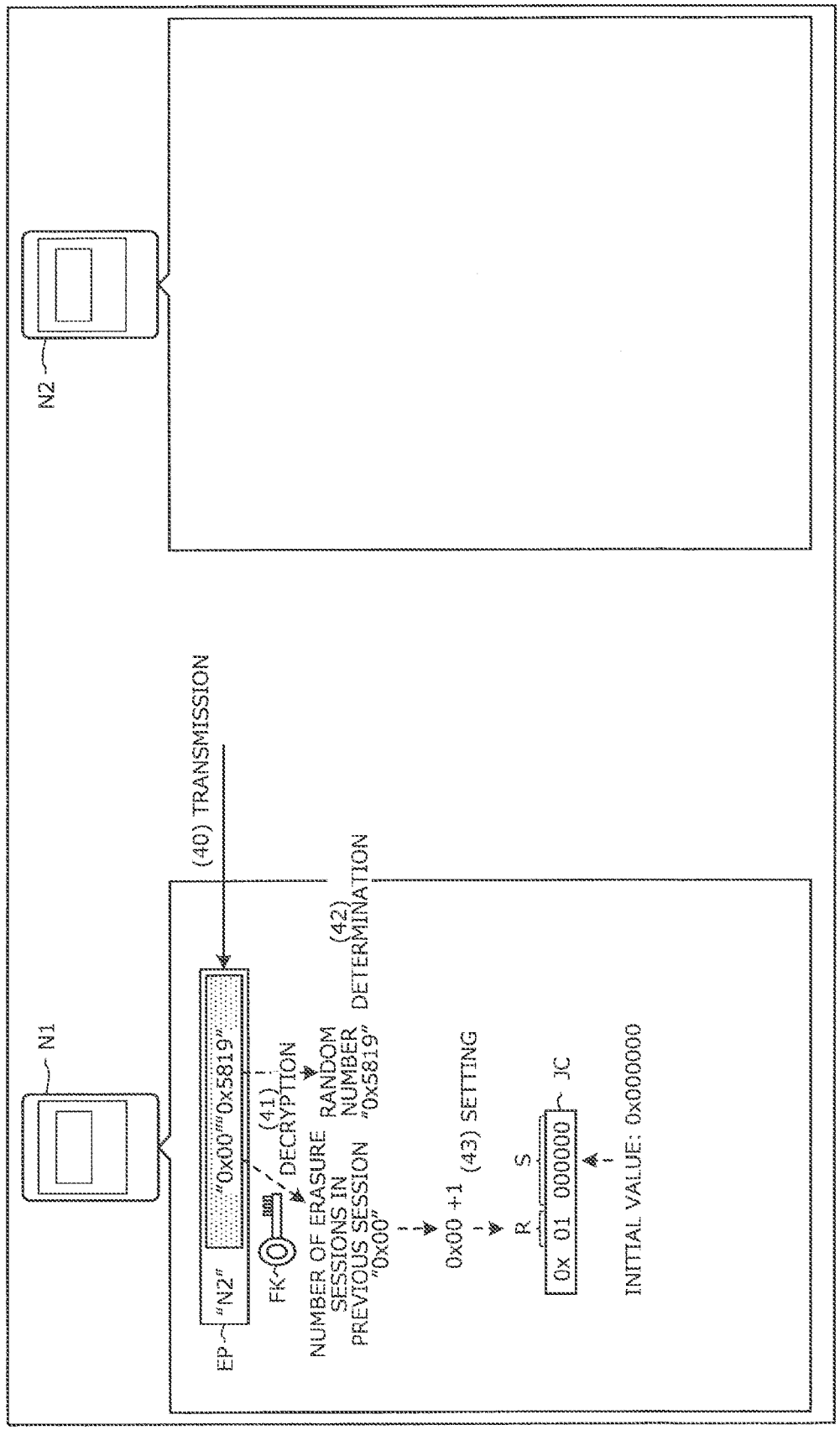
Figure 13:
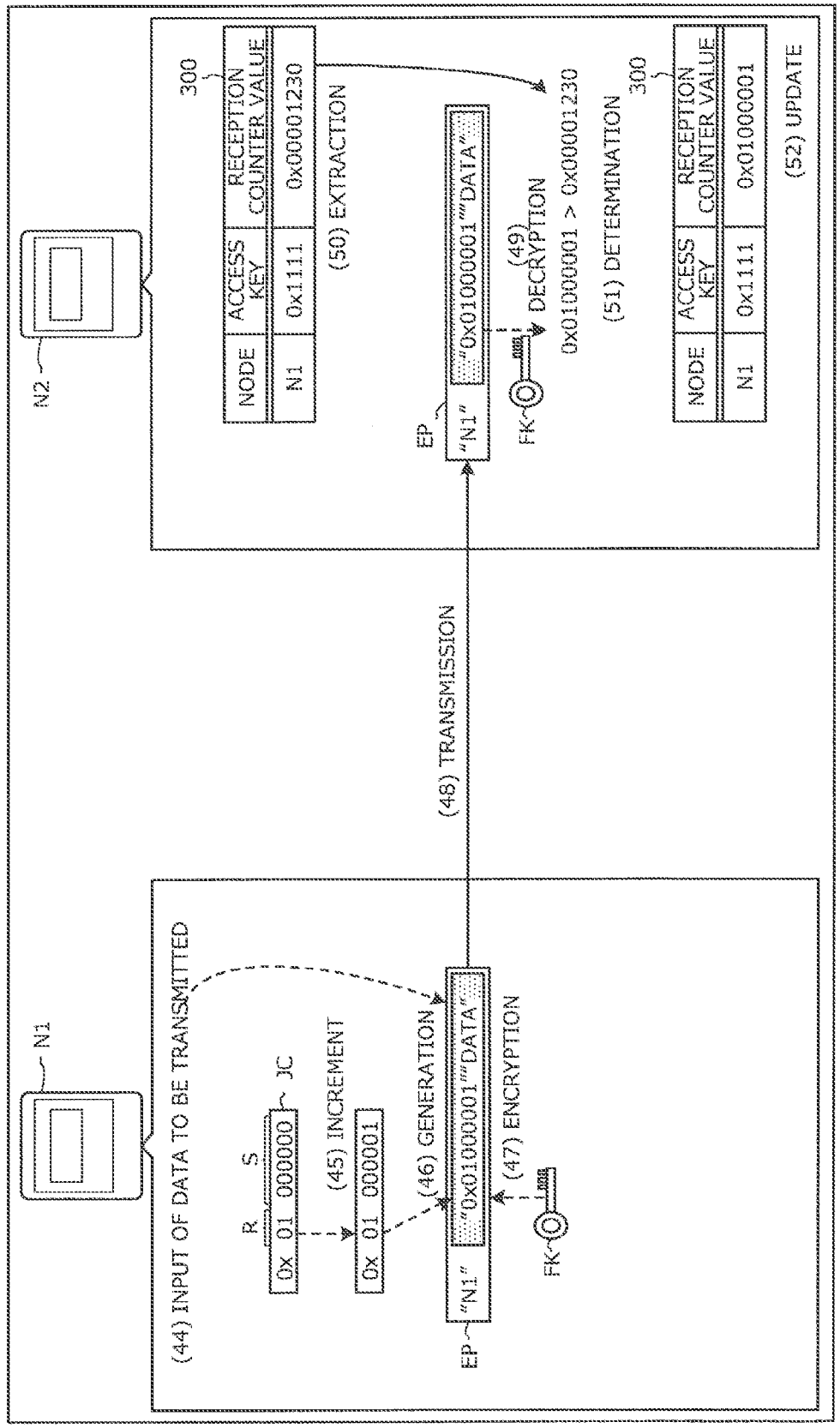

It is assumed in FIG. 10 that no electric power is supplied to the node N1 due to a power failure and the concatenated counter value JC "0x00001230" and the access key AK2 retained by the node N1 are erased. Therefore, the concatenated counter value JC to be included in the packet to be transmitted to another node N is unknown and the node N1 cannot transmit the packet to the other node N.

(31) When the power failure is recovered and the supply of the electric power is started, the node N1 detects the erasure of the concatenated counter value JC retained thereby.

(32) When the node N1 detects the erasure of the concatenated counter value JC, the node N1 generates a random number to be the temporary identification information. In the example of FIG. 10, the node N1 generates "0x5819" as the random number, and stores the generated random number "0x5819" in the RAM 202.

(33) When the node N1 generates the random number, the node N1 generates a packet that includes the identifier "N1" identifying the transmission source, "0x00000000" set as the concatenated counter value JC indicating an acquisition request for the erasure counter value R, and the generated random number "0x5819". The identifier identifying the transmission source is included in a portion not encrypted in the packet (for example, the header portion of the packet).

(34) When the node N1 generates the packet, the node N1 encrypts, using the fixed key FK, the concatenated counter value JC "0x00000000" and the random number "0x5819" in the generated packet. (35) The node N1 transmits the encrypted packet EP obtained by the encryption to the neighboring nodes N including the node N2. The procedure advances to that depicted in FIG. 11.

(36) When the node N2 receives the encrypted packet EP transmitted from the node N1 at (35), the node N2 obtains the identifier "N1" identifying the transmission source, from the received encrypted packet EP, decrypts the received encrypted packet EP using the fixed key FK, and obtains the concatenated counter value JC "0x00000000" and the random number "0x5819" from the packet obtained by the decryption.

(37) The node N2 detects that the obtained concatenated counter value JC is "0x00000000" set as the concatenated counter value JC indicating the acquisition request for the erasure counter value R; extracts from the node DB 300, the reception counter value RC correlated with the obtained identifier "N1" identifying the transmission source; and extracts the erasure counter value R "0x00" from the extracted reception counter value RC.

(38) When the node N2 extracts the erasure counter value R, the node N2 generates a packet that includes the identifier "N2" identifying the transmission source, the extracted erasure counter value R "0x00", and the obtained random number "0x5819". The identifier identifying the transmission source is included in a portion not encrypted in the packet (for example, the header portion of the packet).

(39) The node N2 encrypts, using the fixed key FK, the erasure counter value R "0x00" and the random number "0x5819" in the generated packet.

(40) The node N2 transmits to the node N1 indicated by the obtained identifier "N1", the encrypted packet EP obtained by the encryption. The procedure advances to that of FIG. 12.

(41) When the node N1 receives the encrypted packet EP transmitted from the node N2 at (40), the node N1 obtains the identifier "N2" identifying the transmission source from the received encrypted packet EP, decrypts the received encrypted packet EP using the fixed key FK, and obtains the erasure counter value R "0x00" and the random number "0x5819" from the packet obtained by the decryption.

(42) When the node N1 obtains the random number, the node N1 checks for coincidence between the obtained random number and the random number stored in the RAM 202 at (32). The obtained random number "0x5819" and the random number "0x5819" stored in the RAM 202 coincide with each other and therefore, the node N1 determines that the encrypted packet EP received at (41) is a proper packet.

(43) If the node N1 determines that the encrypted packet EP is a proper packet, the node N1: adds one to the obtained erasure counter value R "0x00" indicating the erasure counter value R before the erasure of the concatenated counter value JC; and generates a concatenated counter value JC "0x01000000" by concatenating the erasure counter value R "0x01" after the addition with the initial value "0x000000" of the transmission counter value S. Thereby, the node N1 generates the new concatenated counter value JC instead of the erased concatenated counter value JC.

On the other hand, when the obtained random number and the random number stored in the RAM 202 at (32) do not coincide with each other, the node N1 determines that the encrypted packet EP received at (41) is an unauthorized packet. If the node N1 determines that the encrypted packet EP is an unauthorized packet, the node N1 discards the packet obtained by the decryption and thereby, ensures the security of the communication. The procedure advances to that depicted in FIG. 13.

(44) When the node N1 receives an input of data addressed to the node N2 from the user of the node N1, the node N1 starts the encrypted communication with the node N2. In this case, the node N1 starts the encrypted communication triggered by the input of the data from the user. However, the node N1 may start the encrypted communication triggered by a data transmission event automatically generated by the node N1.

(45) When the node N1 receives the input of the data addressed to the node N2, the node N1 adds one to the new concatenated counter value JC "0x01000000" generated at (43).

(46) The node N1 generates a packet that includes the identifier "N1" identifying the transmission source, the data addressed to the node N2, and the concatenated counter value JC "0x01000001" after the addition. The identifier identifying the transmission source is included in a portion not encrypted in the packet (for example, the header portion of the packet).

(47) When the node N1 generates the packet, the node N1 encrypts, using the fixed key FK, the data addressed to the node N2 and the concatenated counter value JC "0x01000001" after the addition in the generated packet.

(48) The node N1 transmits to the node N2 that is the addressee of the data, the encrypted packet EP obtained by the encryption.

(49) When the node N2 receives the encrypted packet EP transmitted from the node N1, the node N2 obtains the identifier "N1" identifying the transmission source from the received encrypted packet EP, decrypts the received encrypted packet EP using the fixed key FK, and obtains the data addressed to the node N2 and the concatenated counter value JC "0x01000001" from the packet obtained by the decryption.

(50) When the node N2 obtains the concatenated counter value JC "0x01000001", the node N2 extracts from the node DB 300, the reception counter value RC correlated with the obtained identifier "N1" identifying the transmission source.

(51) The node N2 compares the magnitudes of the obtained concatenated counter value JC "0x01000001" and the extracted reception counter value RC "0x00001230". The node N2 determines that the obtained concatenated counter value JC "0x01000001" is greater than the extracted reception counter value RC "0x00001230" and therefore, determines that the received encrypted packet EP is a proper packet.

(52) When the node N2 determines that the received encrypted packet EP is a proper packet, the node N2 updates the reception counter value RC "0x00001230" correlated with the identifier "N1" in the node DB 300 to the obtained concatenated counter value JC "0x01000001".

On the other hand, if the node N2 determines that the obtained concatenated counter value JC is less than or equal to the extracted reception counter value RC, the node N2 determines that the received encrypted packet EP is an unauthorized packet. When the node N2 determines that the received encrypted packet EP is an unauthorized packet, the node N2 discards the packet obtained by the decryption and thereby, ensures the security of the communication.

As described, the node N1 retains the concatenated counter value JC obtained by concatenating the erasure counter value R as the higher order digits and the transmission counter value S as the lower order digits; when the concatenated counter value JC is erased, the node N1 obtains from the other node N, the erasure counter value R before the erasure; and the node N1 generates the new concatenated counter value JC including the erasure counter value R after the addition obtained by adding one to the erasure counter value R before the erasure, as the higher order digits.

Thereby, the new concatenated counter value JC generated by the node N1 is greater than the concatenated counter value JC included in the encrypted packet EP transmitted by the node N1 in the past. Therefore, the node N1 can include the concatenated counter value JC that is greater than the reception counter value RC retained by the other node N, in the encrypted packet EP to be transmitted to the other node N.

Thereby, the concatenated counter value JC included in the encrypted packet EP received from the node N1 is greater than the reception counter value RC retained by the node N2 and therefore, the node N2 can determine that the encrypted packet EP received from the node N1 is a proper packet. The other node N does not determine that the encrypted packet EP transmitted to the other node N is an unauthorized packet and therefore, the node N1 can recover in the ad-hoc network.

Using the fixed key FK, the node N1 encrypts the packet including the acquisition request and therefore, can prevent any analysis of the request packet by an attacker that does not have the fixed key FK. The node N1 includes the random number to be the temporary identification information generated for each communication session with the neighboring nodes N, in the packet including the acquisition request. Thereby, the node N1 can determine for each communication session whether the encrypted packet EP is a proper packet, by checking for coincidence between the random number included in the encrypted packet EP transmitted by the node N and the random number included in the received encrypted packet EP.

The random number is generated to be different for each communication session and therefore, even when the attacker uses in a replay attack, the encrypted packet EP transmitted by the neighboring node N as a response to the acquisition request of the previous session disguising this encrypted packet EP as a response to the acquisition request in the current session, the random numbers included in the encrypted packets EP do not coincide. Therefore, from the non-coincidence of the random numbers, the node N1 can determine that the encrypted packet EP received as the response to the acquisition request in the current session is an unauthorized packet transmitted in a replay attack, and can ensure the security of the communication.

By setting the validity time period for the random number used, when the attacker uses for a replay attack the encrypted packet EP transmitted as a response by the neighboring node N in the current communication session, the node N1 can determine that the encrypted packet EP is an unauthorized packet based on the expiration of the validity time period and thereby, can ensure the security of the communication.

A detailed process procedure for a concatenated counter value generation process in the first example of operation depicted in FIGS. 10 to 13 will be described with reference to FIG. 14. The concatenated counter value generation process is a process executed by the node N1 depicted in FIGS. 10 to 13. The description will be made taking an example of the node N1 as the execution entity.

Figure 14:
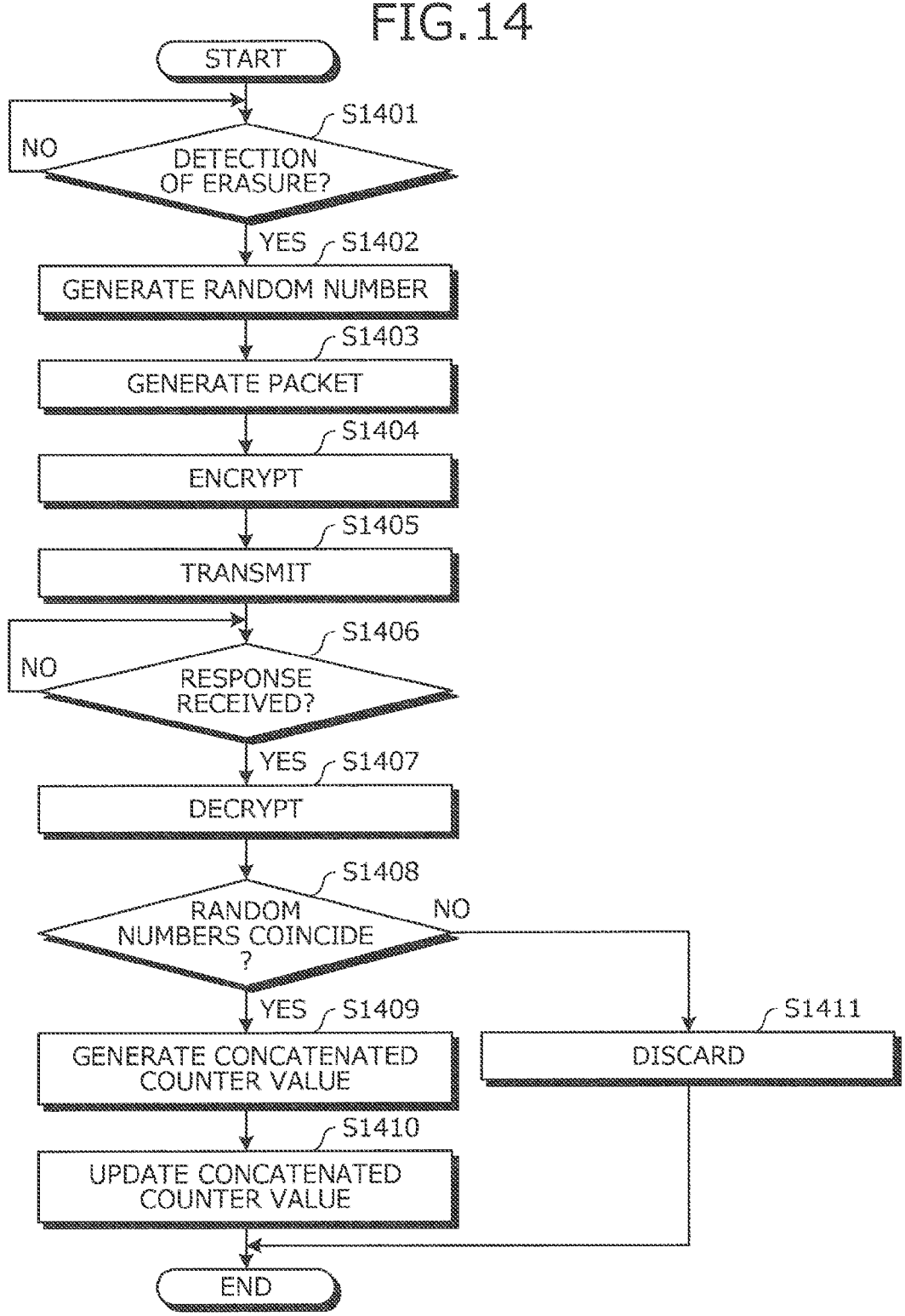
FIG. 14 is a flowchart of a detailed process procedure for a concatenated counter value generation process in the first example of operation.

FIG. 14 is a flowchart of the detailed process procedure for the concatenated counter value generation process in the first example of operation. The node N1 determines whether any erasure of the concatenated counter value JC has been detected (step S1401). If the node N1 determines that no erasure of the concatenated counter value JC has been detected (step S1401: NO), the node N1 returns to the process at step S1401 and waits for the erasure of the concatenated counter value JC to be detected.

On the other hand, if the node N1 determines that the erasure of the concatenated counter value JC has been detected (step S1401: YES), the node N1 generates the random number to be the temporary identification information (step S1402) and generates a packet that includes the identifier identifying the node N to be the transmission source, the generated random number, and an acquisition request for the transmission counter value S (step S1403).

The node N1 encrypts the generated packet using the fixed key FK (step S1404). The CPU 201 transmits the encrypted packet EP to the neighboring nodes N (step S1405).

The node N1 determines whether the node N1 has received an encrypted packet EP in response to the acquisition request from the neighboring nodes N (step S1406). If the node N1 determines that the node N1 has received no such encrypted packet EP (step S1406: NO), the node N1 returns to the process at step S1406 and waits for an encrypted packet EP to be received.

On the other hand, if the node N1 determines that the node N1 has received an encrypted packet EP (step S1406: YES), the node N1 decrypts the received encrypted packet EP using the fixed key FK (step S1407), extracts the random number from the packet obtained by the decryption, and determines whether the extracted random number coincides with the random number generated at step S1402 (step S1408).

If the node N1 determines that the random numbers coincide with each other (step S1408: YES), the node N1: extracts the erasure counter value R from the packet obtained by the decryption; generates a concatenated counter value JC by concatenating the erasure counter value R after the addition obtained by adding one to the extracted erasure counter value R and the initial value of the transmission counter value S (step S1409); stores the generated concatenated counter value JC in the RAM 202 (step S1410); and causes the concatenated counter value generation process to come to an end.

On the other hand, if the node N1 determines that the random numbers do not coincide with each other (step S1408: NO), the node N1: determines that the received encrypted packet EP is an unauthorized packet; discards the packet obtained by the decryption (step S1411); and causes the concatenated counter value generation process to come to an end.

Thereby, even if the concatenated counter value JC is erased, the node N can generate a new concatenated counter value JC that is greater than the erased concatenated counter value JC. The other node N does not discard the transmitted packet and therefore, the node N can recover in the ad-hoc network.

The node N encrypts the packet including the acquisition request using the fixed key FK and therefore, the node N can prevent any analysis of the request packet by an attacker that does not have the fixed key FK. The node N: includes the random number to be the temporary identification information generated for each communication session with the neighboring node N, in the packet including the acquisition request; and thereby, can determine whether the encrypted packet EP is a proper packet for each communication session based on the coincidence determination between the random number included in the encrypted packet EP transmitted by the node N and the random number included in the received encrypted packet EP.

The random number is generated to be different for each communication session and therefore, even when the attacker uses in the replay attack the encrypted packet EP transmitted by the neighboring node N as a response to the acquisition request in the previous session disguising this encrypted packet EP as a response to the acquisition request in the current session, the random numbers included in those encrypted packets EP do not coincide with each other. Therefore, from the non-coincidence of the random numbers, the node N can determine that the encrypted packet EP received as the response to the acquisition request in the current session is an unauthorized packet transmitted in the replay attack, and can ensure the security of the communication.

By setting the validity time period for the random number that is used, when the attacker uses in the replay attack the encrypted packet EP transmitted as a response by the neighboring node N in the current communication session, the node N can determine that the encrypted packet EP is an unauthorized packet based on the expiration of the validity time period and thereby, can ensure the security of the communication.

A second example of operation executed when the concatenated counter value JC of the node N is erased will be described with reference to FIGS. 15 to 18. In the first example of operation depicted in FIGS. 10 to 13, the packet including the acquisition request for the erasure counter value R is encrypted using the fixed key FK. However, in the second example of operation, the packet including the acquisition request for the erasure counter value R is encrypted using the access key AK. Thereby, the encrypted packet EP including the acquisition request for the erasure counter value R obtained by the encryption becomes secure than that of the case where the encrypted packet EP is encrypted using the fixed key, and the security of the communication can be ensured.

Figure 15:
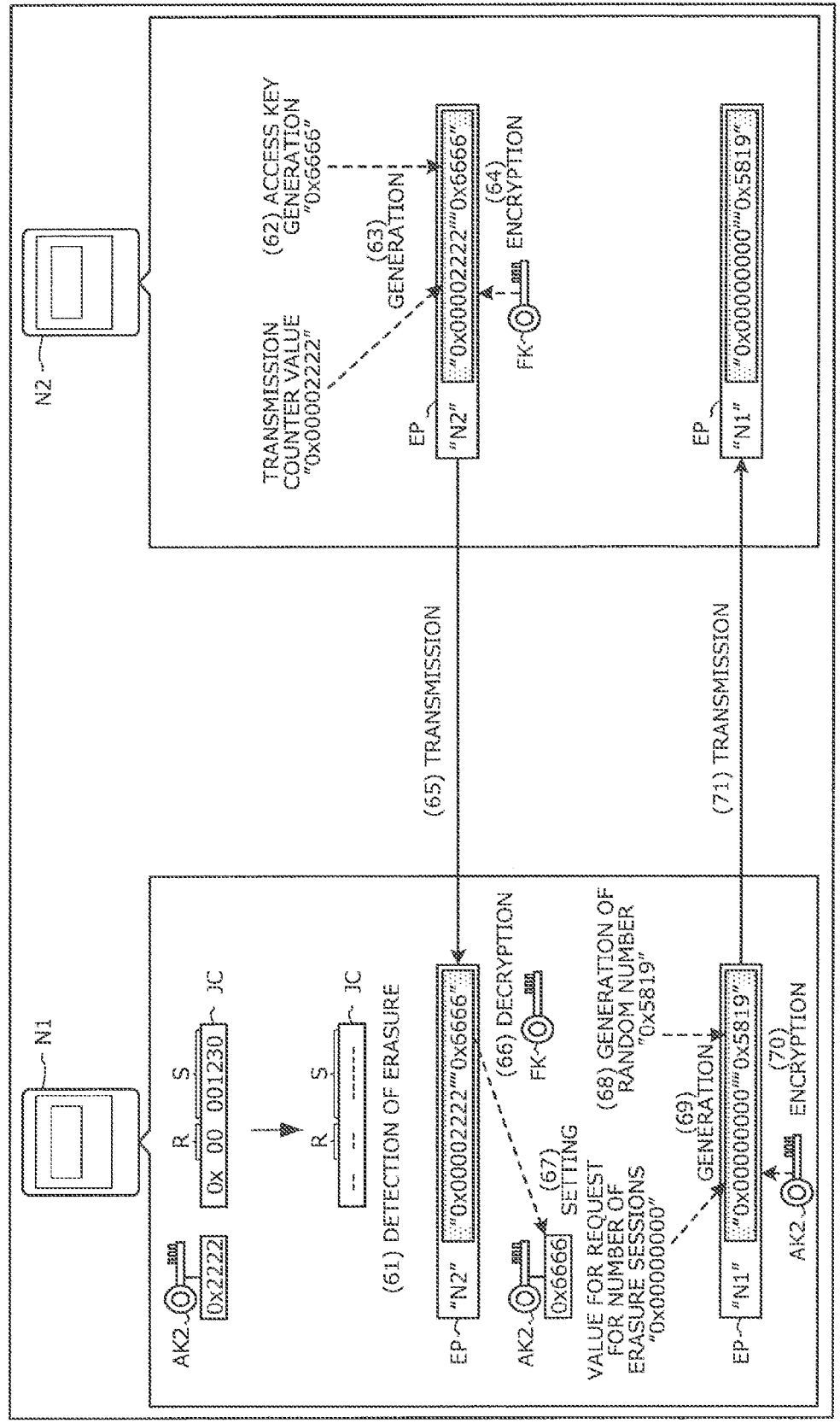
FIGS. 15, 16, 17, and 18 are explanatory diagrams of a second example of operation executed when the concatenated counter value JC of the node N is erased.
Figure 16:
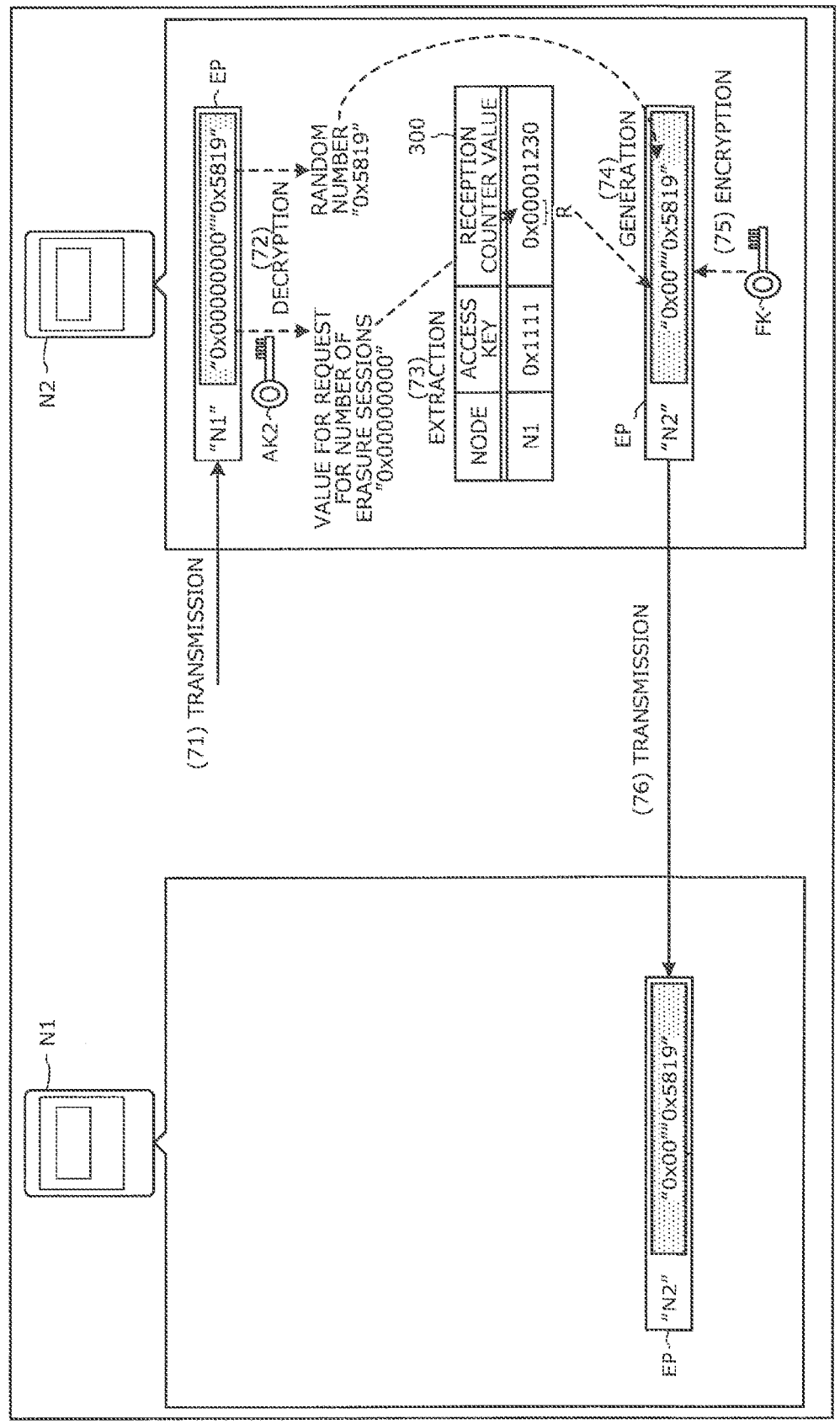
Figure 17:
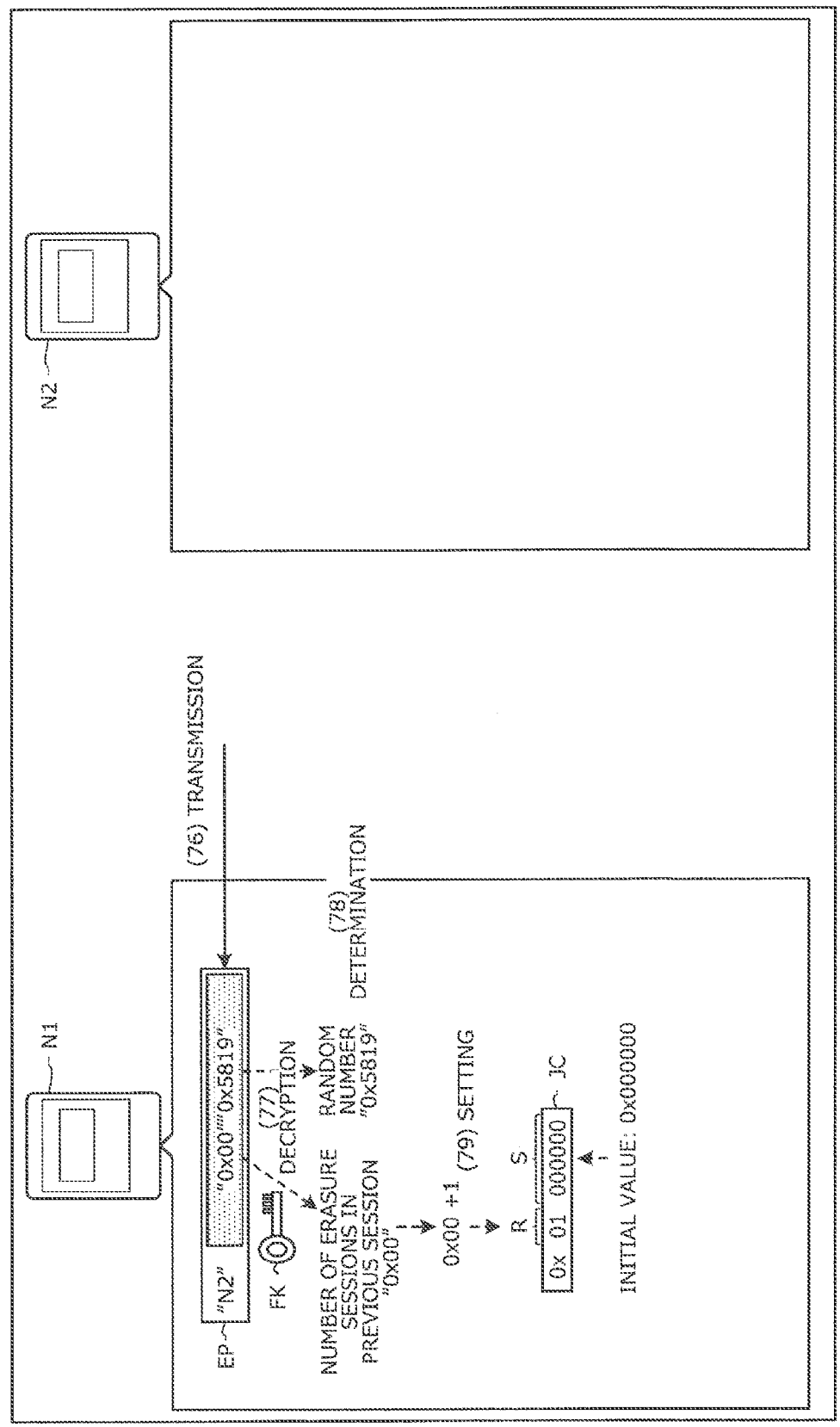
Figure 18:
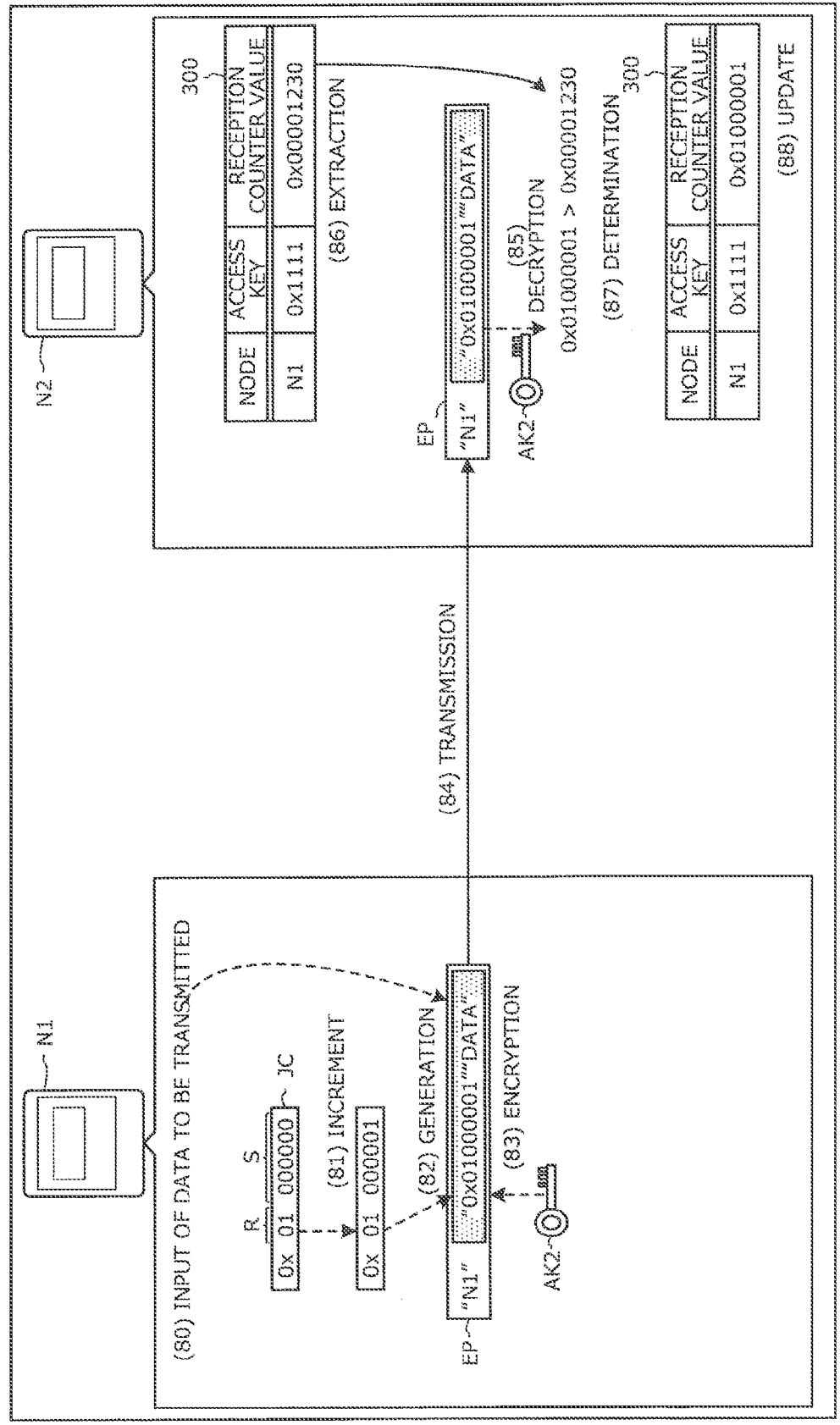

FIGS. 15, 16, 17, and 18 are explanatory diagrams of the second example of operation executed when the concatenated counter value JC of the node N is erased. Portions identical to those described with reference to FIG. 1 will not again be described. In the example of FIG. 15, the node N1 retains the access key AK2 "0x2222" to be used in the encryption of the packet to be received from the node N2 and transmitted thereto.

The node N1 retains the concatenated counter value JC "0x00001230". The node N2 extracts the concatenated counter value JC from the packet obtained by decrypting the encrypted packet EP received from the node N1 in the past, and retains the extracted concatenated counter value JC "0x00001230" as the reception counter value RC.

It is assumed in FIG. 15 that no electric power is supplied to the node N1 due to a power failure and the concatenated counter value JC "0x00001230" and the access key AK2 retained by the node N1 are erased. Therefore, the concatenated counter value JC to be included in the packet to be transmitted to another node N is unknown and the node N1 cannot transmit the packet to the other node N.

(61) When the power failure is recovered and the supply of the electric power is started, the node N1 detects the erasure of the concatenated counter value JC retained thereby. Here, the node N1 waits until the access key AK is transmitted from the neighboring nodes N.

(62) Meanwhile, the node N2 generates a new access key AK2 "0x6666" triggered by an access key AK generation event automatically generated by the node N2 itself at constant intervals.

(63) When the node N2 generates the access key AK2, the node N2 generates a packet that includes the identifier "N2" identifying the transmission source, the concatenated counter value JC "0x00002222" of the node N2 , and the generated access key AK2 "0x6666". The identifier identifying the transmission source is included in a portion not encrypted in the packet (for example, the header portion of the packet).

(64) When the node N2 generates the packet, the node N2 , using the fixed key FK, encrypts the concatenated counter value JC "0x00002222" and the access key AK2 "0x6666" in the generated packet.

(65) The node N2 transmits the encrypted packet EP obtained by the encryption to the neighboring nodes N including the node N1.

(66) When the node N1 receives the encrypted packet EP transmitted from the node N2 , the node N1 obtains the identifier "N2" identifying the transmission source, from the received encrypted packet EP, decrypts the received encrypted packet EP using the fixed key FK, and obtains the concatenated counter value JC "0x00002222" and the access key AK2 "0x6666" from the packet obtained by the decryption.

In this case, the storage contents of the node DB 300 is erased due to the power failure and no record for the node N2 is present in the node DB 300.

(67) Therefore, the node N1 adds to the node DB 300, a record that correlates the obtained concatenated counter value JC "0x00002222" and the access key AK2 "0x6666" with the obtained identifier "N2".

(68) When the node N1 adds the record to the node DB 300, the node N1 generates a random number to be the temporary identification information. In the example of FIG. 15, the node N1 generates "0x5819" as the random number and stores the generated random number "0x5819" in the RAM 202.

(69) When the node N1 generates the random number, the node N1 generates a packet that includes the identifier "N1"

identifying the transmission source, "0x00000000" set as the concatenated counter value JC indicating the acquisition request for the erasure counter value R, and the generated random number "0x5819". The identifier identifying the transmission source is included in a portion not encrypted in the packet (for example, the header portion of the packet).

(70) When the node N1 generates the packet, the node N1, using the access key AK2, encrypts the concatenated counter value JC "0x00000000" and the random number "0x5819" in the generated packet.

(71) The node N1 transmits to the node N2, the encrypted packet EP obtained by the encryption. The procedure advances to that depicted in FIG. 16.

(72) When the node N2 receives the encrypted packet EP transmitted from the node N1 at (71), the node N2 obtains from the received encrypted packet EP, the identifier "N1" identifying the transmission source; decrypts the received encrypted packet EP using the access key AK2; and obtains the concatenated counter value JC "0x00000000" and the random number "0x5819" from the packet obtained by the decryption.

(73) The node N2 detects that the obtained concatenated counter value JC is "0x00000000" set as the concatenated counter value JC indicating the acquisition request for the erasure counter value R; extracts from the node DB 300, the reception counter value RC correlated with the obtained identifier "N1" identifying the transmission source; and extracts the erasure counter value R "0x00" from the extracted reception counter value RC.

(74) When the node N2 extracts the erasure counter value R, the node N2 generates a packet that includes the identifier "N2" identifying the transmission source, the extracted erasure counter value R "0x00", and the obtained random number "0x5819". The identifier identifying the transmission source is included in a portion not encrypted in the packet (for example, the header portion of the packet).

(75) The node N2 encrypts the erasure counter value R "0x00" and the random number "0x5819" in the generated packet using the fixed key FK.

(76) The node N2 transmits to the node N1 indicated by the obtained identifier "N1", the encrypted packet EP obtained by the encryption. The procedure advances to that depicted in FIG. 17.

(77) When the node N1 receives the encrypted packet EP transmitted from the node N2 at (76), the node N1 obtains the identifier "N2" identifying the transmission source from the received encrypted packet EP, decrypts the received encrypted packet EP using the fixed key FK, and obtains the erasure counter value R "0x00" and the random number "0x5819" from the packet obtained by the decryption.

(78) When the node N1 obtains the random number, the node N1 checks for coincidence between the obtained random number and the random number stored in the RAM 202 at (68). The obtained random number "0x5819" and the random number "0x5819" stored in the RAM 202 coincide with each other and therefore, the node N1 determines that the encrypted packet EP received at (77) is a proper packet.

(79) If the node N1 determines that the encrypted packet EP is a proper packet, the node N1: adds one to the obtained erasure counter value R "0x00" indicating the erasure counter value R before the erasure of the concatenated counter value JC; and generates a concatenated counter value JC "0x01000000" by concatenating the erasure counter value R "0x01" after the addition with the initial value "0x000000" of the transmission counter value S. Thereby, the node N1 generates the new concatenated counter value JC instead of the erased concatenated counter value JC.

On the other hand, when the obtained random number and the random number stored in the RAM 202 at (68) do not coincide with each other, the node N1 determines that the encrypted packet EP received at (77) is an unauthorized packet. If the node N1 determines that the encrypted packet EP is an unauthorized packet, the node N1 discards the packet obtained by the decryption and thereby, ensures the security of the communication. The procedure advances to that depicted in FIG. 18.

(80) When the node N1 receives an input of data addressed to the node N2 from the user of the node N1, the node N1 starts the encrypted communication with the node N2. In this case, the node N1 starts the encrypted communication triggered by the input of the data from the user. However, the node N1 may start the encrypted communication triggered by a data transmission event automatically generated by the node N1.

(81) When the node N1 receives the input of the data addressed to the node N2, the node N1 adds one to the new concatenated counter value JC "0x01000000" generated at (79).

(82) The node N1 generates a packet that includes the identifier "N1" identifying the transmission source, the data addressed to the node N2, and the concatenated counter value JC "0x01000001" after the addition. The identifier identifying the transmission source is included in a portion not encrypted in the packet (for example, the header portion of the packet).

(83) When the node N1 generates the packet, the node N1 obtains from the node DB 300, the access key AK2 "0x6666" correlated with the identifier "N2" identifying the node N2 that is the addressee of the data, and using the access key AK2, encrypts the data addressed to the node N2 and the concatenated counter value JC "0x01000001" after the addition in the generated packet.

(84) The node N1 transmits to the node N2 that is the addressee of the data, the encrypted packet EP obtained by the encryption.

(85) When the node N2 receives the encrypted packet EP transmitted from the node N1, the node N2 obtains the identifier "N1" identifying the transmission source from the received encrypted packet EP, decrypts the received encrypted packet EP using the access key AK2, and obtains the data addressed to the node N2 and the concatenated counter value JC "0x01000001" from the packet obtained by the decryption.

(86) When the node N2 obtains the concatenated counter value JC "0x01000001", the node N2 extracts from the node DB 300, the reception counter value RC correlated with the obtained identifier "N1" identifying the transmission source.

(87) The node N2 compares the magnitudes of the obtained concatenated counter value JC "0x01000001" and the extracted reception counter value RC "0x00001230". The node N2 determines that the obtained concatenated counter value JC "0x01000001" is greater than the extracted reception counter value RC "0x00001230" and therefore, determines that the received encrypted packet EP is a proper packet.

(88) When the node N2 determines that the received encrypted packet EP is a proper packet, the node N2 updates the reception counter value RC "0x00001230" correlated with the identifier "N1" in the node DB 300 to the obtained concatenated counter value JC "0x01000001".

On the other hand, if the node N2 determines that the obtained concatenated counter value JC is less than or equal to the extracted reception counter value RC, the node N2 determines that the received encrypted packet EP is an unauthorized packet. When the node N2 determines that the received encrypted packet EP is an unauthorized packet, the node N2 discards the packet obtained by the decryption and thereby, ensures the security of the communication.

As described, the node N1 retains the concatenated counter value JC obtained by concatenating the erasure counter value R as the higher order digits and the transmission counter value S as the lower order digits; when the concatenated counter value JC is erased, the node N1 obtains from the other node N, the erasure counter value R before the erasure; and the node N1 generates the new concatenated counter value JC including the erasure counter value R after the addition obtained by adding one to the erasure counter value R before the erasure, as the higher order digits.

Thereby, the new concatenated counter value JC generated by the node N1 is greater than the concatenated counter value JC included in the encrypted packet EP transmitted by the node N1 in the past. Therefore, the node N1 can include the concatenated counter value JC that is greater than the reception counter value RC retained by the other node N, in the encrypted packet EP to be transmitted to the other node N.

The concatenated counter value JC included in the encrypted packet EP received in the current session is greater than the reception counter value RC indicating the concatenated counter value JC included in the encrypted packet EP received in the previous session and therefore, the node N2 can determine that the encrypted packet EP is a proper packet. The concatenated counter value JC included in the encrypted packet EP received in the previous session is retained as the reception counter value RC. The other node N does not determine that the encrypted packet EP transmitted to the other node N is an unauthorized packet and therefore, the node N1 can recover in the ad-hoc network.

The node N1 encrypts the packet including the acquisition request using the access key AK and therefore, can prevent any analysis of the request packet by an attacker that does not have the access key AK. The node N1 includes the random number to be the temporary identification information generated for each communication session with the neighboring nodes N, in the packet including the acquisition request. Thereby, the node N1 can determine for each communication session, whether the encrypted packet EP is a proper packet, by checking for coincidence between the random number included in the encrypted packet EP transmitted by the node N and the random number included in the received encrypted packet EP.

The random number is generated to be different for each communication session and therefore, even when the attacker uses in a replay attack, the encrypted packet EP transmitted by the neighboring node N as a response to the acquisition request of the previous session disguising this encrypted packet EP as a response to the acquisition request in the current session, the random numbers included in the encrypted packets EP do not coincide. Therefore, from the non-coincidence of the random numbers, the node N1 can determine that the encrypted packet EP received as the response to the acquisition request in the current session is an unauthorized packet transmitted in a replay attack, and can ensure the security of the communication.

By setting the validity time period for the random number used, when the attacker uses for a replay attack the encrypted packet EP transmitted as a response by the neighboring node N in the current communication session, the node N1 can determine that the encrypted packet EP is an unauthorized packet based on the expiration of the validity time period and thereby, can ensure the security of the communication.

A detailed process procedure for a concatenated counter value generation process in the second example of operation depicted in FIGS. 15 to 18 will be described with reference to FIGS. 19 and 20. The concatenated counter value generation process is a process executed by the node N1 depicted in FIGS. 15 to 18. The description will be made taking an example of the node N1 as the execution entity.

Figure 19:
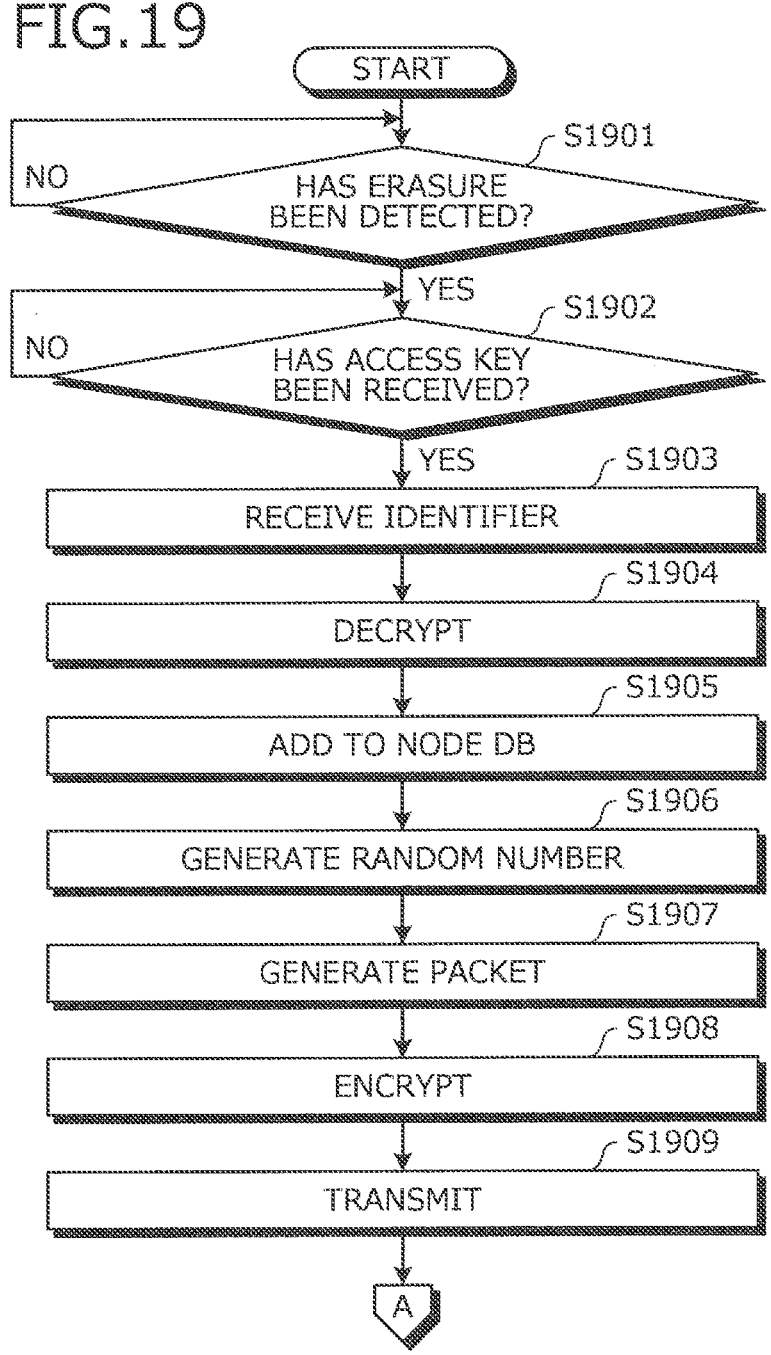
FIGS. 19 and 20 are flowcharts of a detailed process procedure for the concatenated counter value generation process in the second example of operation.
Figure 20:
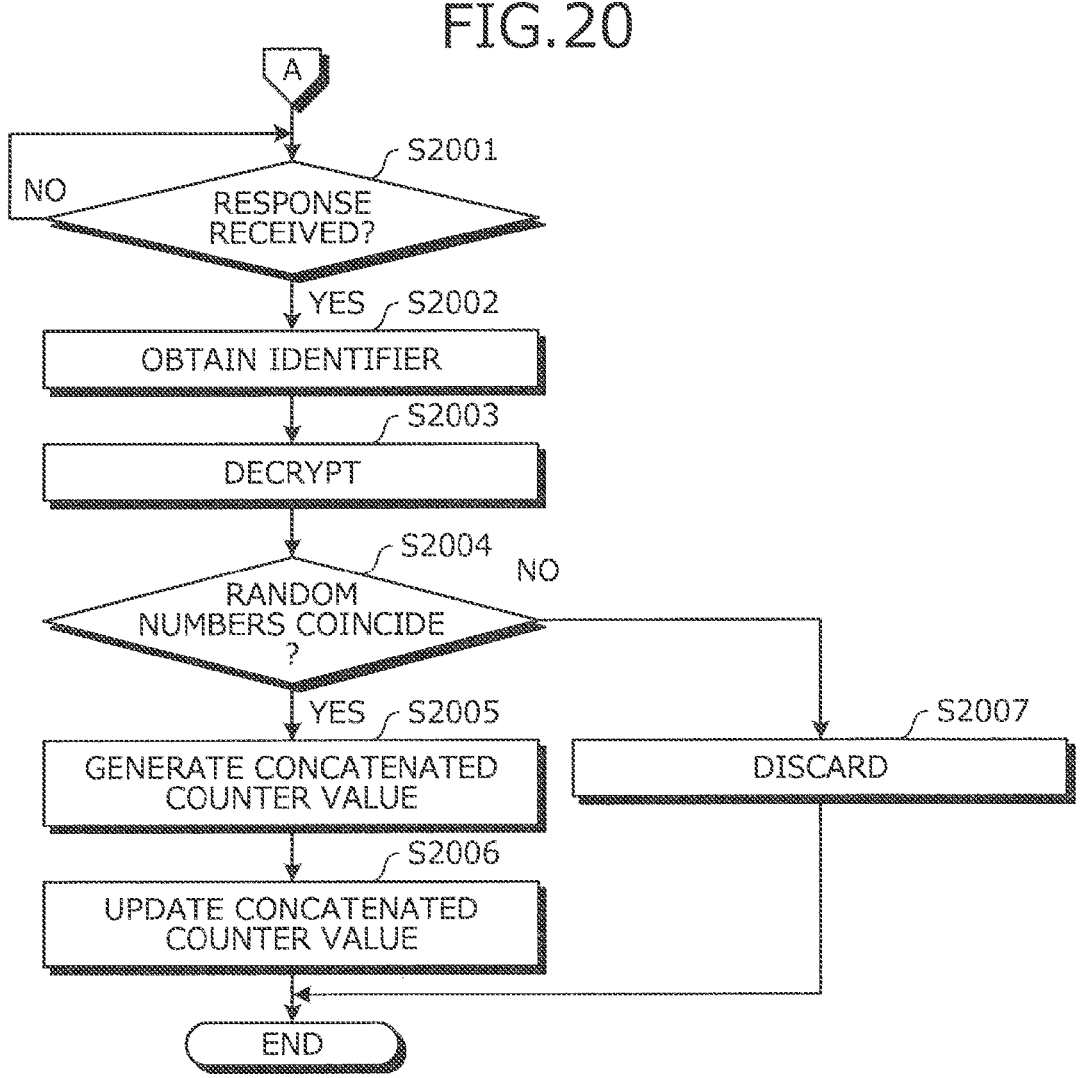

FIGS. 19 and 20 are flowcharts of the detailed process procedure for the concatenated counter value generation process in the second example of operation. The node N1 determines whether any erasure of the concatenated counter value JC has been detected (step S1901). If the node N1 determines that no erasure of the concatenated counter value JC has been detected (step S1901: NO), the node N1 returns to the process at step S1901 and waits for the erasure of the concatenated counter value JC to be detected.

On the other hand, if the node N1 determines that the erasure of the concatenated counter value JC has been detected (step S1901: YES), the node N1 determines whether the node N1 has received an encrypted packet EP including the access key AK from a neighboring node N (step S1902). If the node N1 determines that the node N1 has not received an encrypted packet EP including the access key AK (step S1902: NO), the node N1 returns to the process at step S1902 and waits for the encrypted packet EP including the access key AK to be received.

On the other hand, if the node N1 determines that the node N1 has received an encrypted packet EP including the access key AK (step S1902: YES), the node N1 obtains the identifier identifying the transmission source from the portion not encrypted in the encrypted packet EP (for example, the header portion of the packet) (step S1903).

The node N1 decrypts the received encrypted packet EP using the fixed key FK (step S1904), extracts the access key AK from the packet obtained by the decryption, and adds to the node DB 300, a record that correlates the extracted access key AK with the obtained identifier identifying the transmission source (step S1905).

The node N1 generates a random number to be the temporary identification information (step S1906) and generates a packet that includes the identifier identifying the node N to be the transmission source, the generated random number, and the acquisition request for the transmission counter value S (step S1907).

The node N1 encrypts the generated packet using the access key AK extracted at step S1905 (step S1908). The CPU 201 transmits the encrypted packet EP to the node N identified by the identifier obtained at step S1903 (step S1909). The node N1 advances to the process at step S2001 of FIG. 20.

In FIG. 20, the node N1 determines whether the node N1 has received from the node N identified by the identifier obtained at step S1903, an encrypted packet EP in response to the acquisition request (step S2001). If the node N1 determines that the node N1 has not received an encrypted packet EP (step S2001: NO), the node N1 returns to the process at step S2001 and waits for an encrypted packet EP to be received.

On the other hand, if the node N1 determines that the node N1 has received the encrypted packet EP (step S2001: YES), the node N1 obtains from the portion not encrypted in the encrypted packet EP (for example, the header portion of the packet), the identifier identifying the transmission source (step S2002).

The node N1 decrypts the received encrypted packet EP using the fixed key FK (step S2003), extracts the random number from the packet obtained by the decryption, and determines whether the extracted random number coincides with the random number generated at step S1906 (step S2004).

If the node N1 determines that the random numbers coincide with each other (step S2004: YES), the node N1: extracts the erasure counter value R from the packet obtained by the decryption; generates a concatenated counter value JC by concatenating the erasure counter value R after the addition obtained by adding one to the extracted erasure counter value R and the initial value of the transmission counter value S (step S2005); stores the generated concatenated counter value JC in the RAM 202 (step S2006); and causes the concatenated counter value generation process to come to an end.

On the other hand, if the node N1 determines that the random numbers do not coincide with each other (step S2004: NO), the node N1: determines that the received encrypted packet EP is an unauthorized packet; discards the packet obtained by the decryption (step S2007); and causes the concatenated counter value generation process to come to an end.

Thereby, even if the concatenated counter value JC is erased, the node N can generate a new concatenated counter value JC that is greater than the erased concatenated counter value JC. The other node N does not discard the transmitted packet and therefore, the node N can recover in the ad-hoc network.

The node N encrypts the packet including the acquisition request using the access key AK and therefore, the node N can prevent any analysis of the request packet by an attacker that does not have the access key AK. The node N: includes the random number to be the temporary identification information generated for each communication session with the neighboring node N, in the packet including the acquisition request; and thereby, can determine whether the encrypted packet EP is a proper packet for each communication session based on the coincidence determination between the random number included in the encrypted packet EP transmitted by the node N and the random number included in the received encrypted packet EP.

The random number is generated to be different for each communication session and therefore, even when the attacker uses in the replay attack the encrypted packet EP transmitted by the neighboring node N as a response to the acquisition request in the previous session disguising this encrypted packet EP as a response to the acquisition request in the current session, the random numbers included in those encrypted packets EP do not coincide with each other. Therefore, from the non-coincidence of the random numbers, the node N can determine that the encrypted packet EP received as the response to the acquisition request in the current session is an unauthorized packet transmitted in the replay attack, and can ensure the security of the communication.

By setting the validity time period for the random number that is used, when the attacker uses in the replay attack the encrypted packet EP transmitted as a response by the neighboring node N in the current communication session, the node N can determine that the encrypted packet EP is an unauthorized packet based on the expiration of the validity time period and thereby, can ensure the security of the communication.

A third example of operation executed when the concatenated counter value JC of the node N is erased will be described with reference to FIGS. 21 and 22. In the first and second examples of operation, when no electric power is supplied to the node N, the erasure counter value R together with the concatenated counter value JC is erased. However, in the third example of operation, the erasure counter value R is stored in the non-volatile memory such that the erasure counter value R is not erased even when no electric power is supplied to the node N. Thereby, the node N does not obtain the erasure counter value R from the other node N and therefore, the risk of the replay attack can be reduced and the security of the communication can be ensured.

FIGS. 21 and 22 are explanatory diagrams of the third example of operation executed when the concatenated counter value JC of the node N is erased. Portions identical to those described with reference to FIG. 1 will not again be described. In the example of FIG. 21, the node N1 retains the access key AK2 "0x2222" to be used in the encryption of the packet to be received from the node N2 and transmitted thereto.

The node N1 retains the concatenated counter value JC "0x00001230". The concatenated counter value JC is frequently rewritten and therefore, is stored in the RAM 202 that is volatile. The node N1 retains the erasure counter value R "0x00" separately from the concatenated counter value JC. The erasure counter value R is stored in the flash memory 203 that is non-volatile.

The node N2 extracts the concatenated counter value JC from the packet obtained by decrypting the encrypted packet EP received from the node N1 in the past, and retains the extracted concatenated counter value JC "0x00001230" as the reception counter value RC.

It is assumed in FIG. 21 that no electric power is supplied to the node N1 due to a power failure and the concatenated counter value JC "0x00001230" and the access key AK2 retained by the node N1 are erased. Therefore, the concatenated counter value JC to be included in the packet to be transmitted to another node N is unknown and the node N1 cannot transmit the packet to the other node N.

(91) When the power failure is recovered and the supply of the electric power is started, the node N1 detects the erasure of the concatenated counter value JC retained thereby.

(92) When the node N1 detects that the concatenated counter value JC is erased, the node N1 adds one to the erasure counter value R "0x00" stored in the flash memory 203.

(93) The node N1 generates the concatenated counter value JC "0x01000000" by concatenating the erasure counter value R "0x01" after the addition stored in the flash memory 203 and the initial value "0x000000" of the transmission counter value S. Thereby, the node N1 generates a new concatenated counter value JC instead of the erased concatenated counter value JC. The procedure advances to that depicted in FIG. 22.

(94) When the node N1 receives an input of data addressed to the node N2 from the user of the node N1, the node N1 starts encrypted communication with the node N2. In this case, the node N1 starts the encrypted communication triggered by the input of the data from the user. However, the node N1 may start the encrypted communication triggered by a data transmission event automatically generated by the node N1.

(95) When the node N1 receives the input of the data addressed to the node N2, the node N1 adds one to the new concatenated counter value JC "0x01000000" generated at (93).

(96) The node N1 generates a packet that includes the identifier "N1" identifying the transmission source, the data addressed to the node N2, and the concatenated counter value JC "0x01000001" after the addition. The identifier identifying the transmission source is included in a portion not encrypted in the packet (for example, the header portion of the packet).

(97) When the node N1 generates the packet, the node N1 encrypts the data addressed to the node N2 and the concatenated counter value JC "0x0100001" after the addition in the generated packet using the fixed key FK.

(98) The node N1 transmits the encrypted packet EP obtained by the encryption to the node N2 that is the addressee of the data.

(99) When the node N2 receives the encrypted packet EP transmitted from the node N1, the node N2 obtains the identifier "N1" identifying the transmission source, from the received encrypted packet EP, decrypts the received encrypted packet EP using the fixed key FK, and obtains the data addressed to the node N2 and the concatenated counter value JC "0x01000001" from the packet obtained by the decryption.

(100) When the node N2 obtains the concatenated counter value JC "0x01000001", the node N2 extracts from the node DB 300, the reception counter value RC correlated with the obtained identifier "N1" identifying the transmission source.

(101) The node N2 compares the magnitudes of the obtained concatenated counter value JC "0x01000001" and the extracted reception counter value RC "0x00001230". The obtained concatenated counter value JC "0x01000001" is greater than the extracted reception counter value RC "0x00001230" and therefore, the node N2 determines that the received encrypted packet EP is a proper packet.

(102) If the node N2 determines that the received encrypted packet EP is a proper packet, the node N2 updates the reception counter value RC "0x00001230" correlated with the identifier "N1" in the node DB 300, to the obtained concatenated counter value JC "0x01000001".

On the other hand, if the obtained concatenated counter value JC is less than or equal to the extracted reception counter value RC, the node N2 determines that the received encrypted packet EP is an unauthorized packet. If the node N2 determines that the received encrypted packet EP is an unauthorized packet, the node N2 discards the packet obtained by the decryption and thereby, ensures the security of the communication.

As described, the node N1 stores the concatenated counter value JC in the volatile memory (for example, the RAM 202) and thereby, can execute at a high speed a reading process of the concatenated counter value JC for the transmission and the updating process of the concatenated counter value JC for the reception.

The node N1 stores only the erasure counter value R whose rewriting frequency is low in the non-volatile memory (for example, the flash memory 203) separately from the concatenated counter value JC. When the concatenated counter value JC is erased, the node N1 obtains from the non-volatile memory, the erasure counter value R before the erasure, and generates a new concatenated counter value JC including the erasure counter value R after the addition obtained by adding one to the erasure counter value R before the erasure, as the higher order digits. Thereby, the new concatenated counter value JC generated by the node N1 is greater than the concatenated counter value JC included in the encrypted packet EP transmitted by the node N1 in the past. Therefore, the node N1 can include a concatenated counter value JC that is greater than the reception counter value RC retained by the other node N, in the encrypted packet EP to be transmitted to the other node N.

Thereby, the concatenated counter value JC included in the encrypted packet EP received from the node N1 is greater than the reception counter value RC retained by the node N2 and therefore, the node N2 can determine that the encrypted packet EP received from the node N1 is a proper packet. The other node N does not determine that the encrypted packet EP transmitted to the other node N is an unauthorized packet and therefore, the node N1 can recover in the ad-hoc network. No erasure counter value R is obtained from the other node N and therefore, the risk of the replay attack can be reduced and the security of the communication can be ensured.

A detailed process procedure for a concatenated counter value generation process in the third example of operation depicted in FIGS. 21 and 22 will be described with reference to FIG. 23. The concatenated counter value generation process is a process executed by the node N1 depicted in FIGS. 21 and 22. The description will be made taking an example of the node N1 as the execution entity.

FIG. 23 is a flowchart of the detailed process procedure for the concatenated counter value generation process in the third example of operation. The node N1 determines whether any erasure of the concatenated counter value JC has been detected (step S2301). If the node N1 determines that no erasure of the concatenated counter value JC has been detected (step S2301: NO), the node N1 returns to the process at step S2301 and waits for the erasure of the concatenated counter value JC to be detected.

On the other hand, if the node N1 determines that the erasure of the concatenated counter value JC has been detected (step S2301: YES), the node N1 reads the erasure counter value R from the non-volatile memory (step S2302) and generates a concatenated counter value JC by concatenating the erasure counter value R after the addition obtained by adding one to the read erasure counter value R and the initial value of the transmission counter value S (step S2303).

The node N1 stores the generated concatenated counter value JC in the RAM 202 (step S2304) and causes the concatenated counter value generation process to come to an end. Thereby, even when the concatenated counter value JC is erased, the node N can generate a new concatenated counter value JC that is greater than the erased concatenated counter value JC. The other node N does not discard the transmitted packet and therefore, the node N can recover in the ad-hoc network.

As described, the node N: retains the concatenated counter value JC; when the concatenated counter value JC is erased, obtains the erasure counter value R before the erasure from the other node N; and generates a new concatenated counter value JC including the erasure counter value R after the addition obtained by adding one to the erasure counter value R before the erasure, as the higher order digits. Thereby, the new concatenated counter value JC is greater than the concatenated counter value JC included in the encrypted packet EP transmitted by the node N in the past. Therefore, the node N can include a concatenated counter value JC that is greater than the reception counter value RC retained by the other node N, in the encrypted packet EP to be transmitted to the other node N.

Thereby, the concatenated counter value JC included in the encrypted packet EP received from the node N is greater than the reception counter value RC retained by the other node N and therefore, the other node N can determine that the encrypted packet EP received from the node N is a proper packet. The other node N does not determine that the encrypted packet EP transmitted to the other node N is an unauthorized packet and therefore, the node N can recover in the ad-hoc network. As described, the concatenated counter value JC is restored and therefore, the synchronization by the time synchronization packet is unnecessary and reduction of the communication load can be facilitated in the ad-hoc network.

The node N encrypts the packet including the acquisition request using the fixed key FK and therefore, any analysis can be prevented of the request packet by an attacker that does not have the fixed key FK. The node N includes in the packet including the acquisition request, the random number to be the temporary identification information and generated for each communication session with the neighboring node N. Thereby, the node N can determine whether the encrypted packet EP is a proper packet for each communication session based on the coincidence determination between the random number included in the encrypted packet EP transmitted by the node N and the random number included in the received encrypted packet EP.

The random number is generated to be different for each communication session and therefore, even when the attacker uses in a replay attack, the encrypted packet EP transmitted by the neighboring node N as a response to the acquisition request of the previous session disguising this encrypted packet EP as a response to the acquisition request in the current session, the random numbers included in the encrypted packets EP do not coincide. Therefore, from the non-coincidence of the random numbers, the node N can determine that the encrypted packet EP received as the response to the acquisition request in the current session is an unauthorized packet transmitted in a replay attack, and can ensure the security of the communication.

The node N: retains the concatenated counter value JC; when the concatenated counter value JC is erased, obtains from the other node N, the erasure counter value R before the erasure; and generates a new concatenated counter value JC including the erasure counter value R after the addition obtained by adding one to the erasure counter value R before the erasure, as the higher order digits. Thereby, the new concatenated counter value JC generated by the node N is greater than the concatenated counter value JC included in the encrypted packet EP transmitted by the node N in the past. Therefore, the node N can include in the encrypted packet EP to be transmitted to the other node N, a concatenated counter value JC that is greater than the reception counter value RC retained by the other node N.

Thereby, the concatenated counter value JC included in the encrypted packet EP received from the node N is greater than the reception counter value RC retained by the other node N and therefore, the other node N can determine that the encrypted packet EP received from the node N is a proper packet. The other node N does not determine that the encrypted packet EP transmitted to the other node N is an unauthorized packet and therefore, the node N can recover in the ad-hoc network.

Using the access key AK, the node N encrypts the packet, which includes the acquisition request, and therefore, any analysis can be prevented of the request packet by an attacker that does not have the access key AK. The node N includes in the packet including the acquisition request, the random number that is to be the temporary identification information and generated for each communication session with the neighboring nodes N. Thereby, the node N can determine whether the encrypted packet EP is a proper packet for each communication session based on the coincidence determination between the random number included in the encrypted packet EP transmitted by the node N and the random number included in the received encrypted packet EP.

The random number is generated to be different for each communication session and therefore, even when the attacker uses in a replay attack, the encrypted packet EP transmitted by a neighboring node N as a response to the acquisition request in the previous session disguising this encrypted packet EP as a response to the acquisition request in the current session, the random numbers included in the encrypted packets EP do not coincide. Therefore, from the non-coincidence of the random numbers, the node N can determine that the encrypted packet EP received as the response to the acquisition request in the current session is an unauthorized packet transmitted in a replay attack, and can ensure the security of the communication.

The node N stores the concatenated counter value JC in the volatile memory (for example, the RAM 202) and thereby, can execute at a high speed the reading process of the concatenated counter value JC for the transmission and the updating process of the concatenated counter value JC for the reception. The node N stores only the erasure counter value R whose rewriting frequency is low in the non-volatile memory (for example, the flash memory 203) separately from the concatenated counter value JC.

When the concatenated counter value JC is erased, the node N obtains from the non-volatile memory the erasure counter value R before the erasure, and generates a new concatenated counter value JC including the erasure counter value R after the addition obtained by adding one to the erasure counter value R before the erasure as its high digits. Thereby, the new concatenated counter value JC generated by the node N is greater than the concatenated counter value JC included in the encrypted packet EP transmitted by the node N in the past. Therefore, the node N can include in the encrypted packet EP to be transmitted to the other node N, a concatenated counter value JC that is greater than the reception counter value RC retained by the other node N.

Thereby, the concatenated counter value JC included in the encrypted packet EP received from the node N is greater than the reception counter value RC retained by the other node N and therefore, the other node N can determine that the encrypted packet EP received from the node N is a proper packet. The other node N does not determine that the encrypted packet EP transmitted to the other node N is an unauthorized packet and therefore, the node N can recover in the ad-hoc network. The node N does not obtain the erasure counter value R from the other node N and therefore, the risk of the replay attack can be reduced and the security of the communication can be ensured.

The communication method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of the embodiment, an effect is achieved that reduction of the communication load can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node in an ad-hoc network, the node comprising:
   a memory configured to store a concatenated counter value composed of two counter values, the concatenated counter value including, as higher order digits, an erasure counter value indicating number of erasure sessions at the node and including, as lower order digits, a transmission counter value indicating number of transmission sessions from the node; and a processor configured to:
  update by adding one to the transmission counter value of the concatenated counter value stored in the memory, when the node transmits data to another node in the ad-hoc network;
  transmit to the another node, the data and the concatenated counter value after updating;
  detect erasure of the concatenated counter value in the memory;
  distribute in the ad-hoc network and upon detecting the erasure, an acquisition request for the erasure counter value;
  receive from the ad-hoc network and consequent to distributing the acquisition request, the erasure counter value;
  generate the concatenated counter value to include, as the higher order digits, the received erasure counter value after an addition of one to the erasure counter value and to include, as the lower order digits, the transmission counter value after the erasure and indicating that the number of transmission sessions has become zero due to the erasure; and
  archive to the memory, the generated concatenated counter value.

2. A node in an ad-hoc network, the node comprising:
a memory configured to store a concatenated counter value composed of two counter values, the concatenated counter value including, as higher order digits, an erasure counter value indicating number of erasure sessions at the node and including, as lower order digits, a transmission counter value indicating number of transmission sessions from the node; and a processor configured to:
  update by adding one to the transmission counter value of the concatenated counter value stored in the memory, when the node transmits data to another node in the ad-hoc network;
  transmit to the another node, the data and the concatenated counter value after updating;
  detect erasure of the concatenated counter value in the memory;
  distribute in the ad-hoc network and upon detecting the erasure, an updating request for the erasure counter value;
  receive from the ad-hoc network and consequent to distributing the updating request, the erasure counter value after an addition of one to the erasure counter value;
  generate the concatenated counter value to include, as the higher order digits, the received erasure counter value after the addition and to include, as the lower order digits, the transmission counter value after the erasure and indicating that the number of transmission sessions has become zero due to the erasure; and
  archive to the memory, the generated concatenated counter value.

3. A node in an ad-hoc network, the node comprising:
a first volatile memory configured to store a concatenated counter value composed of two counter values, the concatenated counter value including, as higher order digits, an erasure counter value indicating number of erasure sessions at the node and including, as lower order digits, a transmission counter value indicating number of transmission sessions from the node;

a second non-volatile memory configured to store the erasure counter value; and a processor configured to:
  update by adding one to the transmission counter value of the concatenated counter value stored in the first volatile memory, when the node transmits data to another node in the ad-hoc network;
  transmit to the another node, the data and the concatenated counter value after updating;
  detect erasure of the concatenated counter value in the first volatile memory;
  extract from the second non-volatile memory and upon detecting the erasure, the erasure counter value;
  generate the concatenated counter value to include, as the higher order digits, the erasure counter value after an addition of one to the extracted erasure counter value and to include, as the lower order digits, the transmission counter value after the erasure and indicating that the number of transmission sessions has become zero due to the erasure; and
  archive the generated concatenated counter value to the first volatile memory, and overwrite the erasure counter value stored in the second non-volatile memory with the erasure counter value after the addition.

4. The node according to claim 1, wherein
the processor is further configured to:
  encrypt, using a common key retained by the node and the another node, the acquisition request that includes first identification information specific to the node; and
  decrypt, using the common key, data that has been encrypted using the common key, wherein
the processor distributes the encrypted acquisition request in the ad-hoc network,
the processor receives from the ad-hoc network, the erasure counter value and second identification information that have been encrypted using the common key,
the processor, using the common key, decrypts the encrypted erasure counter value and the encrypted second identification information that are received, and
the processor, when the decrypted first identification information and the decrypted second identification information coincide, generates the concatenated counter value to include, as the higher order digits, the erasure counter value after the addition of one to the decrypted erasure counter value and to include, as the lower order digits, the transmission counter value after the erasure and indicating that the number of transmission sessions has become zero due to the erasure.

5. The node according to claim 2, wherein
the processor is further configured to:
  encrypt, using a common key retained by the node and the another node, the updating request that includes first identification information specific to the node; and
  decrypt, using the common key, data that has been encrypted using the common key, wherein
the processor distributes the encrypted updating request in the ad-hoc network,
the processor receives from the ad-hoc network, the erasure counter value after the addition and second identification information that have been encrypted using the common key, the processor, using the common key, decrypts the encrypted erasure counter value and the encrypted second identification information that are received, and the processor, when the decrypted first identification information and the decrypted second identification information coincide, generates the concatenated counter value to include, as the higher order digits, the decrypted erasure counter value after the addition and to include, as the lower order digits, the transmission counter value after the erasure and indicating that the number of transmission sessions has become zero due to the erasure.

6. The node according to claim 4, wherein
the first identification information is a random number.

7. A node in an ad-hoc network, the node comprising:
a processor configured to:
  receive from another node, a first concatenated counter value including, as higher order digits, an erasure counter value indicating number of erasure sessions at the another node and including, as lower order digits, a transmission counter value indicating number of transmission sessions from the another node;
  archive to a memory apparatus, the received first concatenated counter value;
  receive a second concatenated counter value from the another node;
  determine whether the received second concatenated counter value is greater than the first concatenated counter value; and
  archive the second concatenated counter value, upon determining that the second concatenated counter value is greater than the first concatenated counter value, by overwriting the first concatenated counter value with the second concatenated counter value, and discard data received together with the second concatenated counter value upon determining that the second concatenated counter value is less than the first concatenated counter value.

8. The node according to claim 7, wherein
the processor is further configured to:
  receive from the another node, an acquisition request for the erasure counter value;
  extract upon receiving the acquisition request, the erasure counter value in the concatenated counter value stored in the memory apparatus; and
  transmit the extracted erasure counter value to the another node.

9. The node according to claim 7, wherein
the processor is further configured to:
  receive from the another node, an updating request for the erasure counter value;
  extract upon receiving the updating request, the erasure counter value in the concatenated counter value stored in the memory apparatus; and
  transmit to the another node, the erasure counter value after an addition of one to the extracted erasure counter value.

10. A communication method of a node in an ad-hoc network, the communication method comprising:
  adding one to a transmission counter value of a concatenated counter value stored in a memory configured to store the concatenated counter value composed of two counter values, the concatenated counter value including, as higher order digits, an erasure counter value indicating number of erasure sessions at the node and including, as lower order digits, the transmission counter value indicating number of transmission sessions from the node, one being added to the transmission counter value when the node transmits data to another node in the ad-hoc network;
  transmitting to the another node, the data and the concatenated counter value after the adding;
  detecting erasure of the concatenated counter value in the memory;
  distributing in the ad-hoc network and upon detecting the erasure, an acquisition request for the erasure counter value;
  receiving from the ad-hoc network and consequent to distributing the acquisition request, the erasure counter value;
  generating the concatenated counter value to include, as the higher order digits, the erasure counter value after an addition of one to the received erasure counter value and to include, as the lower order digits, the transmission counter value after the erasure and indicating that the number of transmission sessions has become zero due to the erasure; and
  archiving to the memory, the generated concatenated counter value.

11. A communication method of a node in an ad-hoc network, the communication method comprising:
  adding one to a transmission counter value of a concatenated counter value stored in a memory configured to store the concatenated counter value composed of two counter values, the concatenated counter value including, as higher order digits, an erasure counter value indicating number of erasure sessions at the node and including, as lower order digits, the transmission counter value indicating number of transmission sessions from the node, one being added to the transmission counter value when the node transmits data to another node in the ad-hoc network;
  transmitting to the another node, the data and the concatenated counter value after the adding;
  detecting erasure of the concatenated counter value in the memory;
  distributing in the ad-hoc network and upon detecting the erasure, an updating request for the erasure counter value;
  receiving from the ad-hoc network and consequent to distributing the updating request, the erasure counter value after an addition of one to the erasure counter value;
  generating the concatenated counter value to include, as the higher order digits, the received erasure counter value after the addition and to include, as the lower order digits, the transmission counter value after the erasure and indicating that the number of transmission sessions has become zero due to the erasure; and
  archiving to the memory, the generated concatenated counter value.

12. A communication method of a node in an ad-hoc network, the communication method comprising:
  adding one to a transmission counter value of a concatenated counter value stored in a first volatile memory configured to store a concatenated counter value composed of two counter values, the concatenated counter value including, as higher order digits, an erasure counter value indicating number of erasure sessions at the node and including, as lower order digits, a transmission counter value indicating number of transmission sessions from the node, one being added to the transmission counter value when the node transmits data to another node in the ad-hoc network;
  transmitting to the another node, the data and the concatenated counter value after the adding of one;

detecting erasure of the concatenated counter value in the first volatile memory;
extracting from a second non-volatile memory configured to store the erasure counter value and upon detecting the erasure, the erasure counter value;
generating the concatenated counter value to include, as the higher order digits, the erasure counter value after an addition of one to the extracted erasure counter value and to include, as the lower order digits, the transmission counter value after the erasure and indicating that the number of transmission sessions has become zero due to the erasure; and
archiving the generated concatenated counter value to the first volatile memory, and overwriting the erasure counter value stored in the second non-volatile memory with the erasure counter value after the addition.

13. A communication method of a node in an ad-hoc network, the communication method comprising:
receiving from another node, a first concatenated counter value including, as higher order digits, an erasure counter value indicating number of erasure sessions at the another node and including, as lower order digits, a transmission counter value indicating number of transmission sessions from the another node;
archiving to a memory apparatus, the received first concatenated counter value;
receiving a second concatenated counter value from the another node;
determining whether the received second concatenated counter value is greater than the first concatenated counter value; and
archiving the second concatenated counter value, upon determining that the second concatenated counter value is greater than the first concatenated counter value, by overwriting the first concatenated counter value with the second concatenated counter value, and discarding data received together with the second concatenated counter value, upon determining that the second concatenated counter value is less than the first concatenated counter value.

14. A communication system comprising:
a first node; and
a second node, wherein
the first node and the second node are configured to communicate in an ad-hoc network,
the first node includes:
a memory configured to store a concatenated counter value composed of two counter values, the concatenated counter value including, as higher order digits, an erasure counter value indicating number of erasure sessions at the first node and including, as lower order digits, a transmission counter value indicating number of transmission sessions from the first node; and
a processor configured to:
update by adding one to the transmission counter value of the concatenated counter value stored in the memory, when the first node transmits data to the second node in the ad-hoc network;
transmit to the second node, a first data addressed to the second node and a first concatenated counter value after updating;
detect erasure of the concatenated counter value in the memory;
distribute in the ad-hoc network and upon detecting the erasure, an acquisition request for the erasure counter value;
receive from the ad-hoc network and consequent to distributing the acquisition request, the erasure counter value;
generate the concatenated counter value to include, as the higher order digits, the received erasure counter value after an addition of one to the erasure counter value and to include, as the lower order digits, the transmission counter value after the erasure and indicating that the number of transmission sessions has become zero due to the erasure;
archive to the memory, the generated concatenated counter value; and
transmit to the second node after archiving the generated concatenated counter value, a second data addressed to the second node and a second concatenated counter value that is updated from a latest concatenated counter value stored in the memory,
the second node includes:
a processor configured to:
receive the first concatenated counter value from the first node;
archive to a memory apparatus, the received first concatenated counter value;
receive the second concatenated counter value from the first node;
determine whether the received second concatenated counter value is greater than the first concatenated counter value; and
archive the second concatenated counter value by overwriting the first concatenated counter value with the second concatenated counter value, upon determining that the second concatenated counter value is greater than the first concatenated counter value.

15. A communication system comprising:
a first node; and
a second node, wherein
the first node and the second node are configured to communicate in an ad-hoc network,
the first node includes:
a memory configured to store a concatenated counter value composed of two counter values, the concatenated counter value including, as higher order digits, an erasure counter value indicating number of erasure sessions at the first node and including, as lower order digits, a transmission counter value indicating number of transmission sessions from the first node; and
a processor configured to:
update by adding one to the transmission counter value of the concatenated counter value stored in the memory, when the first node transmits data to the second node in the ad-hoc network;
transmit to the second node, a first data addressed to the second node and a first concatenated counter value after updating;
detect erasure of the concatenated counter value in the memory;
distribute in the ad-hoc network and upon detecting the erasure, an updating request for the erasure counter value;
receive from the ad-hoc network and consequent to distributing the updating request, the erasure counter value after an addition of one to the erasure counter value;
generate the concatenated counter value to include, as the higher order digits, the received erasure counter value after the addition and to include, as the lower order digits, the transmission counter value after the erasure and indicating that the number of transmission sessions has become zero due to the erasure;

archive to the memory, the generated concatenated counter value; and transmit to the second node after archiving the generated concatenated counter value, a second data addressed to the second node and a second concatenated counter value that is updated from a latest concatenated counter value stored in the memory, the second node includes:

a processor configured to:

receive the first concatenated counter value from the first node;

archive to a memory apparatus, the received first concatenated counter value;

receive the second concatenated counter value from the first node;

determine whether the received second concatenated counter value is greater than the first concatenated counter value; and archive the second concatenated counter value by overwriting the first concatenated counter value with the second concatenated counter value, upon determining that the second concatenated counter value is greater than the first concatenated counter value.

16. A communication system comprising:

a first node; and a second node, wherein the first node and the second node are configured to communicate in an ad-hoc network, the first node includes:

a first volatile memory configured to store a concatenated counter value composed of two counter values, the concatenated counter value including, as higher order digits, an erasure counter value indicating number of erasure sessions at the first node and including, as lower order digits, a transmission counter value indicating number of transmission sessions from the first node;

a second non-volatile memory configured to store the erasure counter value; and a processor configured to:

update by adding one to the transmission counter value of the concatenated counter value stored in the first volatile memory, when the first node transmits data to the second node in the ad-hoc network;

transmit to the second node, a first data addressed to the second node and a first concatenated counter value after updating;

detect erasure of the concatenated counter value in the first volatile memory;

extract from the second non-volatile memory and upon detecting the erasure, the erasure counter value;

generate the concatenated counter value to include, as the higher order digits, the erasure counter value after an addition of one to the extracted erasure counter value and to include, as the lower order digits, the transmission counter value after the erasure and indicating that the number of transmission sessions has become zero due to the erasure;

archive the generated concatenated counter value to the first volatile memory, and overwrite the erasure counter value stored in the second non-volatile memory with the erasure counter value after the addition; and transmit to the second node after archiving the generated concatenated counter, a second data addressed to the second node and a second concatenated counter value that is updated from a latest concatenated counter value stored in the first volatile memory, the second node includes:

a processor configured to:

receive the first concatenated counter value from the first node;

archive to a memory apparatus, the received first concatenated counter value;

receive the second concatenated counter value from the first node;

determine whether the received second concatenated counter value is greater than the first concatenated counter value; and archive the second concatenated counter value by overwriting the first concatenated counter value with the second concatenated counter value, upon determining that the second concatenated counter value is greater than the first concatenated counter value.

17. The node according to claim 5, wherein the first identification information is a random number.

* * * * *